US010628956B2

(12) United States Patent
Ikeda et al.

(10) Patent No.: US 10,628,956 B2
(45) Date of Patent: Apr. 21, 2020

(54) VIDEO PROCESSING DEVICE, VIDEO PROCESSING METHOD, AND PROGRAM

(71) Applicant: Sony Corporation, Tokyo (JP)

(72) Inventors: Hiroshi Ikeda, Tokyo (JP); Seijiro Inaba, Kanagawa (JP); Nobuho Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 15/749,620

(22) PCT Filed: Aug. 23, 2016

(86) PCT No.: PCT/JP2016/074451
§ 371 (c)(1),
(2) Date: Feb. 1, 2018

(87) PCT Pub. No.: WO2017/038541
PCT Pub. Date: Mar. 9, 2017

(65) Prior Publication Data
US 2018/0225840 A1    Aug. 9, 2018

(30) Foreign Application Priority Data

Sep. 3, 2015    (JP) ................................. 2015-174018

(51) Int. Cl.
*G06T 9/00*    (2006.01)
*G06T 7/70*    (2017.01)
(Continued)

(52) U.S. Cl.
CPC ............ *G06T 7/70* (2017.01); *G06K 9/00335* (2013.01); *G06K 9/00771* (2013.01);
(Continued)

(58) Field of Classification Search
CPC ....... G06T 7/00; G06T 7/20–292; G06T 7/70; G06T 7/97; G06T 3/00–20;
(Continued)

(56) References Cited

U.S. PATENT DOCUMENTS

| 7,028,269 | B1 * | 4/2006 | Cohen-Solal | ........ G06K 9/3241 |
| | | | | 348/E5.043 |
| 2003/0210461 | A1 * | 11/2003 | Ashizaki | ................ G03H 1/268 |
| | | | | 359/443 |

(Continued)

FOREIGN PATENT DOCUMENTS

| JP | 2003-244728 A | 8/2003 |
| JP | 2006-115298 A | 4/2006 |
| JP | 2014-239384 A | 12/2014 |

*Primary Examiner* — Sean T Motsinger
(74) *Attorney, Agent, or Firm* — Michael Best & Friedrich LLP

(57) ABSTRACT

The present technology relates to a video processing device, a video processing method, and a program for providing a bullet time video centering on a moving object. The video processing device acquires view point position information indicating the range of movement of a view point position for an object in an input image frame where the object is imaged in chronological order at multiple different view point positions. Time information indicates a time range in the chronological order of imaging the input image frame. The device processes the input image frame such that the object is at a specific position on an output image frame when the view point position moves within the time range indicated by the time information and the view point position movement range indicated by the view point position information.

20 Claims, 34 Drawing Sheets

(51) Int. Cl.

| | | |
|---|---|---|
| *H04N 5/247* | (2006.01) | |
| *H04N 13/243* | (2018.01) | |
| *G06K 9/00* | (2006.01) | |
| *H04N 13/111* | (2018.01) | |
| *H04N 5/262* | (2006.01) | |
| *H04N 21/8541* | (2011.01) | |
| *G06T 7/292* | (2017.01) | |
| *H04N 5/232* | (2006.01) | |
| *G06T 1/00* | (2006.01) | |
| *H04N 7/01* | (2006.01) | |

(52) U.S. Cl.
CPC ............ *G06T 1/0007* (2013.01); *G06T 7/292* (2017.01); *H04N 5/232* (2013.01); *H04N 5/247* (2013.01); *H04N 5/2627* (2013.01); *H04N 13/111* (2018.05); *H04N 13/243* (2018.05); *H04N 21/8541* (2013.01); *H04N 7/0127* (2013.01)

(58) Field of Classification Search
CPC .. G06T 1/0007; G06K 9/00335; H04N 5/232; H04N 5/247; H04N 7/0127

See application file for complete search history.

(56) References Cited

U.S. PATENT DOCUMENTS

| | | | |
|---|---|---|---|
| 2004/0027451 A1* | 2/2004 | Baker | H04N 5/2259 348/46 |
| 2006/0028473 A1* | 2/2006 | Uyttendaele | G06T 15/205 345/473 |
| 2006/0064384 A1* | 3/2006 | Mehrotra | G01S 3/7864 705/57 |
| 2010/0026712 A1* | 2/2010 | Aliprandi | H04N 13/111 345/629 |
| 2012/0114224 A1* | 5/2012 | Xu | G06T 15/205 382/154 |
| 2012/0169842 A1* | 7/2012 | Chuang | G08B 13/19619 348/39 |
| 2012/0218378 A1* | 8/2012 | Takizawa | G03B 17/18 348/36 |
| 2013/0016097 A1* | 1/2013 | Coene | G06T 15/205 345/419 |
| 2014/0240466 A1* | 8/2014 | Holz | G06K 9/00355 348/47 |
| 2014/0362099 A1* | 12/2014 | Sakamoto | G06T 3/0062 345/581 |
| 2015/0042812 A1* | 2/2015 | Tang | H04N 5/23206 348/157 |
| 2016/0320951 A1* | 11/2016 | Ernst | G06F 3/04842 |
| 2016/0381341 A1* | 12/2016 | El Choubassi | H04N 5/2226 348/43 |
| 2017/0099441 A1* | 4/2017 | Choi | H04N 5/247 |
| 2018/0225840 A1* | 8/2018 | Ikeda | H04N 5/232 |

* cited by examiner

A        B

FIG. 24
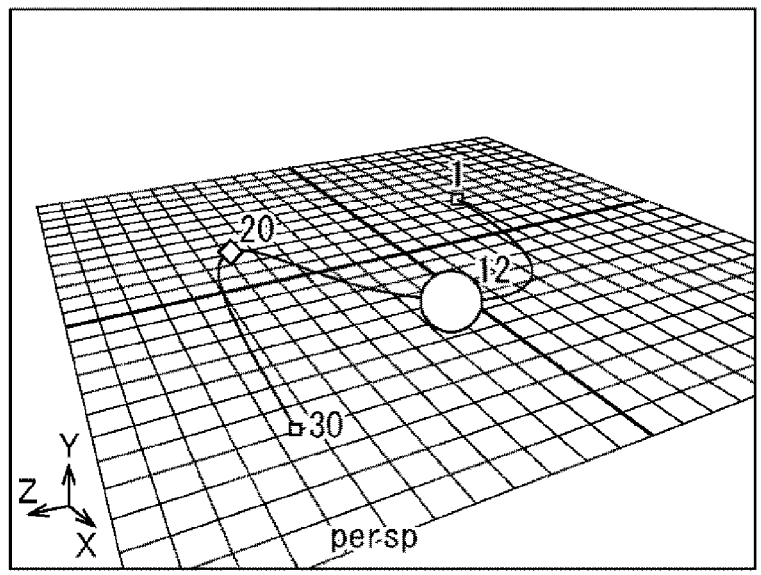
A
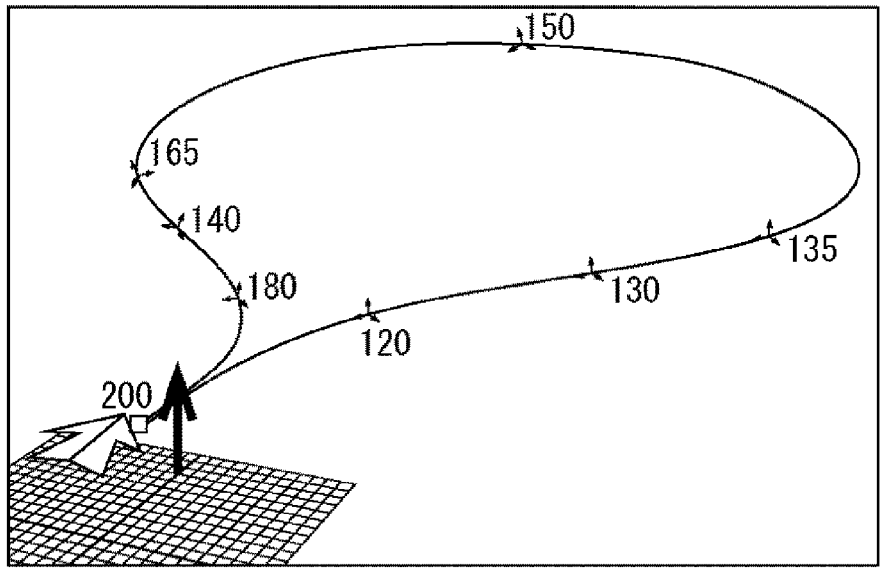
B

VIDEO PROCESSING DEVICE, VIDEO PROCESSING METHOD, AND PROGRAM

TECHNICAL FIELD

The present technology relates to a video processing device, a video processing method, and a program. Specifically, the present technology relates to a video processing device, a video processing method, and a program for providing a bullet time video centering on an object in a case where the object is moving.

BACKGROUND ART

Typically, a shooting technology so-called "bullet time shooting" has been known. For example, the technology for displaying a video about a rotation center at a specified optional position is disclosed as a technology utilizing the bullet time shooting (see, e.g., Patent Document 1).

CITATION LIST

Patent Document

Patent Document 1: Japanese Patent Application Laid-Open No. 2014-239384

SUMMARY OF THE INVENTION

Problems to be Solved by the Invention

Incidentally, it has been demanded that even in a case where an object included in a video imaged by a camera device is moving, a bullet time video centering on such an object can be provided.

The present technology has been made in view of such a situation, and can provide a bullet time video centering on an object in a case where the object is moving.

Solutions to Problems

According to a video processing device of one aspect of the present technology, the video processing device includes a first acquiring section configured to acquire view point position information indicating the range of movement of a view point position for a notable object included in an input image frame including an object imaged in chronological order at multiple different view point positions and time information indicating a time range in the chronological order of imaging the input image frame, and a processing section configured to process the input image frame such that the notable object is at a specific position on an output image frame when the view point position moves within the time range indicated by the time information and the view point position movement range indicated by the view point position information.

The video processing device of one aspect of the present technology may be an independent device or an internal block forming a single device. Moreover, a video processing method or program of one aspect of the present technology is a video processing method or program corresponding to the above-described video processing device of one aspect of the present technology.

In the video processing device, the video processing method, and the program according to one aspect of the present technology, the view point position information indicating the range of movement of the view point position for the notable object included in the input image frame including the object imaged in chronological order at the multiple different view point positions and the time information indicating the time range in the chronological order of imaging the input image frame are acquired, and the input image frame is processed such that the notable object is at the specific position on the output image frame when the view point position moves within the time range indicated by the time information and the view point position movement range indicated by the view point position information.

Effects of the Invention

According to one aspect of the present technology, a bullet time video centering on an object can be provided in a case where the object is moving.

Note that the effects described herein are not necessarily limited, and may be any effect described in the present disclosure.

BRIEF DESCRIPTION OF DRAWINGS

FIG. 24 is a view of an adjustment example of a camera work and a motion path on a three-dimensional space.

MODE FOR CARRYING OUT THE INVENTION

Embodiments of the present technology will be described below with reference to the drawings. Note that description will be made in the following order.

1. First Embodiment: Bullet time Video Generation
2. Second Embodiment: Bullet time Video Generation in the Case of Performing Platform Control
3. Setting of Default Conditions for Bullet time Video Generation Processing
4. Bullet time Video Reproduction
5. Variations
6. Computer Configuration

1. First Embodiment (Configuration Example of Video Processing System)

Figure 1:
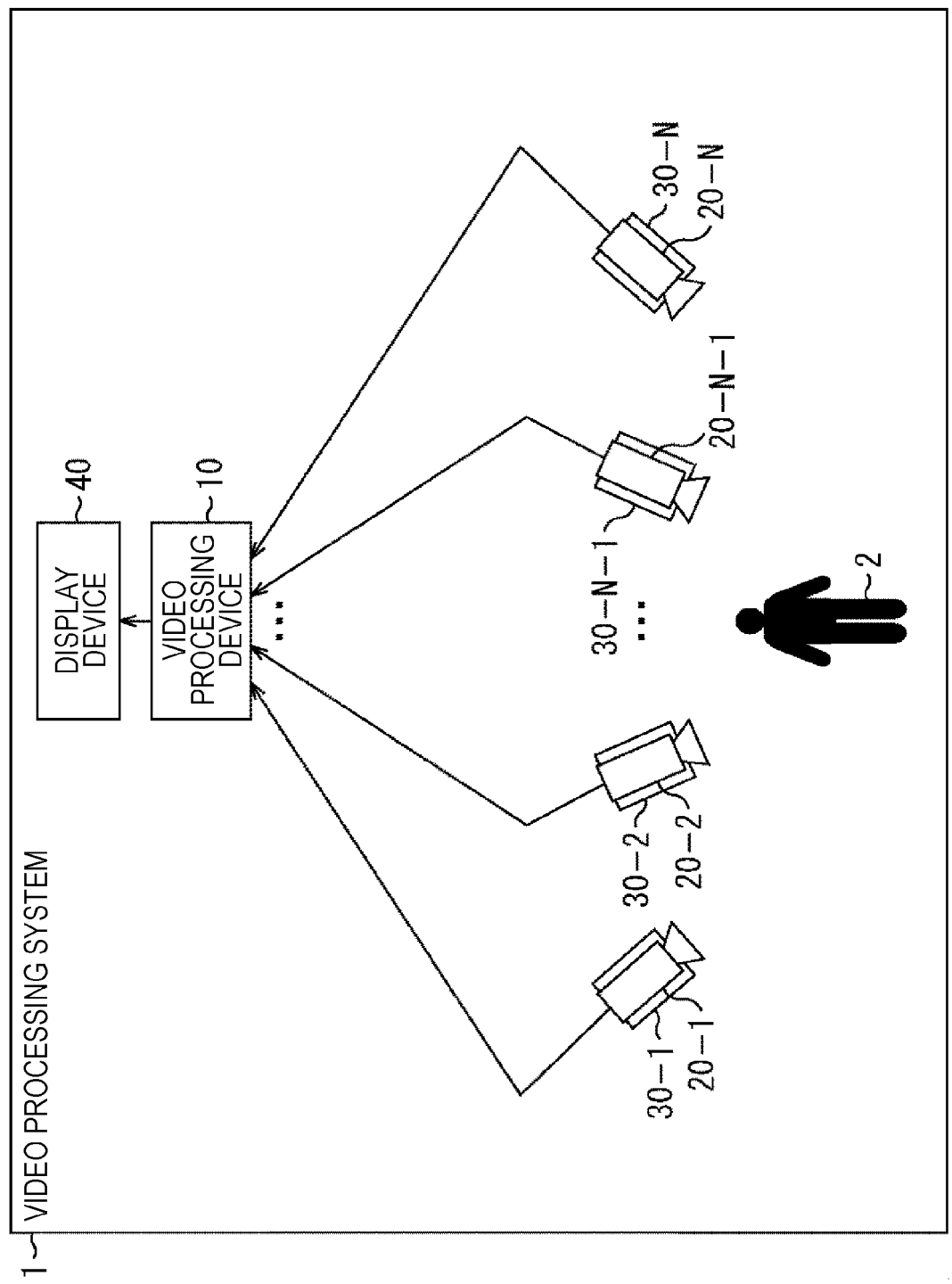
FIG. 1 is a diagram of a configuration example of a video processing system of a first embodiment.

FIG. 1 is a diagram of a configuration example of a video processing system 1 of a first embodiment.

The video processing system 1 is a system configured so that a bullet time video as a video acquired in such a manner that an object 2 is imaged while the video processing system 1 is moving at the periphery of the object 2 can be generated. In FIG. 1, the video processing system 1 includes a video processing device 10, camera devices 20-1 to 20-N (N is an integer of one or more), and a display device 40.

Moreover, in the video processing system 1 of FIG. 1, a case where the camera devices 20-1 to 20-N are each fixed onto platforms 30-1 to 30-N is illustrated as an example. Note that the method for placing the camera devices 20-1 to 20-N is not limited to the platforms, and other placement methods such as placement on tables may be used.

Note that in description below, in a case where it is not necessary to specifically distinguish the camera devices 20-1 to 20-N from each other, these devices will be merely referred to as "camera devices 20". Moreover, in a case where it is not necessary to specifically distinguish the platforms 30-1 to 30-N from each other, these platforms will be merely referred to as "platforms 30".

The camera device 20-1 is, for example, electronic equipment configured so that a moving image or a still image can be acquired, such as a digital video camera, a digital still camera, or information equipment having a camera function. The camera device 20-1 includes, for example, an imaging optical system such as a lens, a solid-state imaging element, a signal processing circuit, and a control circuit. Moreover, the camera device 20-1 is fixed onto the platform 30-1.

The camera devices 20-2 to 20-N are configured as in the camera device 20-1, and are each fixed onto the corresponding platforms 30-2 to 30-N.

In FIG. 1, the camera devices 20-1 to 20-N are placed at the periphery of the object 2. In each of the camera devices 20-1 to 20-N, incident light entering the solid-state imaging element via the imaging optical system is converted into an electric signal, and in this manner, image data is generated. Then, each of the camera devices 20-1 to 20-N supplies the video processing device 10 with an image frame (an input image frame) obtained from the image data.

The camera devices 20-1 to 20-N are herein placed at the periphery of the object 2, and therefore, the image frames generated by the camera devices 20-1 to 20-N are image frames including the object 2 imaged at multiple different points of view (view point positions).

The video processing device 10 is configured to generate the bullet time video centering on the object 2 (a notable object) on the basis of the input image frames supplied from the camera devices 20-1 to 20-N and including the object 2 imaged at the multiple different view point positions, thereby displaying the bullet time video on the display device 40. In this video processing device 10, even in a case where the object 2 as the notable object is moving, the bullet time video centering on such an object 2 can be generated. The detailed contents of such processing will be described later.

Figure 2:
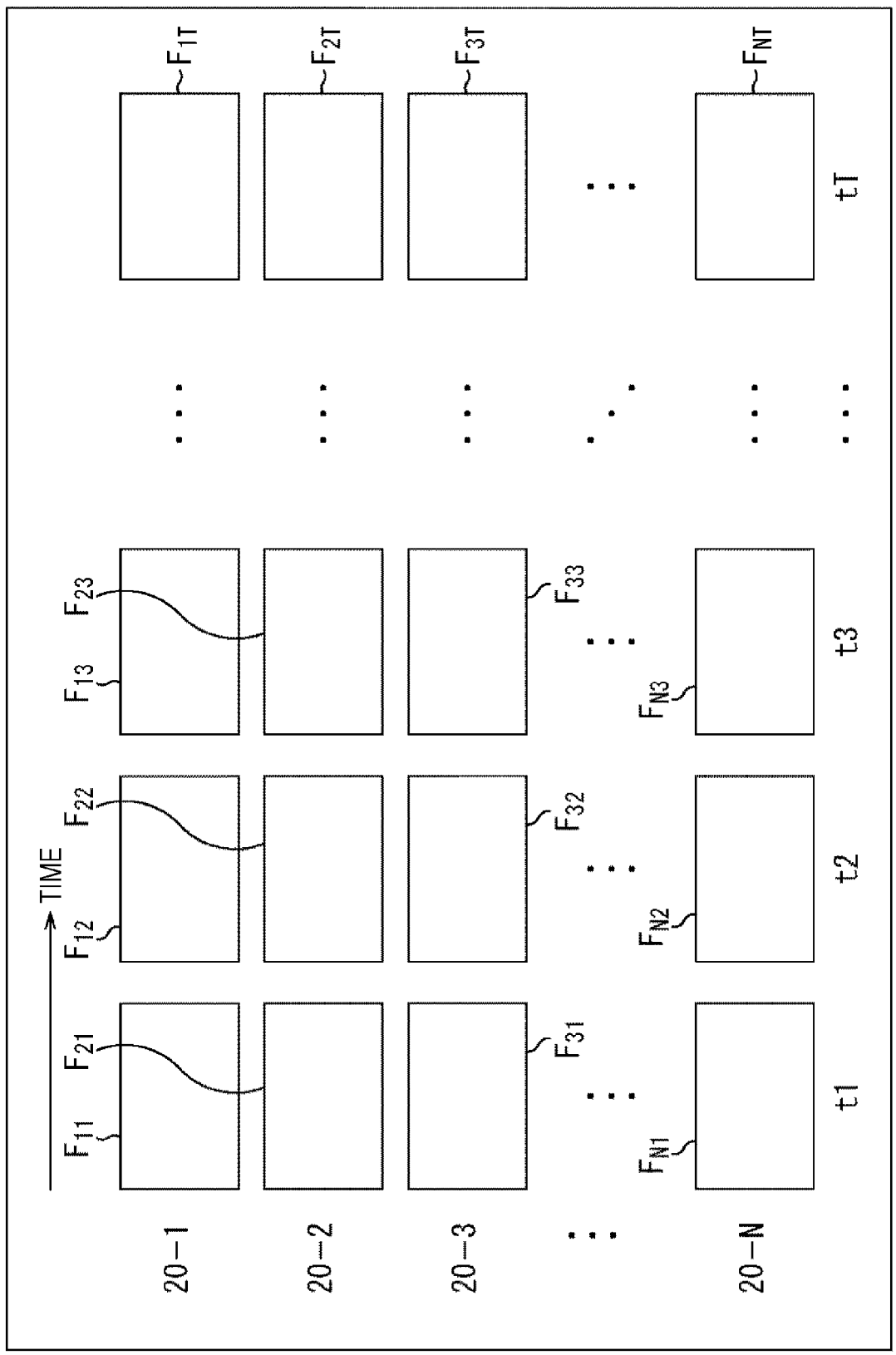
FIG. 2 is a schematic diagram of input image frames in chronological order, the input image frames being generated at each camera device and being input to a video processing device.

FIG. 2 is a schematic diagram of the input image frames in chronological order, the input image frames being generated at the camera devices 20-1 to 20-N of FIG. 1 and being input to the video processing device 10.

In FIG. 2, the input image frames generated at the camera devices 20-1 to 20-N and input to the video processing device 10 are represented by input image frames $F_{ij}$ (i and j are integers of one or more). Note that the number for identifying each camera device 20 is assigned to i, and the number for identifying the input image frame generated at each camera device 20 is assigned to j.

For example, as illustrated in FIG. 2, i=1 is, as a fixed value, assigned to the input image frames generated by the camera device 20-1 and input to the video processing device 10, and a unique number is assigned to j in a generation order. Specifically, the camera device 20-1 sequentially generates, according to a frame rate, the input image frame $F_{11}$, the input image frame $F_{12}$, the input image frame $F_{13}$, ..., the input image frame $F_{1T}$ between a time point t1 and a time point tT, and these frames are input to the video processing device 10.

Similarly, the camera device 20-2 sequentially generates the input image frame $F_{21}$, the input image frame $F_{22}$, the input image frame $F_{23}$, ..., the input image frame $F_{2T}$ between the time point t1 and the time point tT, and these frames are input to the video processing device 10. Moreover, similarly for the camera devices 20-3 to 20-N, the input image frames generated at each camera device 20 and input to the video processing device 10 are represented by the input image frames $F_{31}$ to $F_{3T}$ and the input image frames $F_{N1}$ to $F_{NT}$, for example.

Note that in description below, in a case where it is not necessary to specifically distinguish, from each other, the multiple input image frames generated at the camera devices 20-1 to 20-N and input to the video processing device 10, these frames will be referred to as "input image frames F". Moreover, in a case where it is not necessary to distinguish, from each other, the input image frames $F_{11}$ to $F_{1T}$ generated at the camera device 20-1 and input to the video processing device 10, these frames will be referred to as "input image frames $F_1$". Similarly for the camera devices 20-2 to 20-N, in a case where it is not necessary to distinguish, from each other, the input image frames generated at each camera device 20 and input to the video processing device 10, these frames will be referred to as "input image frames $F_2$ to $F_N$".

Moreover, the N input image frames generated at the camera devices 20-1 to 20-N and input to the video processing device 10 at the time point t1 will be referred to as "input image frames $F_{11}$ to $F_{N1}$". Similarly, the N input image frames generated at the camera devices 20-1 to 20-N and input to the video processing device 10 at each of the time points t2 to tT will be referred to as "input image frames $F_{12}$ to $F_{N2}$" or "input image frames $F_{1T}$ to $F_{NT}$".

Note that the chronological image frames generated by each camera device 20, i.e., the input image frames input to the video processing device 10 in chronological order, are not limited to moving image data, and may be multiple pieces of still image data. Similarly, output image frames (image data allowing reproduction of the bullet time video) obtained in such a manner that the video processing device 10 processes the input image frames are not limited to moving image data, and may be multiple pieces of still image data.

The video processing system 1 is configured as described above.

(Configuration Example of Video Processing Device)

Figure 3:
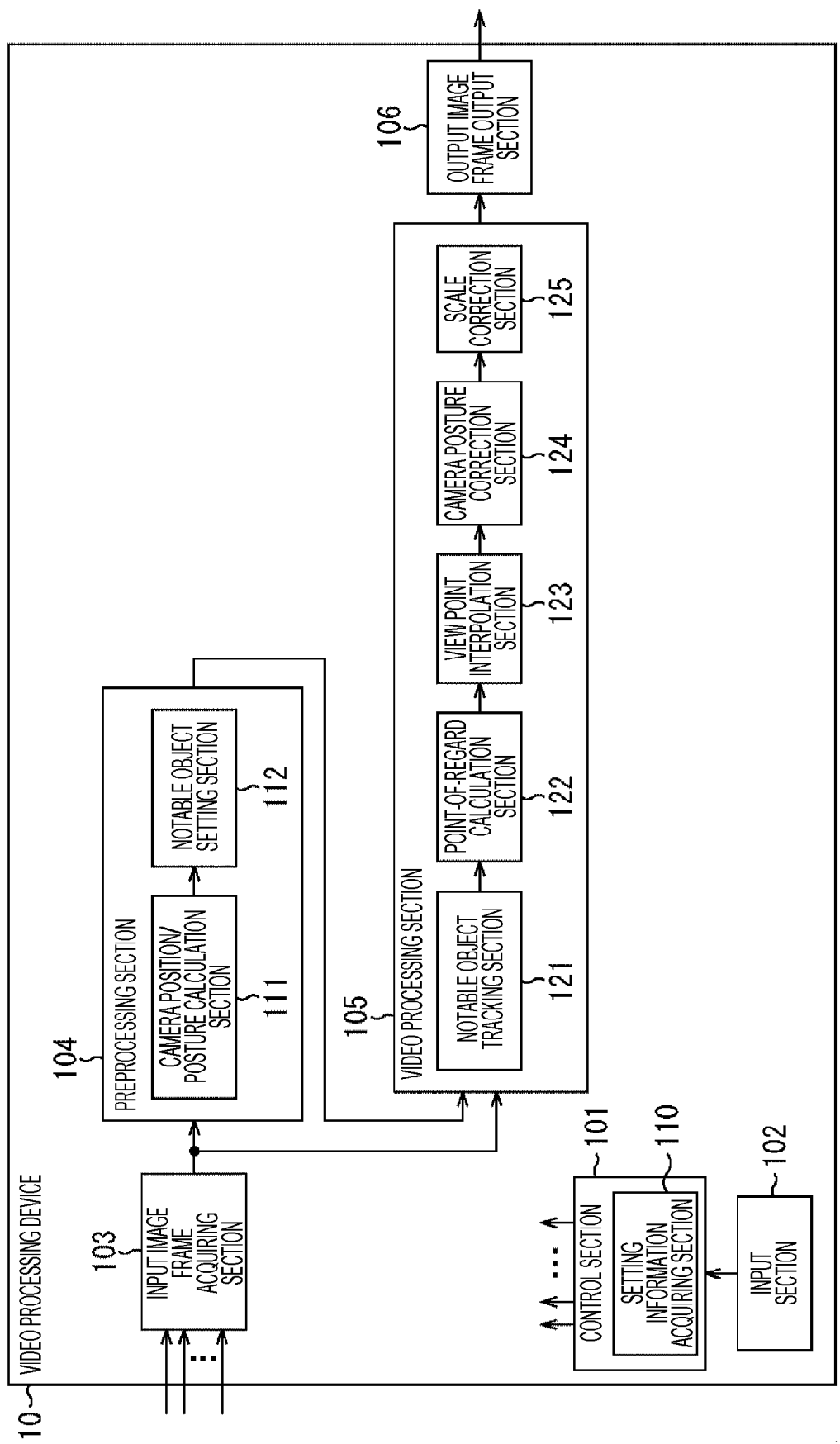
FIG. 3 is a diagram of a configuration example of the video processing device of the first embodiment.

FIG. 3 is a diagram of a configuration example of the video processing device 10 of FIG. 1.

In FIG. 3, the video processing device 10 includes a control section 101, an input section 102, an input image frame acquiring section 103, a preprocessing section 104, a video processing section 105, and an output image frame output section 106.

The control section 101 is configured to control operation of each section of the video processing device 10.

The input section 102 is configured to supply the control section 101 with an operation signal corresponding to user operation. The control section 101 controls operation of each section of the video processing device 10 on the basis of the operation signal supplied from the input section 102.

Moreover, the control section 101 includes a setting information acquiring section 110. The setting information acquiring section 110 is configured to acquire setting information corresponding to the operation signal supplied from the input section 102. The control section 101 controls, on the basis of the setting information acquired by the setting information acquiring section 110, the input image frame acquiring section 103 to the output image frame output section 106 for performing the processing for the bullet time video.

The setting information includes herein view point position information indicating the range of movement of the view point position with respect to the notable object such as the object 2, and time information indicating the time range of the temporally-continuous input image frames F for each view point position. Specifically, the view point position information is information indicating start and end positions in movement of the view point position with respect to the notable object (the object 2). Moreover, the time information is information indicating the start and end time points of the temporally-continuous input image frames F for each view point position.

The input image frame acquiring section 103 is configured to sequentially acquire the N image frames F generated by the N camera devices 20, i.e., the input image frames $F_{11}$ to $F_{N1}$, the input image frames $F_{12}$ to $F_{N2}$, ..., the input image frames $F_{1T}$ to $F_{NT}$, thereby supplying these frames to the preprocessing section 104 or the video processing section 105 at predetermined timing.

Note that the input image frame acquiring section 103 has a communication function, and receives and acquires (the data of) the input image frames F transmitted from the N camera devices 20 via wire communication or wireless communication. Note that the input image frame acquiring section 103 is not limited to data reception. For example, the input image frame acquiring section 103 may read data from a recording medium to acquire (the data of) the input image frames F. Alternatively, the input image frame acquiring section 103 may have, as in the camera devices 20, an imaging function to image the object 2 and generate the image data, thereby acquiring (the data of) the input image frames F.

The preprocessing section 104 is configured to perform, for the input image frames F (e.g., the input image frames $F_{11}$ to $F_{N1}$) supplied from the input image frame acquiring section 103, the preprocessing for generating the bullet time video. The preprocessing section 104 includes a camera position/posture calculation section 111 and a notable object setting section 112.

The camera position/posture calculation section 111 is configured to perform predetermined image processing for the input image frames F (e.g., the input image frames $F_{11}$ to $F_{N1}$) supplied from the input image frame acquiring section 103, thereby calculating the camera position and camera posture of each camera device 20 and supplying such camera position and posture to the notable object setting section 112.

Note that the camera position is the imaging position of the camera device 20 when the object 2 is imaged for generating the image frame (the input image frame F). Moreover, the camera posture indicates the imaging posture of the camera device 20, i.e., the direction of imaging by the camera device 20, when the object 2 is imaged for generating the image frame (the input image frame F).

The notable object setting section 112 is configured to set, as the focused notable object, the object 2 included in the input image frames F (e.g., the input image frames $F_{11}$ to $F_{N1}$) supplied from the input image frame acquiring section 103, thereby supplying such a setting result to the video processing section 105.

For example, the notable object setting section 112 can manually set herein the notable object according to the user operation, as well as estimating the object 2 included in the input image frames F by means of information such as the camera position and posture supplied from the camera position/posture calculation section 111 to set such an object 2 as the notable object.

The video processing section 105 is configured to perform the processing for the bullet time video on the basis of the input image frames F (e.g., the input image frames $F_{11}$ to $F_{N1}$, ..., the input image frames $F_{1T}$ to $F_{NT}$) sequentially supplied from the input image frame acquiring section 103 and the camera position, the camera posture, and the notable object setting result supplied from the preprocessing section 104. The video processing section 105 includes a notable object tracking section 121, a point-of-regard calculation section 122, a view point interpolation section 123, a camera posture correction section 124, and a scale correction section 125.

The notable object tracking section 121 is configured to track (perform object tracking) the notable object included in the input image frames F. That is, the input image frames F (e.g., the input image frames $F_{11}$ to $F_{N1}$, . . . , the input image frames $F_{1T}$ to $F_{NT}$) generated by the camera devices 20-1 to 20-N in chronological order are sequentially input to the notable object tracking section 121, and therefore, the notable object tracking section 121 tracks the notable object (the object 2) included in the input image frames F input in chronological order.

The point-of-regard calculation section 122 is configured to calculate the position of the point of regard (hereinafter also referred to as the "point P of regard") of the notable object included in the input image frames F. For example, the most important portion (e.g., the center of gravity) of the notable object (the object 2) is herein taken as the point of regard, and the position of such a point is calculated. Note that it can be also said that the point of regard is a notable position as a focused position in the notable object.

The view point interpolation section 123 is configured to interpolate a virtual view point for the notable object (the object 2) between adjacent ones of the physically-placed camera devices 20 on the basis of the input image frames F (e.g., the input image frames $F_{11}$ to $F_{N1}$, . . . , the input image frames $F_{1T}$ to $F_{NT}$).

For example, image frame interpolation processing is herein performed using the input image frame $F_{11}$ input from the camera device 20-1 and the input image frame $F_{21}$ input from the camera device 20-2 among the input image frames $F_{11}$ to $F_{N1}$ simultaneously acquired at certain timing. In this manner, an interpolated image frame F' as an input image frame corresponding to a view point position between the camera device 20-1 and the camera device 20-2 can be generated.

The camera posture correction section 124 is configured to perform image processing (signal processing) for the input image frames F (e.g., the input image frames $F_{11}$ to $F_{N1}$, . . . , the input image frames $F_{1T}$ to $F_{NT}$) and the interpolated image frames F' generated by the view point interpolation section 123, thereby correcting the camera posture.

For example, in a case where the direction of the optical axis L (of the imaging optical system) of the camera device 20 is shifted from the point of regard of the notable object (the object 2), projective transformation is herein performed for the input image frames F and the interpolated image frames F' such that the direction of the optical axis L (of the imaging optical system) of the camera device 20 faces the direction of the point of regard of the notable object (the object 2). In this manner, the camera posture can be corrected.

The scale correction section 125 is configured to perform image processing (signal processing) for the input image frames F (e.g., the input image frames $F_{11}$ to $F_{N1}$, . . . , the input image frames $F_{1T}$ to $F_{NT}$) and the interpolated image frames F' subjected to camera posture correction processing, thereby performing scale correction.

For example, in a case where the camera position of the camera device 20 is shifted from an ideal position in an optical axis direction, scale correction is performed for the input image frames F and the interpolated image frames F' subjected to the camera posture correction processing such that the input image frames F and the interpolated image frames F' generated in a case where the camera position is at the ideal position are brought.

The output image frame output section 106 is configured to output the output image frames to the display device 40, the output image frames being obtained in such a manner that the processing for the bullet time video is performed for the input image frames F by the preprocessing section 104 and the video processing section 105.

These output image frames are the image data allowing reproduction of the bullet time video, and include a specific position (e.g., a position corresponding to the point of regard) of the notable object (the object 2) when the view point position moves within the time range indicated by the time information and the view point position movement range indicated by the view point position information. Thus, the bullet time video centering on the notable object (the specific position) is displayed on the display device 40 on the basis of the output image frames.

Note that in the video processing device 10, the input image frame acquiring section 103 may sequentially acquire the input image frames F (the input image frames $F_{11}$ to $F_{N1}$, . . . , the input image frames $F_{1T}$ to $F_{NT}$) input from the camera devices 20-1 to 20-N such that the input image frames F are processed in real time, or the video processing device 10 may perform the processing after the input image frames F targeted for the processing have been acquired to some extent or after all of the input image frames F targeted for the processing have been acquired. In the case of performing non-real-time processing, the image frames (the input image frames F) generated by each camera device 20 are, for example, recorded (stored) in a recording device (e.g., a later-described recording device 80 of FIG. 33) provided inside or outside the video processing device 10, and as necessary, are read by the input image frame acquiring section 103.

Moreover, it has been described that in the video processing device 10, the output image frames subjected to the processing for the bullet time video by the preprocessing section 104 and the video processing section 105 are output to the display device 40 by the output image frame output section 106. However, the output image frames may be recorded (stored) in the recording device (e.g., the later-described recording device 80 of FIG. 33) provided inside or outside the video processing device 10. In this case, the output image frames are, for example, read from the recording device according to the user operation, and then, the bullet time video is reproduced.

(Bullet Time Video Generation Processing)

Next, the flow of bullet time video generation processing executed by the video processing device 10 of FIG. 3 will be described with reference to a flowchart of FIG. 4.

At step S101, the setting information acquiring section 110 acquires, according to, e.g., operation of the input section 102 by a user, the setting information such as the view point position information and the time information, the setting information being used in the bullet time video generation processing. For example, information indicating that the start position in view point movement is the camera device 20-1 and the end position in view point movement is the camera device 20-N is set as the view point position information. Moreover, information such as a range from the time point t1 to a time point tα and the time point t1 is set as the time information, for example.

That is, the start position (an image frame start position) of the input image frames F targeted for the processing for the bullet time video and the end position (an image frame end position) of the input image frames F targeted for the processing are set by the view point position information and the time information.

Note that these types of the view point position information and the time information are, as default conditions for the bullet time video generation processing, set in such a manner that the user operates a setting screen (a later-described setting screen 300 of FIG. 22), for example. Note that in the case of performing the bullet time video generation processing for the input image frames F at each time point t, the user does not need to set the time information as the default conditions. In this case, the entire time range is set as default, for example.

At step S102, the input image frame acquiring section 103 acquires the input image frames F (e.g., the input image frames $F_{11}$ to $F_{N1}$) input from the camera devices 20-1 to 20-N. Note that the input image frames F (e.g., the input image frames $F_{11}$ to $F_{N1}$) acquired in the processing of step S102 are supplied to the preprocessing section 104 and the video processing section 105.

Note that as the input image frames F acquired in the processing of step S102, the input image frames F acquired in such a manner that the camera devices 20-1 to 20-N image the object 2 may be acquired in real time, or the input image frames F temporarily recorded in the recording device (the later-described recording device 80 of FIG. 33) may be acquired.

At step S103, the camera position/posture calculation section 111 performs the predetermined image processing for the input image frames F (e.g., the input image frames $F_{11}$ to $F_{N1}$) acquired in the processing of step S102, thereby calculating the camera position and camera posture of each camera device 20.

In such camera position/posture calculation processing, a technology called "structure from motion (SFM)" as the method for simultaneously recovering the three-dimensional shape of the object 2 and the camera position and camera posture of each camera device 20 is, for example, used to calculate the camera position and camera posture of each camera device 20. Note that the detailed processing contents of the processing of calculating the camera position and posture will be described later with reference to FIGS. 7 to 9.

At step S104, the notable object setting section 112 sets, as the notable object, the object 2 included in the input image frames F (e.g., the input image frames $F_{11}$ to $F_{N1}$) acquired in the processing of step S102.

In such notable object setting processing, the object 2 is set as the notable object in such a manner that the object 2 included in the input image frames F is detected (automatically detected) or is specified (manually specified) by the user, for example. Note that in the case of manually specifying the notable object, the notable object is set in such a manner that the user operates the setting screen (the later-described setting screen 300 of FIG. 22), for example. Moreover, the detailed processing contents of the notable object setting processing will be described later with reference to FIGS. 10 to 11.

At step S105, the notable object tracking section 121 starts tracking (object tracking) the notable object (the object 2), the notable object being included in the input image frames F (e.g., the input image frames $F_{11}$ to $F_{N1}$) acquired in the processing of step S102 and being set in the processing of step S104.

In such notable object tracking processing, for example, the model of the notable object set in the processing of step S104 is learnt, and the notable object targeted for tracking is tracked using the notable object model. Note that the detailed processing contents of the notable object tracking processing will be described later with reference to FIG. 12.

At step S106, the point-of-regard calculation section 122 takes, as the point of regard, the most important portion of the notable object (the object 2) tracked in the processing of step S105, thereby calculating the position of the point of regard.

In such point-of-regard calculation processing, (the position of) the center of gravity of the notable object can be taken as the point of regard, for example. Note that the detailed processing contents of the point-of-regard calculation processing will be described later with reference to FIG. 13.

At step S107, the view point interpolation section 123 interpolates the virtual view point for the notable object (the object 2) between adjacent ones of the physically-placed camera devices 20 on the basis of the input image frames F (e.g., the input image frames $F_{11}$ to $F_{N1}$) acquired in the processing of step S102.

In such view point interpolation processing, the interpolated image frame F' generated by a virtual camera device between the camera device 20-1 and the camera device 20-2 is generated by a method based on two dimensions, or the three-dimensional model of the notable object (the object 2) is generated by a method based on three dimensions, for example. In this manner, the virtual view point can be interpolated. Note that the detailed processing contents of the view point interpolation processing will be described later with reference to FIG. 14.

At step S108, the camera posture correction section 124 performs the camera posture correction processing for the input image frames F (e.g., the input image frames $F_{11}$ to $F_{N1}$) acquired in the processing of step S102 and the interpolated image frames F' generated in the processing of step S107.

In such camera posture correction processing, in a case where the direction of the optical axis L (of the imaging optical system) of the camera device 20 is, for example, shifted from the point of regard of the notable object (the object 2), projective transformation is performed such that the direction of the optical axis L (of the imaging optical system) of the camera device 20 faces the direction of the point of regard of the notable object (the object 2). In this manner, the camera posture is corrected. Note that the detailed processing contents of the camera posture correction processing will be described later with reference to FIG. 15.

At step S109, the scale correction section 125 performs the scale correction processing for the input image frames F (e.g., the input image frames $F_{11}$ to $F_{N1}$) and the interpolated image frames F' subjected to the camera posture correction processing in the processing of step S108.

In such scale correction processing, in a case where the camera position of the camera device 20 is, for example, shifted back and forth in the optical axis direction from the ideal position, scale correction is performed such that the input image frame F (or the interpolated image frame F') generated in a case where the camera position is at the ideal position is brought. Note that the detailed processing contents of the scale correction processing will be described later with reference to FIG. 16.

At step S110, the output image frame output section 106 outputs the output image frames to the display device 40 at predetermined timing, the output image frames being obtained in such a manner that the processing for the bullet time video (e.g., the processing of steps S103 to S109) is performed for the input image frames (e.g., input image frames $F_{11}$ to $F_{N1}$). Note that the output image frames are the image data allowing reproduction of the bullet time video, and include the specific position (e.g., the position corresponding to the point of regard) of the notable object when the view point position moves within the time range indicated by the time information and the view point position movement range indicated by the view point position information.

At step S111, it is, on the basis of the setting information (e.g., the image frame start position and the image frame end position) acquired in the processing of step S101, determined whether or not the processing for all of the input image frames F has ended. In a case where it is, at step S111, determined that the processing for all of the input image frames F has not ended yet, the processing proceeds to step S112.

At step S112, the input image frame acquiring section 103 acquires the input image frames F (e.g., the input image frames $F_{12}$ to $F_{N2}$) as a subsequent processing target input from each camera device 20. Note that the input image frames F (e.g., the input image frames $F_{12}$ to $F_{N2}$) acquired in the processing of step S112 are not supplied to the preprocessing section 104, but are supplied only to the video processing section 105.

In the processing of step S112, when the input image frames F (e.g., the input image frames $F_{12}$ to $F_{N2}$) as the subsequent processing target are acquired, the processing returns to the processing of step S105, and the processing of steps S105 to S112 (an image frame processing loop) is repeated.

That is, for the input image frames $F_{11}$ to $F_{N1}$ acquired at the time point t1 in the processing of step S102, tracking of the notable object (the object 2) and updating of the point of regard of the notable object (S105, S106), view point interpolation (S107), and correction of the camera posture and the scale (S108, S109) are, in the image frame processing loop, performed in a first image frame processing loop. Then, these frames are output as the output image frames (S110).

Moreover, for the input image frames $F_{12}$ to $F_{N2}$ at the time point t2, tracking of the notable object (the object 2) and updating of the point of regard of the notable object (S105, S106), view point interpolation (S107), and correction of the camera posture and the scale (S108, S109) are similarly performed in a second image frame processing loop. Then, these frames are output as the output image frames (S110). Subsequently, the processing is, in a similar manner, repeatedly performed at each time point t (the time points t3, t4, . . . , tT) in units of N image frames in third or later image frame processing loops.

By repeating such an image frame processing loop, the notable object (the object 2) included in the input image frames F is tracked (S105), and the point of regard of the notable object (the object 2) is updated (S106). Thus, even in a case where the notable object (the object 2) is moving, such a notable object can be tracked to continuously update the point of regard of the notable object.

Moreover, the view points for the notable object (the object 2) are interpolated (S107). Further, correction (the image processing) is performed such that the input image frame F (or the interpolated image frame F') when the notable object (the object 2) is imaged with the camera posture and camera position of each camera device 20 being in an ideal state is brought (S108, S109). Thus, the bullet time video centering on the notable object (the object 2) can be more smoothly reproduced.

As described above, in the image frame processing loop, tracking of the notable object (the object 2) and updating of the point of regard of the notable object (S105, S106), view point interpolation (S107), and correction of the camera posture and the scale (S108, S109) are, at each time point t, performed for the input image frames from the start position (e.g., the camera device 20-1) in view point movement to the end position (e.g., the camera device 20-N) in view point movement. In this manner, the processing in the image frame processing loop is performed for the N input image frames F at each time point t, and these frames are output as the output image frames to the display device 40. Thus, the bullet time video centering on (the point of regard of) the object 2 as the notable object can be displayed on the display device 40.

Figure 4:
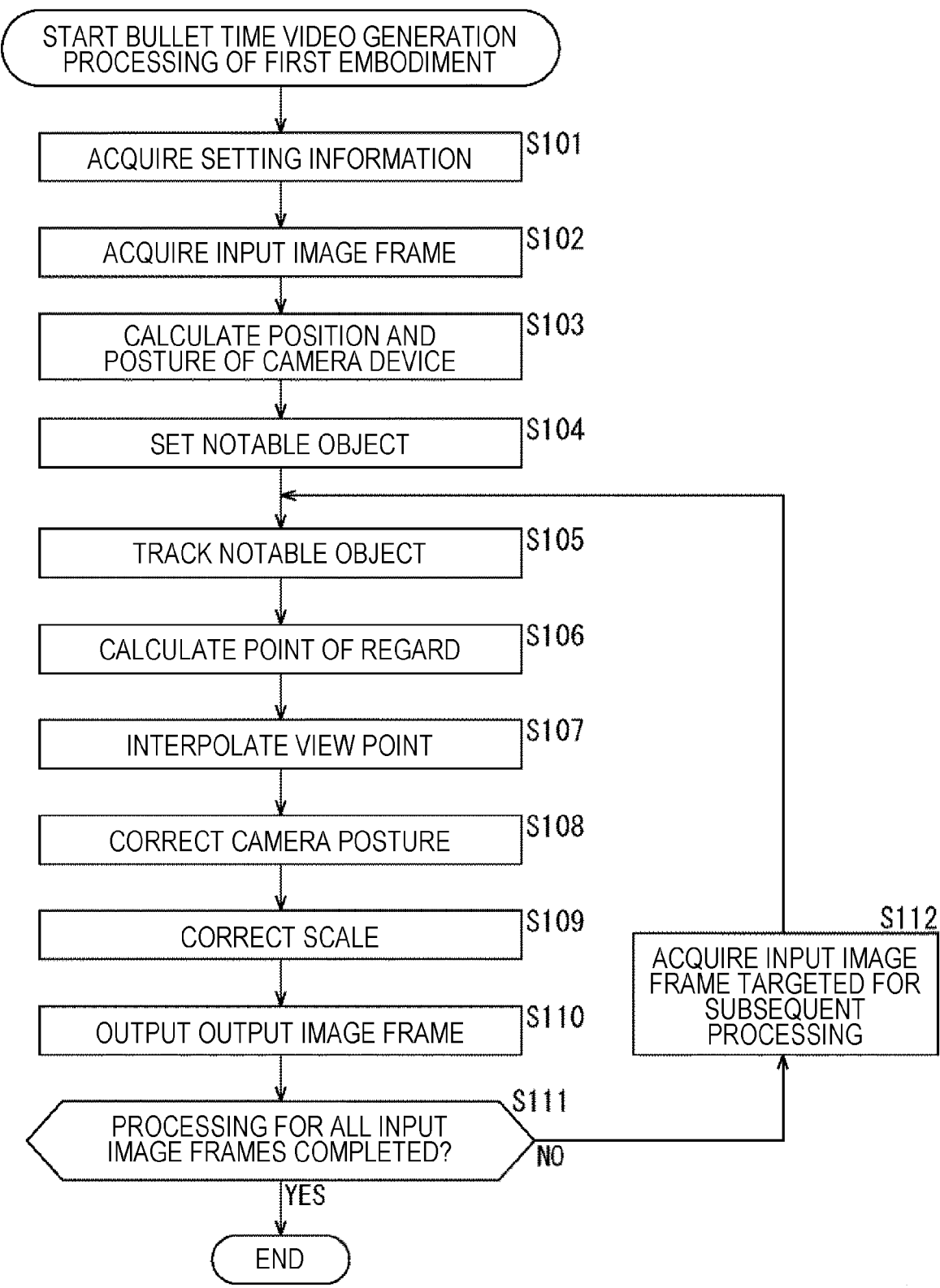
FIG. 4 is a flowchart for describing the flow of bullet time video generation processing of the first embodiment.

Then, in a case where it is, at step S111, determined that the processing for all of the input image frames F has ended, the bullet time video generation processing of FIG. 4 ends. For example, in a case where the time point t1 is set as the time information, the input image frame $F_{11}$ is herein the image frame start position, and the input image frame $F_{N1}$ is herein the image frame end position. Thus, when the processing for the input image frame $F_{N1}$ ends, it is determined that the processing for all of the image frames has ended.

Note that in the above-described example, the case where the processing is, at each time point t, performed in units of N image frames from the camera devices 20-1 to 20-N in the image frame processing loop has been described. However, such a processing unit is not limited to the N frames, and a predetermined number of frames can be employed as the processing unit. For example, the input image frames can be processed in any processing unit, such as processing only for a single input image frame F from a specific camera device 20 (e.g., the camera device 20-1) as a (bullet time video) display target (recording target) at a time point t.

That is, processing of only a single input image frame from a specific camera device 20 at each time point t is, as the processing unit per time point t, the minimum number of frames to be processed, and processing of the N input image frames from the camera devices 20-1 to 20-N is the maximum number of frames to be processed. Such a processing unit can be set as necessary. For example, the number of input image frames to be processed at each time point t is reduced, and in this manner, the processing such as view point interpolation (S107) and correction of the camera posture and the scale (S108, S109) is not necessary for the input image frames not targeted for displaying. Thus, throughput can be decreased.

Moreover, the case where the output image frames are output to the display device 40 by the output image frame output section 106 in the above-described processing of step S110 has been described. However, the output image frames may be recorded in the recording device (the later-described recording device 80 of FIG. 33) by the output image frame output section 106. In this case, when the user instructs reproduction of the bullet time video, the output image frames are read from the recording device, and then, the bullet time video is displayed on the display device 40.

The flow of the bullet time video generation processing of the first embodiment has been described above. In the bullet time video generation processing of the first embodiment, the notable object included in the input image frames F generated at the multiple different view point positions is constantly tracked, and the point P of regard of the notable object is updated on a steady basis. Thus, even in the case of the moving notable object, the bullet time video centering on (the point P of regard of) the notable object can be provided.

In other words, the output image frame output for reproducing the bullet time video is the input image frame processed such that the notable object is at the specific position on the output image frame when the view point position moves within the time range indicated by the time information and the view point position movement range indicated by the view point position information. Thus, the bullet time video centering on (the point of regard of) the notable object can be reproduced at any timing.

Note that in the bullet time video generation processing of FIG. 4, the view point interpolation processing of step S107 is the optional processing for generating a smoother bullet time video, and is not necessarily executed. Moreover, for the sake of convenience of description, the flow in which the input image frames F are acquired in the processing of step S102 after the setting information has been acquired in the processing of step S101 has been described. However, these types of processing may be reversed such that the setting information is acquired after the input image frames F have been acquired.

Figure 5:
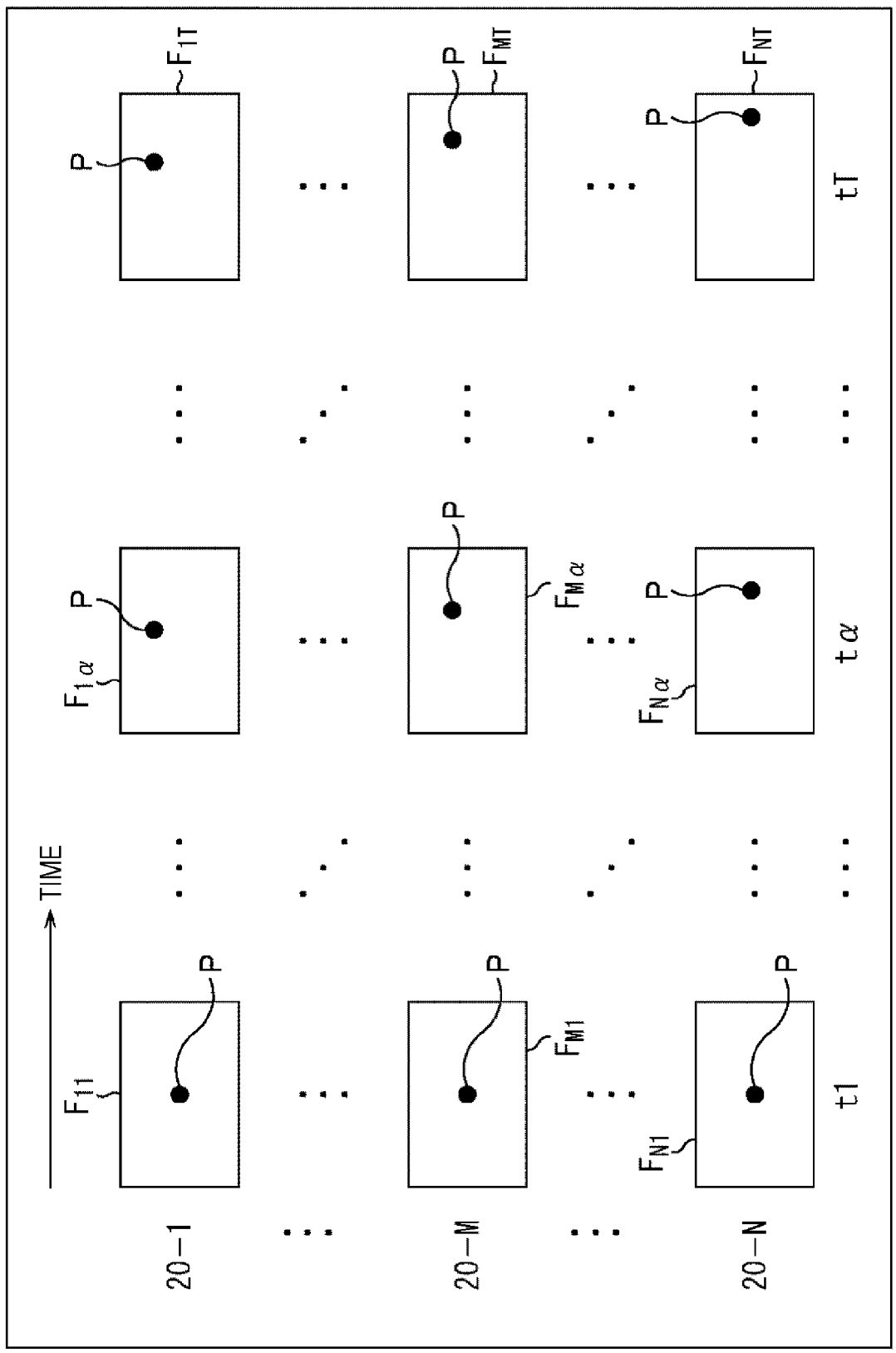
FIG. 5 is a chronological diagram of the image frames generated by each camera device.

FIG. 5 is, for each camera device 20 configured to generate the input image frames F, a chronological diagram of the input image frames F processed in the image frame processing loop (steps S105 to S112 of FIG. 4).

Note that in FIG. 5, a time direction is a direction from the left to the right as viewed in the figure, and the input image frames F generated by each camera device 20 and input to the video processing device 10 are arranged in chronological order from the left to the right as viewed in the figure. Moreover, in FIG. 5, the input image frames $F_1$, the input image frames $F_M$, and the input image frames $F_N$ are illustrated as representatives, these frames being generated by the camera device 20-1, the camera device 20-M (1<M<N), and the camera device 20-N of the multiple camera devices 20 forming the video processing system 1 of FIG. 1 and being input to the video processing device 10.

Further, in an example of FIG. 5, the input image frame $F_{11}$ is set as the image frame start position, and the input image frame $F_{NT}$ is set as the image frame end position.

In the video processing device 10, the input image frame acquiring section 103 sequentially acquires, according to the frame rate, the input image frame $F_{11}$, the input image frame $F_{12}$, ..., the input image frame $F_{1\alpha}$, ..., the input image frame $F_{1T}$ generated by the camera device 20-1 and input to the video processing device 10. Similarly for other camera devices 20, the input image frame acquiring section 103 sequentially acquires the input image frames $F_{M1}$ to $F_{MT}$ generated by the camera device 20-M and input to the video processing device 10 and the input image frames $F_{N1}$ to $F_{NT}$, for example.

The input image frames $F_{11}$ to $F_{N1}$ from each camera device 20 at the time point t1 will be focused herein. By the image frame processing loop, the notable object (the object 2) included in the input image frames $F_{11}$ to $F_{N1}$ is tracked, and the point P of regard is calculated (S105, S106 of FIG. 4). Thereafter, tracking of the notable object (the object 2) and updating of the point P of regard are similarly performed for the input image frames F from each camera device 20 at the time point t2 or later.

For example, the input image frames $F_{1\alpha}$ to $F_{N\alpha}$ at the time point tα will be focused. By the image frame processing loop, the notable object (the object 2) included in the input image frames $F_{1\alpha}$ to $F_{N\alpha}$ is tracked, and the point P of regard is calculated. In the case of the moving notable object (the object 2), the position of the point P of regard changes herein together with the notable object. However, in the image frame processing loop, tracking of the notable object is continuously performed for each input image frame F acquired in chronological order, and the point P of regard of the notable object is updated on the steady basis. Thus, the present technology can also respond to the change in the position of the point P of regard in association with movement of the notable object.

Thereafter, tracking of the notable object and updating of the point P of regard of the notable object are similarly performed at the time tα or later, and are continued from the input image frame $F_{11}$ set as the image frame start position to the input image frame $F_{NT}$ set as the image frame end position.

That is, in the case of the moving notable object, the point P of regard also changes over time. In this case, if the point P of regard is not updated, the bullet time video centering on (the point P of regard of) the notable object cannot be generated. For this reason, in the present technology, the point P of regard of the notable object included in the input image frames F acquired in chronological order is updated on the steady basis so that the bullet time video centering on (the point P of regard of) the notable object can be generated.

For example, in a case where movement of each player and timing of movement of each player cannot be expected in sports such as the baseball and the football, it is difficult to set the point P of regard in advance. However, in the present technology, the notable object is tracked, and the point P of regard is updated on the steady basis. Thus, the bullet time video centering on (the point P of regard of) the notable object can be generated at any timing. Moreover, the point P of regard of the notable object can be manually set by the user operation. However, such setting is an extremely-burdensome process.

Note that the input image frames F illustrated in chronological order for each camera device 20 in FIG. 5 show, as an example, a case where the view point interpolation processing of step S107 of FIG. 4 is not performed. On the other hand, FIG. 6 illustrates the case of performing such view point interpolation processing (S107).

Figure 6:
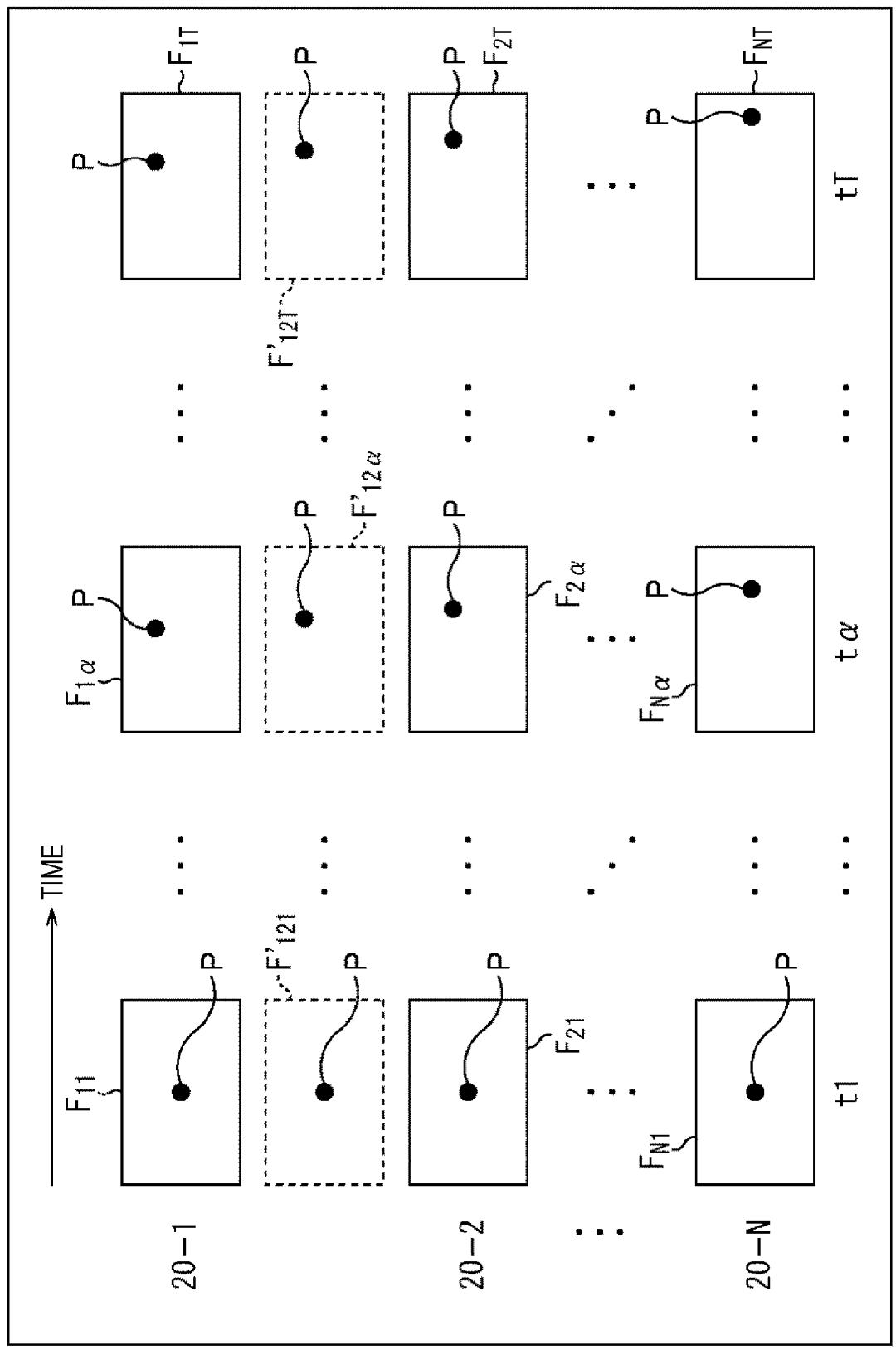
FIG. 6 is a chronological diagram of a relationship between the image frame and an interpolated image frame.

That is, in FIG. 6, the image frame interpolation processing is, for example, performed using the input image frame $F_{11}$ generated by the camera device 20-1 and the input image frame $F_{21}$ generated by the camera device 20-2 among the input image frames $F_{11}$ to $F_{N1}$, and in this manner, the interpolated image frame $F'_{121}$ corresponding to the view point position between the camera device 20-1 and the camera device 20-2 is generated. Similarly, the image frame interpolation processing is performed using the input image frame $F_1$ and the input image frame $F_2$, and in this manner, the virtual view point for the point P of regard of the notable object, such as the interpolated image frame $F'_{12\alpha}$ or the interpolated image frame $F'_{12T}$, can be interpolated between the camera device 20-1 and the camera device 20-2.

Note that for the sake of convenience of description, FIG. 6 illustrates, as an example, the case where the image frame interpolation processing is performed using the input image frame $F_1$ and the input image frame $F_2$. However, the interpolated image frames F' can be similarly generated in the case of using the input image frames F generated in other camera devices 20, such as the input image frames $F_2$ and $F_3$ or the input image frames $F_3$ and $F_4$.

Moreover, FIG. 6 illustrates the case where the virtual view point is interpolated between adjacent ones of the physically-placed camera devices 20, i.e., the input image frames are interpolated in a spatial direction. However, the input image frames can be interpolated in the time direction. For example, the image frame interpolation processing is performed using the input image frame $F_{11}$ and the input image frame $F_{12}$ input from the camera device 20-1. In this manner, the interpolated image frame F' can be generated between the input image frame $F_{11}$ and the input image frame $F_{12}$ in terms of time. Then, the interpolated image frame F' generated as described above is used so that slow-motion reproduction can be realized, for example.

Next, the detailed processing contents of each step in the bullet time video generation processing of FIG. 4 will be described with reference to FIGS. 7 to 16.

(Camera Position/Posture Calculation Processing)

First, the detailed processing contents of the camera position/posture calculation processing in the processing of step S103 of FIG. 4 will be described with reference to FIGS. 7 to 9.

In this camera position/posture calculation processing, the predetermined image processing is performed for the input image frames F input from each camera device 20, thereby calculating the camera position and camera posture of each camera device 20.

Figure 7:
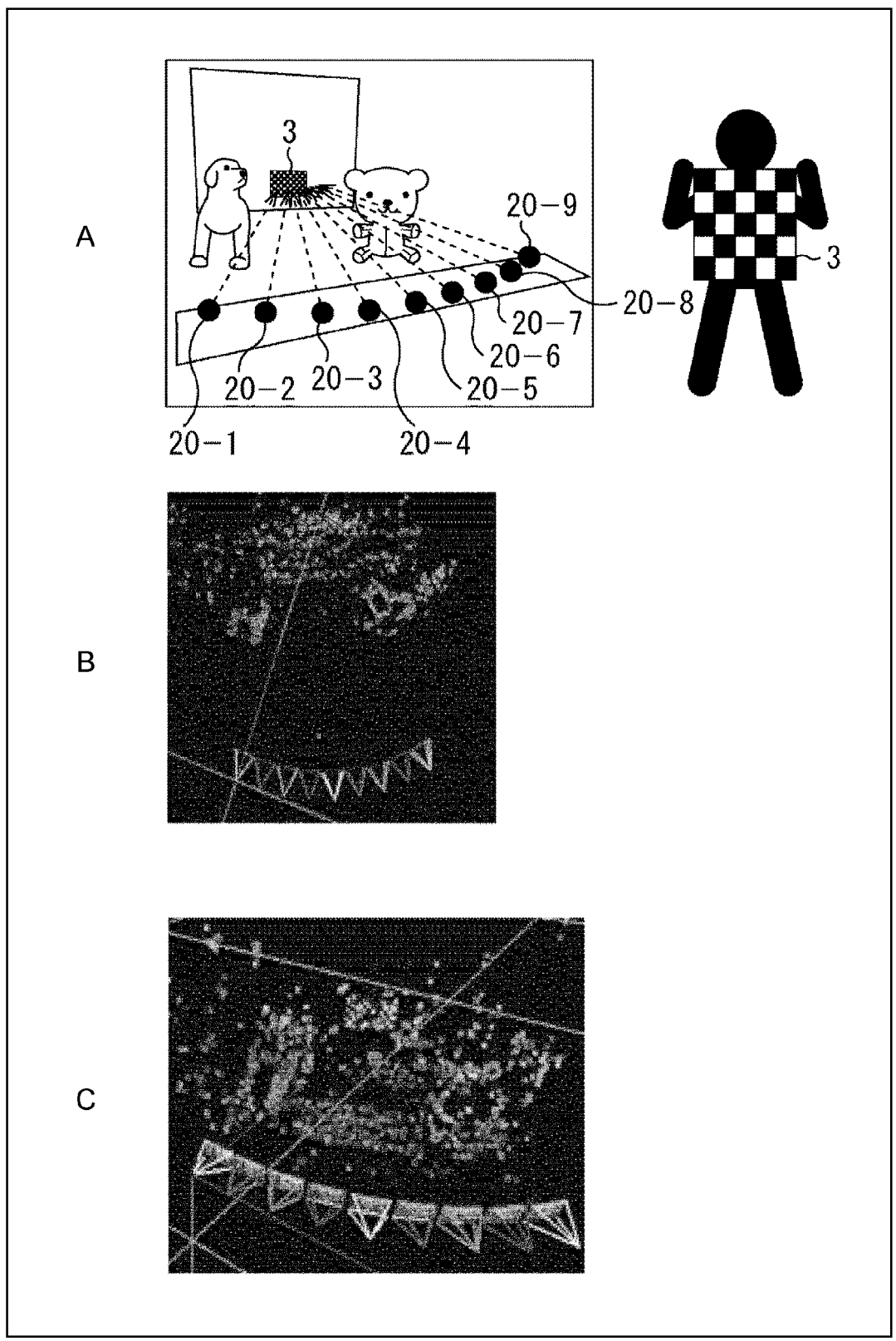
FIG. 7 is a view for describing camera position/posture calculation processing.

For example, a chessboard in such a checker board design (pattern) that squares in two colors (e.g., white and black) are alternately arranged is herein prepared as a known object 3 as illustrated in A of FIG. 7. Such a chessboard is placed at such a position that the chessboard can be imaged by each camera device 20 (the camera devices 20-1 to 20-9 in the example of A of FIG. 7) placed at a predetermined position. In this manner, the known object 3 is imaged by each camera device 20. With this arrangement, each camera device 20 can acquire the input image frames F including the known object 3 as the object and imaged at the multiple different view point positions. Note that B and C of FIG. 7 illustrate a state where the object including the known object 3 is viewed from different view point positions.

The predetermined image processing is performed for the input image frames F acquired as described above and including the known object 3 imaged at the multiple different view point positions, and therefore, the camera position and camera posture of each camera device 20 can be obtained. A technology can be used herein, the technology being called "structure from motion" as the method for simultaneously recovering the three-dimensional shape of the object and the camera position and camera posture of each camera device 20 from the input image frames F (the image data) imaged at the multiple view point positions.

Moreover, the case where the known object 3 (e.g., the chessboard) as a given object is, without dependence on imaging environment of the camera devices 20, utilized for calculating the camera position and camera posture of each camera device 20 has been described herein as one example. However, even in the case of not utilizing the known object 3, the predetermined image processing is applied so that the camera position and camera posture of each camera device 20 can be obtained.

Note that the structure from motion is, for example, specifically described in "Noah Snavely, Steven M. Seitz, Richard Szeliski, 'Photo tourism: Exploring photo collections in 3D,' ACM Transactions on Graphics (SIGGRAPH Proceedings), 25(3), 2006, 835-846".

Figure 8:
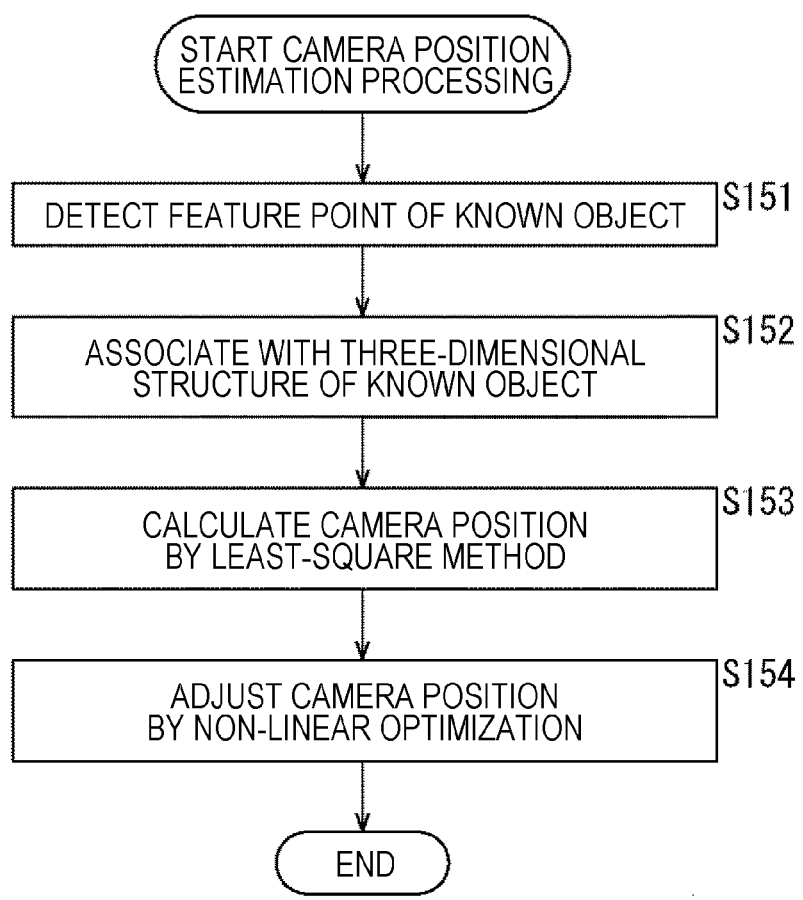
FIG. 8 is a flowchart for describing camera position estimation processing.
Figure 9:
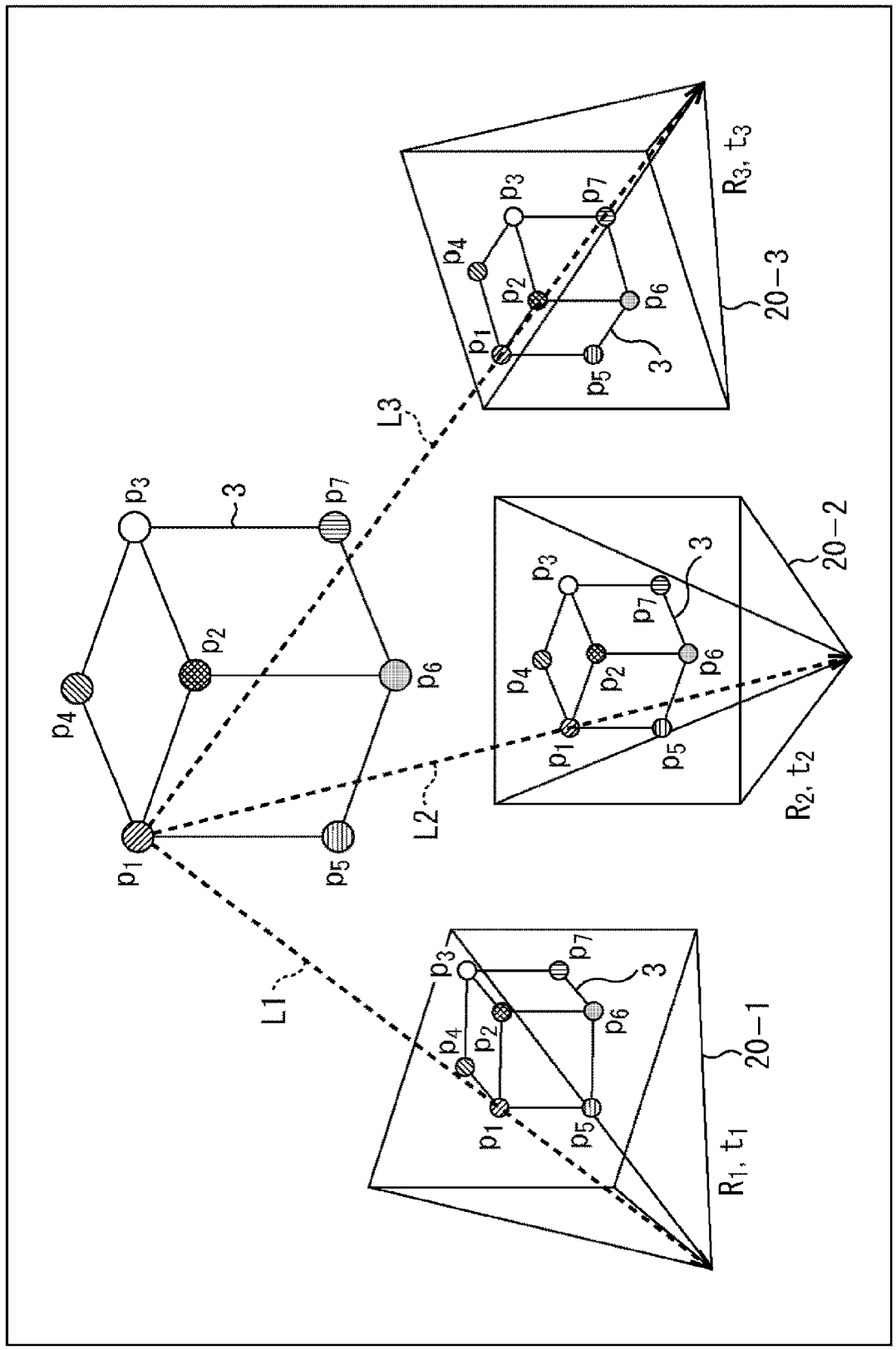
FIG. 9 is a view of visibility of an object according to a camera position.

The method for calculating the camera position will be more specifically described herein with reference to FIGS. 8 and 9. FIG. 8 is a flowchart for describing camera position estimation processing.

In this camera position estimation processing, analysis processing is first performed for the multiple input image frames F from each camera device 20, and a feature point of the known object 3 (e.g., the chessboard) included in the input image frames F is detected (S151). Next, the feature point detected on the input image frames F in the processing of step S151 is associated with the three-dimensional structure (the 3D coordinate) of the known object 3 (e.g., the chessboard) (S152). Next, a formula obtained from an association between the known object 3 and the three-dimensional structure by the processing of step S152 is, using a least-square method, solved to calculate the camera position (S153). Then, non-linear optimization is performed to minimize a reprojection error, thereby adjusting the camera position calculated in the processing of step S153 (S154).

For example, in a case where the known object 3 includes a regular hexahedron as illustrated in FIG. 9, when the camera devices 20-1 to 20-3 are placed at the periphery of the known object 3, visibility of the known object 3 is herein different according to the camera position of each camera device 20. Specifically, in a case where a vertex P1 of eight vertices of the regular hexahedron as the known object 3 is focused, the position of the vertex P1 of the known object 3 imaged by the camera devices 20-1 to 20-3 varies. However, the shape of the regular hexahedron as the known object 3 is recognized in advance. Thus, the input image frames $F_1$ to $F_3$ from the camera devices 20-1 to 20-3 are analyzed so that the camera position of each camera device 20 can be obtained.

As described above, in the camera position/posture calculation processing, the camera position and the camera posture are calculated for each camera device 20 placed at the periphery of the object 2. Note that the camera position/posture calculation processing described herein is one example of the processing, and other well-known technologies may be used to calculate the camera position and the camera posture.

(Notable Object Setting Processing)

Next, the detailed processing contents of the notable object setting processing in the processing of step S104 of FIG. 4 will be described with reference to FIGS. 10 and 11.

In this notable object setting processing, the notable object is set by an automatic setting mode as the mode for detecting (automatically detecting), as the notable object, the object 2 included in the input image frames F or a manual setting mode as the mode for specifying (manually specifying), as the notable object, the object 2 included in the input image frames F by the user. Note that an automatic-plus-manual setting mode as a combined mode of automatic detection and manual specification may be employed.

Figure 10:
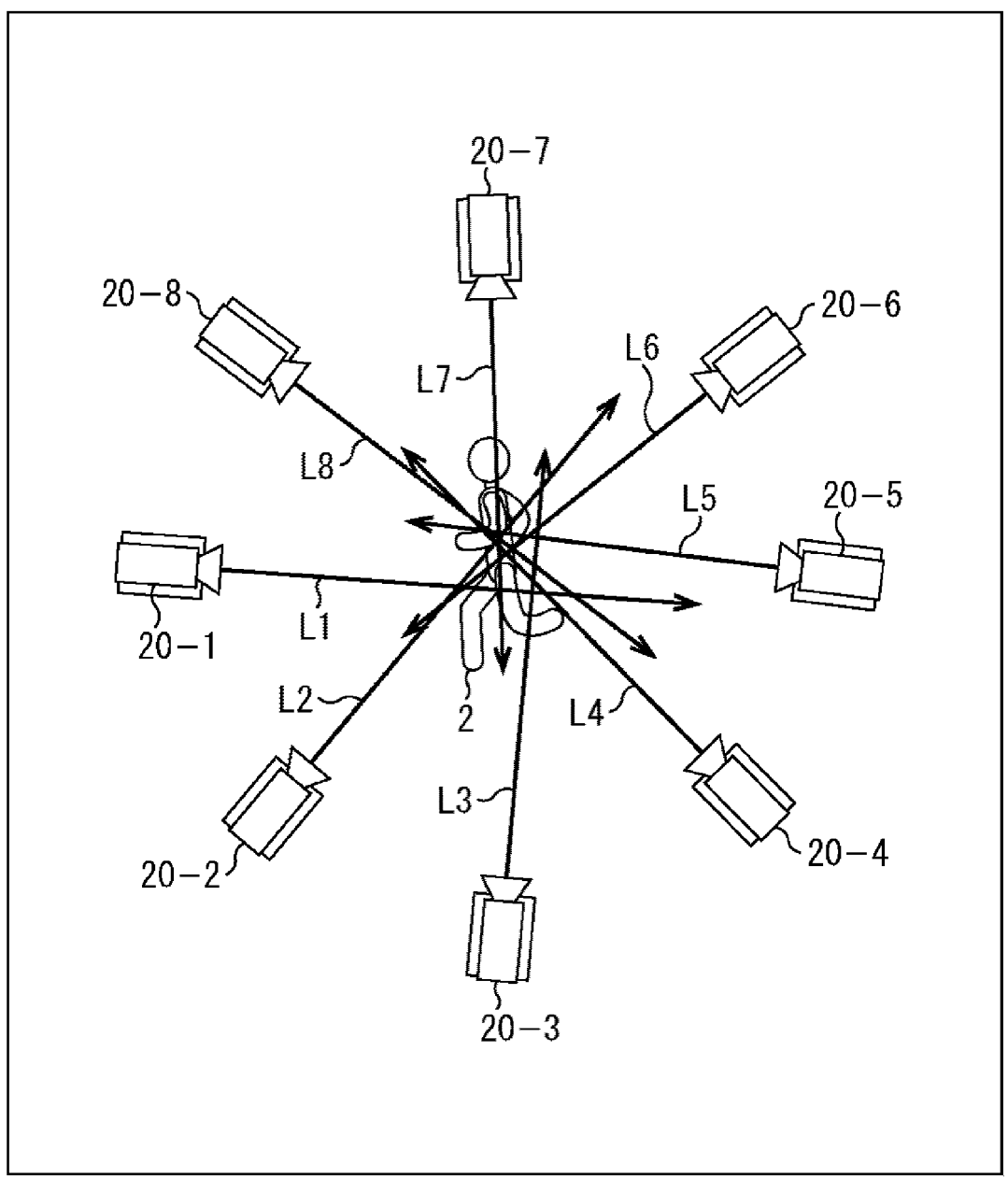
FIG. 10 is a view for describing an example of settings for a notable object in an automatic setting mode.

FIG. 10 is a view for describing an example of settings for the notable object in the automatic setting mode. In FIG. 10, the optical axis L (of the imaging optical system) of each camera device 20 is indicated by an arrow extending from each camera device 20 in a case where eight camera devices 20-1 to 20-8 are placed to surround the periphery of the notable object (the object 2).

The predetermined image processing is herein performed for the input image frames F input from each camera device 20, and therefore, it can be estimated that the object 2 is present in a region on a three-dimensional space, the optical axis L1 of the camera device 20-1, the optical axis L2 of the camera device 20-2, the optical axis L3 of the camera device 20-3, the optical axis L4 of the camera device 20-4, the optical axis L5 of the camera device 20-5, the optical axis L6 of the camera device 20-6, the optical axis L7 of the camera device 20-7, and the optical axis L8 of the camera device 20-8 concentrating on the region, for example. Then, in the automatic setting mode, an object (the object 2) in the region where the object 2 is expected to be present is set as the notable object.

Note that the method for automatically detecting the object is, for example, specifically described in "N. D. F. Cambell, G. Vogiatzis, C. Hernandez, and R. Cipolla, 'Automatic Object Segmentation from Calibrated Images,' In Proceedings 8th European Conference on Visual Media Production, (CVMP), 2011".

Figure 11:
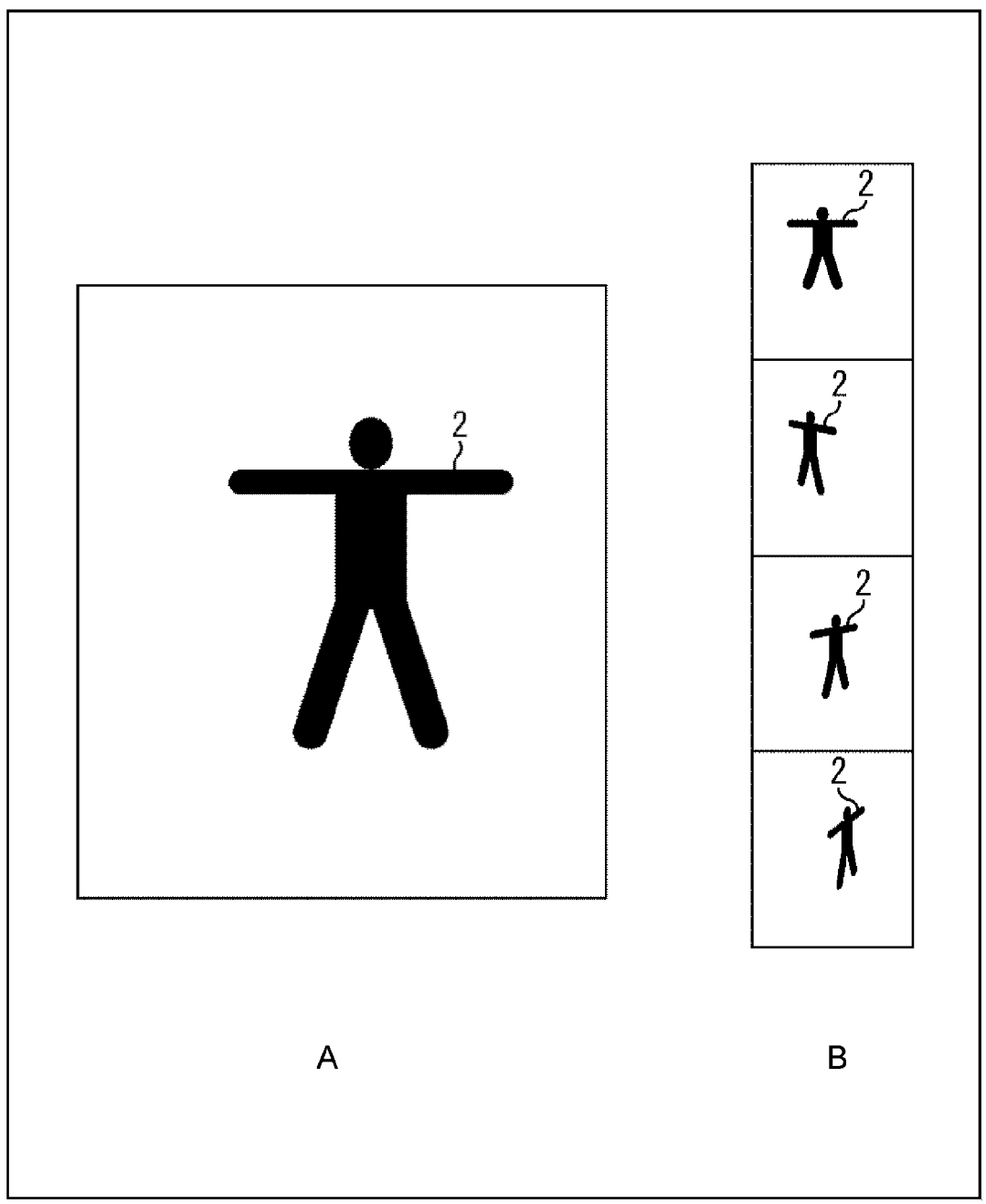
FIG. 11 is a view for describing an example of settings for the notable object in a manual setting mode.

Moreover, FIG. 11 is a view for describing an example of settings for the notable object in the manual setting mode. In A of FIG. 11, the input image frame F from the camera device 20 placed in front of the object 2 among the camera devices 20-1 to 20-N is displayed on the display device 40. For example, by predetermined operation such as mouse operation or tap operation, the user selects (marks), e.g., the object 2 or a background region included in the displayed input image frame F. In this manner, the object 2 can be set as the notable object.

Note that B of FIG. 11 illustrates the input image frames F generated at different points of view by four camera devices 20 placed at other locations than the front of the object 2. The user can check the input image frames F at these points of view while setting a desired object as the notable object. Moreover, in the case of setting the manual setting mode, the setting screen (the later-described setting screen 300 of FIG. 22) on which the input image frames F of A and B of FIG. 11 are displayed is operated by the user so that the notable object can be set, for example.

Further, a technology such as graph cuts used for image region extraction is, for example, used as the automatic-plus-manual setting mode as the combination of automatic detection and manual specification, thereby extracting an optimal region included in the input image frames F. In a case where the notable object is included in such a region, the region can be set as the notable object by the user operation. Note that in the case of setting the automatic-plus-manual setting mode, the user operates, for example, the setting screen (the later-described setting screen 300 of FIG. 22) as in the case of the manual setting mode, and in this manner, the notable object can be set.

Note that the method for setting the object by the combination of automatic detection and manual specification is, for example, specifically described in "Yuri Boykov, Gareth Funka-Lea, 'Graph Cuts and Efficient N-D Image Segmentation,' In International Journal of Computer Vision (IJCV), vol. 70, no. 2, pp. 109-131, November, 2006".

Moreover, the notable object is not necessarily set for the input image frames F at all of the view point positions. For example, it is set such that the notable object set for the input image frame F at a certain view point position is also detected from the input image frames F at other view point positions, and therefore, setting of the notable object can be facilitated. For example, in the case of setting the notable object for the input image frames $F_1$ and $F_2$ from the camera devices 20-1 and 20-2, the notable object is also set for the input image frames F from other camera devices 20 (e.g., the camera device 20-3 and the camera device 20-4) by means of analysis results (learning results) of the notable object (the notable object model) included in the input image frame $F_1$ and the input image frame $F_2$. For example, information regarding a color can be herein learnt for the notable object (the notable object model).

As described above, in the notable object setting processing, the notable object is set according to the mode such as the automatic setting mode or the manual setting mode. Note that the notable object setting processing described herein is one example of the processing, and other well-known technologies may be used to set the notable object.

(Notable Object Tracking Processing)

Next, the detailed processing contents of the notable object tracking processing in the processing of step S105 of FIG. 4 will be described with reference to FIG. 12.

In this notable object tracking processing, the notable object (the notable object model) set in the above-described notable object setting processing is learnt, and the notable object targeted for tracking is tracked using the notable object model, for example.

For example, the notable object included in the input image frames F is herein tracked for each input image frame F input from the camera devices 20. For example, movement of the notable object (the notable object model) between the temporally-continuous input image frames $F_1$, such as the input image frame $F_{11}$ and the input image frame $F_{12}$, of the input image frames $F_{11}$ to $F_{1T}$ from the camera device 20-1 is estimated for tracking (object tracking) the notable object. For example, a tracking target (notable object) region is set in a certain input image frame F, and a feature amount (e.g., the degree of similarity of color histogram) in such a region is used to search a searching region on the subsequent input image frame F (to obtain such a position that the degree of similarity is maximum). In this manner, the tracking target (the notable object) can be tracked.

Figure 12:
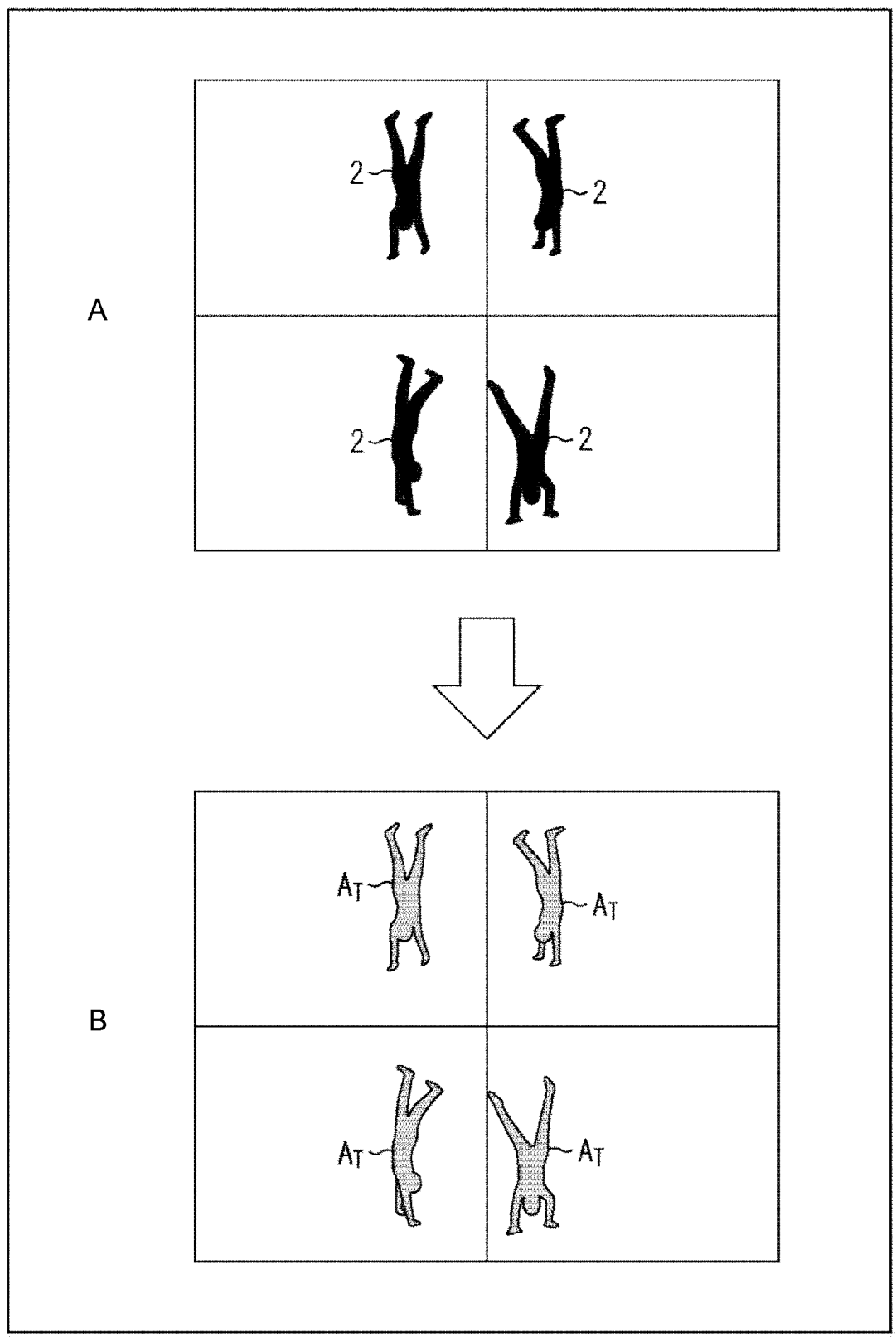
FIG. 12 is a view for describing notable object tracking processing.

For example, A of FIG. 12 illustrates four input image frames F when the object 2 is imaged by four camera devices 20 different from each other in the view point position. In the notable object setting processing (S104 of FIG. 4), the object 2 included in each input image frame F is set as the notable object. In this case, a region $A_T$ (a gray region in B of FIG. 12) in each input image frame F is, as illustrated in B of FIG. 12, searched as the tracking target (notable object) region. Such processing is repeated for each of the temporally-continuous input image frames F, and in this manner, the notable object is tracked.

Note that upon tracking of the notable object, tracking may be performed by means of an estimation method using a feature amount such as colors or histograms of oriented gradients (HoG), the estimation method including, e.g., a Kalman filter, a particle filter, or mean shift. Moreover, in a case where the notable object targeted for tracking is recognized as a human, a human body model can be used.

Further, in the case of tracking the notable object, a processing result (the point of regard) of the point-of-regard calculation processing (S106 of FIG. 4) is fed back, and information regarding the point of regard of the notable object is utilized together with the input image frames F from each camera device 20. In this manner, the accuracy of tracking of the notable object can be improved.

Note that the method for tracking the notable object is, for example, specifically described in "D. Comaniciu, V. Ramesh, and P. Meer, 'Real-time tracking of non-rigid objects using mean shift,' Proc. IEEE Conf. Computer Vision and Pattern Recognition, pp. 142-149, 2000". or "Jian Sun, Weiwei Zhang, Xiaoou Tang, and Heung-Yeung Shum, 'Bi-directional tracking using trajectory segment analysis,' In Proceedings of the Tenth IEEE International Conference on Computer Vision (ICCV'05) Volume 1, pp. 717-724, 2005".

As described above, in the notable object tracking processing, the notable object set in the processing of step S104 is tracked. Note that the notable object tracking processing described herein is one example of the processing, and other well-known technologies may be used to track the notable object.

(Point-of-Regard Calculation Processing)

Next, the detailed processing contents of the point-of-regard calculation processing in the processing of step S106 of FIG. 4 will be described with reference to FIG. 13.

In this point-of-regard calculation processing, the most important portion of the notable object (the object 2) tracked in the above-described notable object tracking processing is taken as the point of regard, and the position of such a point of regard is calculated.

Figure 13:
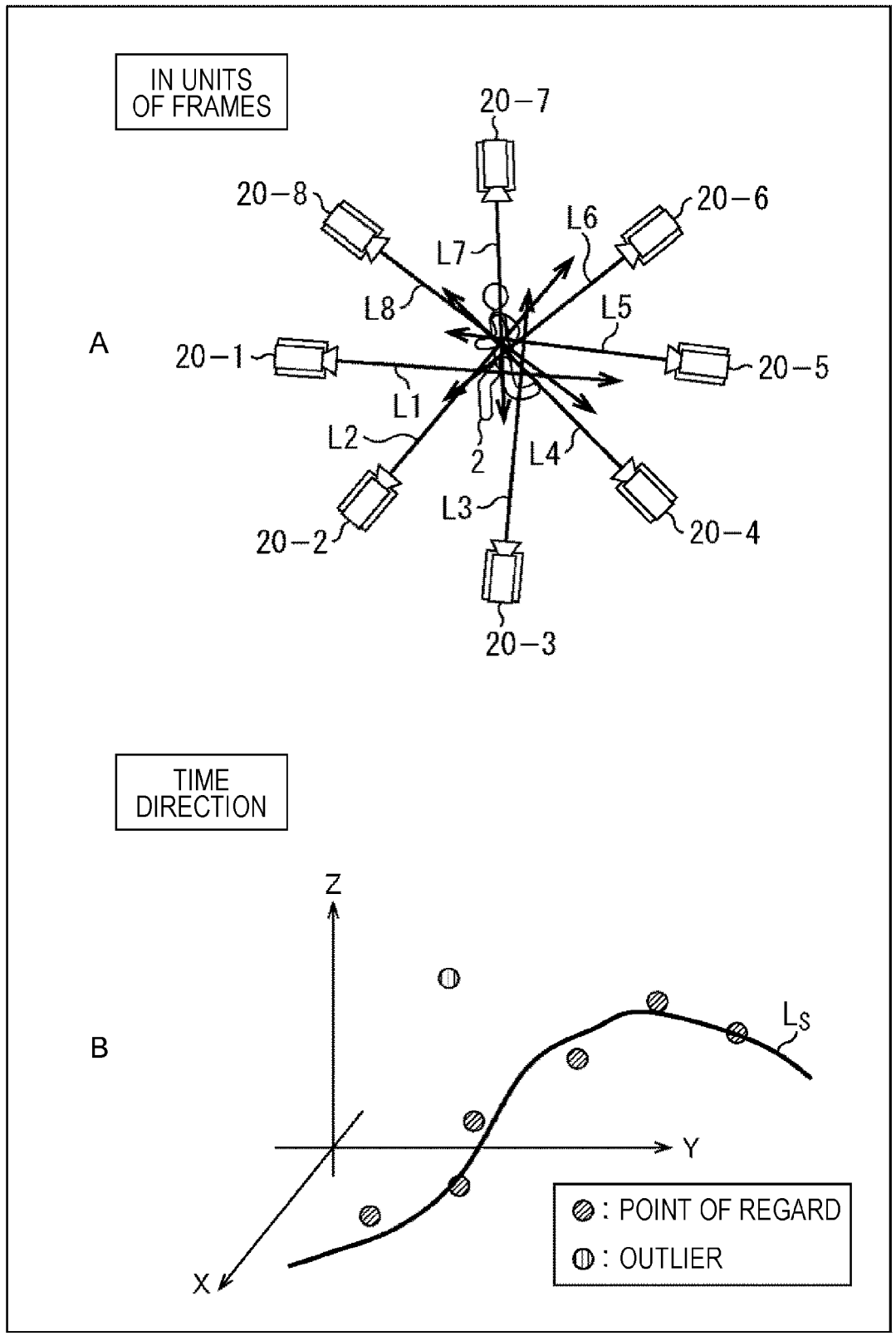
FIG. 13 is a view for describing point-of-regard calculation processing.

In a case where eight camera devices 20-1 to 20-8 are placed to surround the periphery of the notable object (the object 2) as illustrated in A of FIG. 13, the most important portion of the notable object (the object 2) included in the input image frames F is herein taken as the point of regard for each input image frame F from the camera devices 20, i.e., in units of image frames.

For example, (the position of) the center of gravity of the notable object can be the point of regard as the most important portion of the notable object. Alternatively, a position with the shortest distance to (the position of) the center of gravity may be taken as the point of regard when the optical axes L1 to L8 of the camera devices 20-1 to 20-8 penetrate (the position of) the center of gravity of the notable object on the input image frame F as a two-dimensional image. As another alternative, the three-dimensional model of the notable object may be generated by a method such as visual hull or multi view stereo (MVS), and (the position of) the center of gravity of the three-dimensional model may be taken as the point of regard.

Note that the method for generating the three-dimensional model is, for example, specifically described in "Wojciech Matusik, Chris Buehler, Ramesh Raskar, Steven J. Gortler, and Leonard McMillan, 'Image-Based Visual Hulls,' SIGGRAPH 2000".

Moreover, a low-pass filter is used for the three-dimensional position of the notable object included in the temporally-continuous input image frames F input from each camera device 20 so that smooth point-of-regard movement in the time direction can be realized. Further, as illustrated in B of FIG. 13, the outlier of the point of regard is, as the preprocessing for smoothing by the low-pass filter, determined by statistical processing, and the path $L_s$ (a notable object path $L_s$) of the point of regard of the notable object is produced with the outlier being removed according to a determination result. In this manner, the more accurate path $L_s$ of the point of regard can be produced. That is, in B of FIG. 13, the path $L_s$ indicated by a solid line indicates actual movement of the point of regard of the notable object, and a point apart from the path $L_s$ is excluded as the outlier.

As described above, in the point-of-regard calculation processing, the point of regard of the notable object tracked in the notable object tracking processing (S105 of FIG. 4) is calculated. Note that the point-of-regard calculation processing described herein is one example of the processing, and other well-known technologies may be used to calculate the point of regard.

(View Point Interpolation Processing)

Next, the detailed processing contents of the view point interpolation processing in the processing of step S107 of FIG. 4 will be described with reference to FIG. 14.

In this view point interpolation processing, the virtual view point for the notable object is interpolated between adjacent ones of the physically-placed camera devices 20 by means of the input image frames F input from each camera device 20.

Figure 14:
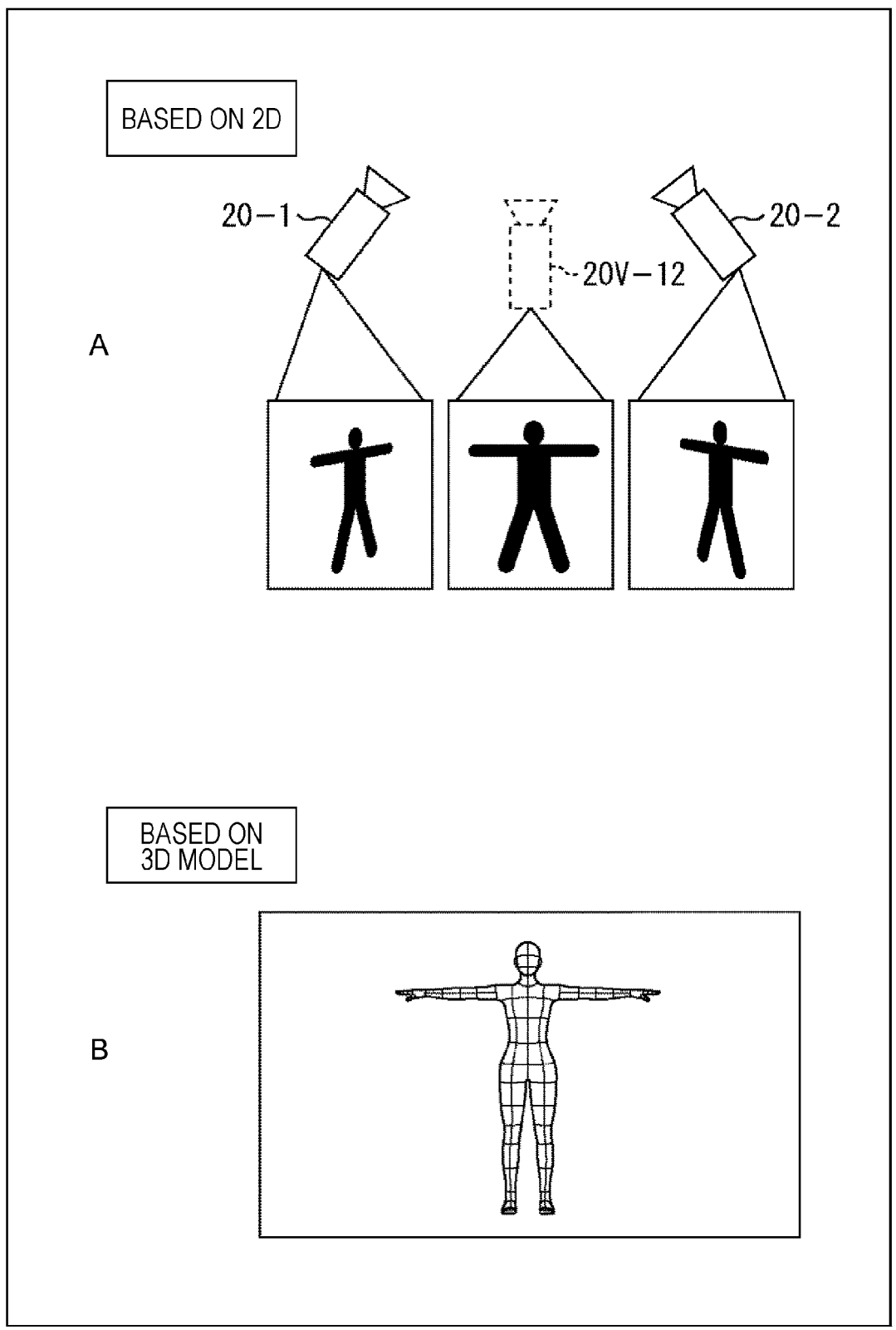
FIG. 14 is a view for describing view point interpolation processing.

A of FIG. 14 is a view for describing view point interpolation in the case of using the method based on the two dimensions. In A of FIG. 14, the image frame interpolation processing is performed using the input image frame $F_1$ (e.g., the input image frame $F_{11}$) and the input image frame $F_2$ (e.g., the input image frame $F_{21}$) input from the camera devices 20-1 and 20-2 arranged adjacent to each other. In this manner, the interpolated image frame F' corresponding to the camera position of the camera device (the camera device 20V-12 in the figure) virtually placed between the camera device 20-1 and the camera device 20-2 can be generated. Note that the interpolated image frame F' is not limited to a single frame, and multiple interpolated image frames F' corresponding to multiple points of view may be generated.

Note that the view point interpolation method based on the two dimensions is, for example, specifically described in "Steve Seitz, Chuck Dyer, 'View Morphing,' SIGGRAPH 1996".

B of FIG. 14 is a view for describing view point interpolation in the case of using the method based on the three dimensions. In B of FIG. 14, the three-dimensional model of the notable object is generated on the basis of the input image frames F input from each camera device 20, and in this manner, a view point position in a case where the three-dimensional mode of the notable object is viewed from an optional direction can be produced. This can interpolate the view point between the camera devices 20-1 and 20-2 arranged adjacent to each other, for example.

Note that the view point interpolation method based on the three dimensions is, for example, specifically described in "Wojciech Matusik, Chris Buehler, Ramesh Raskar, Steven J. Gortler, and Leonard McMillan, 'Image-Based Visual Hulls,' SIGGRAPH 2000".

As described above, in the view point interpolation processing, the (virtual) view point for the notable object is interpolated between adjacent ones of the physically-placed camera devices 20. Note that the view point interpolation processing described herein is one example of the processing, and other well-known technologies may be used to interpolate the view point. Moreover, in the bullet time video generation processing (FIG. 4), this view point interpolation processing is the optional processing for generating the smoother bullet time video, and such processing is executed as necessary. For example, in a case where the camera device 20 cannot be placed at a desired position due to limitations on placement of the camera device 20, this view point interpolation processing is performed so that the view point for the notable object can be increased.

(Camera Posture Correction Processing)

Next, the detailed processing contents of the camera posture correction processing in the processing of step S108 of FIG. 4 will be described with reference to FIG. 15.

In this camera posture correction processing, in a case where the direction of the optical axis L (of the imaging optical system) of the camera device 20 is, for example, shifted from the point of regard of the notable object (the object 2), projective transformation is performed such that the direction of the optical axis L (of the imaging optical system) of the camera device 20 faces the direction of the point of regard of the notable object (the object 2). In this manner, the camera posture is corrected.

Figure 15:
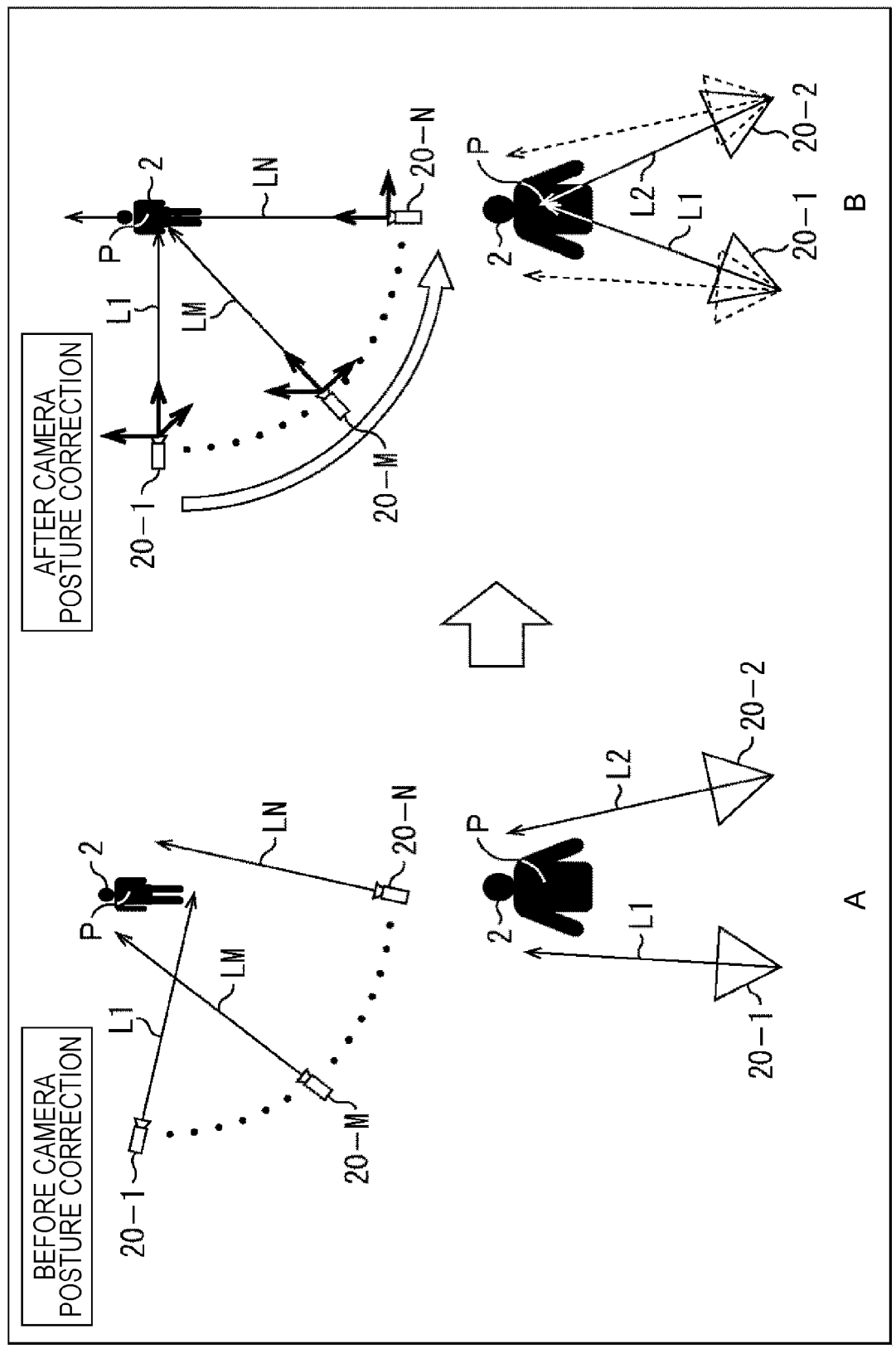
FIG. 15 is a view for describing camera posture correction processing.

In FIG. 15, A and B of FIG. 15 each schematically illustrate the camera posture of each camera device 20 before and after camera posture correction.

Of the optical axes L (of the imaging optical systems) of the camera devices 20-1 to 20-N, the optical axis L1 of the camera device 20-1, the optical axis LM of the camera device 20-M, and the optical axis LN of the camera device 20-N are illustrated as representatives in an upper view of A of FIG. 15. However, the camera postures (the imaging directions) of these camera devices 20 are not ideal postures, and for this reason, the direction of the optical axis L indicated by an arrow extending from each camera device 20 is shifted from the point P of regard of the notable object (the object 2). Note that a lower view of A of FIG. 15 illustrates, in closeup, a state in which the direction of the optical axis L of each camera device 20 is shifted from the point P of regard of the notable object (the object 2).

In the camera posture correction processing, the camera posture is corrected such that the input image frame F imaged in a case where the camera posture of the camera device 20 is not the ideal posture as illustrated in A of FIG. 15 is brought into the input image frame F imaged in a case where the camera posture is the ideal posture. That is, as illustrated in an upper view of B of FIG. 15, the input image frame F subjected to camera posture correction is imaged in such a state that the direction of the optical axis L1 of the camera device 20-1, the direction of the optical axis LM of the camera device 20-M, and the direction of the optical axis LN of the camera device 20-N face the direction of the point P of regard of the notable object (the object 2). Note that a lower view of B of FIG. 15 illustrates, in closeup, a state in which the direction of the optical axis L of each camera device 20 faces the direction of the point P of regard of the notable object (the object 2).

As described above, in the camera posture correction processing, the position of the point P of regard of the notable object is constantly updated to an accurate position by the point-of-regard calculation processing (S106 of FIG. 4) even in a case where the notable object is (strenuously) moving. Thus, the camera posture of each camera device 20 can be corrected to the ideal posture with reference to the point P of regard by the image processing.

As described above, in the camera posture correction processing, the camera posture is corrected such that the input image frame F generated in a case where the camera posture is the ideal posture is brought. Note that the camera posture correction processing described herein is one example of the processing, and other well-known technologies may be used to correct the camera posture.

(Scale Correction Processing)

Next, the detailed processing contents of the scale correction processing in the processing of step S109 of FIG. 4 will be described with reference to FIG. 16.

In this scale correction processing, in a case where the camera position of the camera device 20 is, for example, shifted back and forth in the optical axis direction from the ideal position, scale correction is performed such that the input image frame F (or the interpolated image frame F') generated in a case where the camera position is the ideal position are brought.

Figure 16:
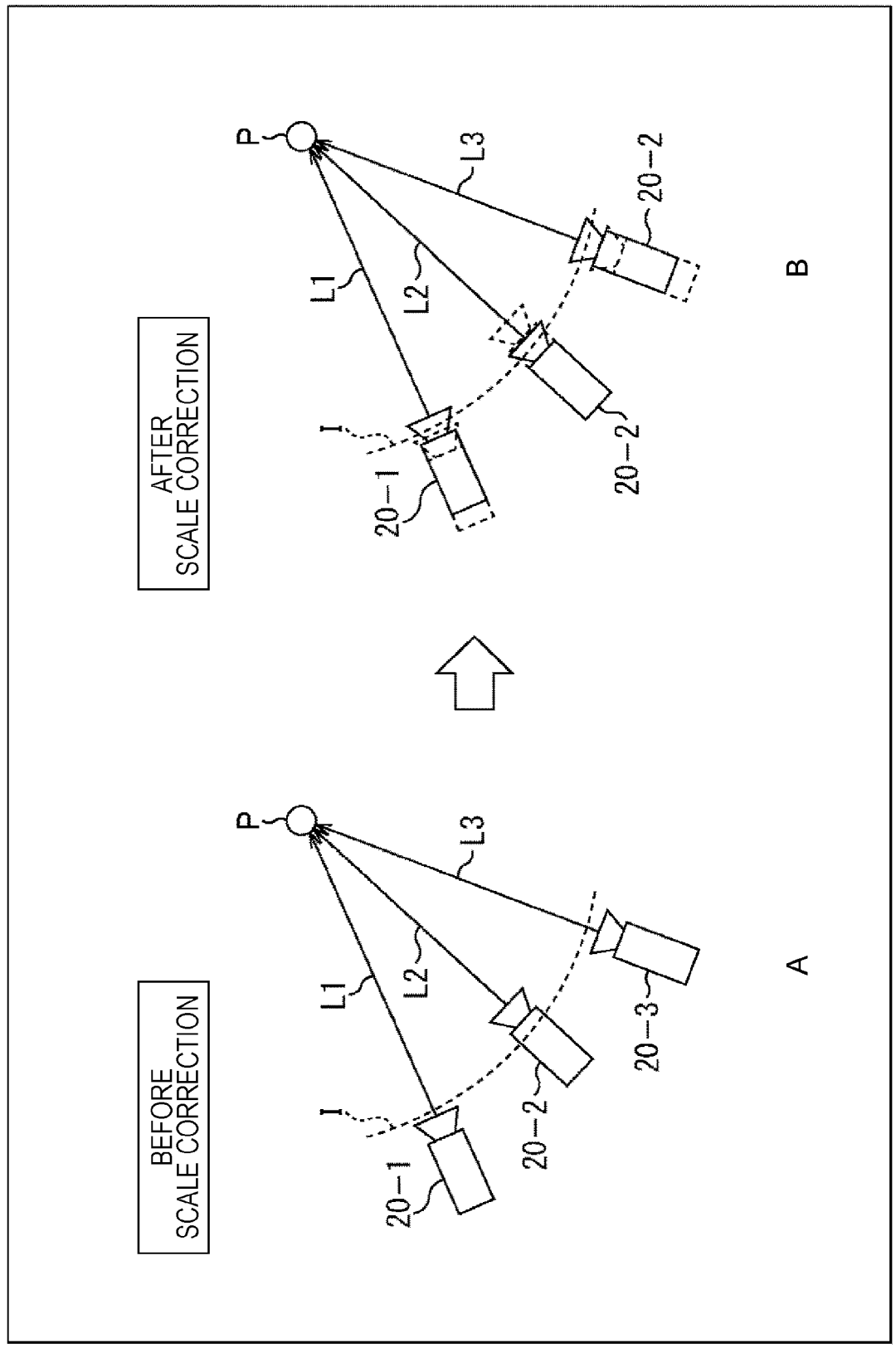
FIG. 16 is a view for describing scale correction processing.

In FIG. 16, A and B of FIG. 16 each schematically illustrate the camera position of each camera device 20 before and after scale correction. Note that in FIG. 16, a dashed line I indicates the ideal camera position.

Of the optical axes L (of the imaging optical systems) of the camera devices 20-1 to 20-N, the optical axis L1 of the camera device 20-1, the optical axis L2 of the camera device 20-2, and the optical axis L3 of the camera device 20-3 are illustrated as representatives in A of FIG. 16. The camera positions of the camera device 20-1 and the camera device 20-3 are herein, with reference to the point P of regard of the notable object, shifted backward in the optical axis direction from the ideal positions. Moreover, the camera position of the camera device 20-2 is, with reference to the point P of regard, shifted forward in the optical axis direction from the ideal position. That is, the camera positions of the camera devices 20-1 to 20-3 are not the ideal positions.

In the scale correction processing, scale correction is performed in such a manner that each input image frame F is zoomed in or out according to the distance to the point P of regard of the notable object such that the input image frame F imaged in a case where the camera position of the camera device 20 is not the ideal position as illustrated in A of FIG. 16 is brought into the input image F imaged in a case where the camera position is the ideal position. That is, as illustrated in B of FIG. 16, the input image frames F subjected to scale correction are taken as those imaged in a case where the camera positions of the camera devices 20-1 to 20-3 are the ideal positions.

That is, in a case where the camera position of the camera device 20 is shifted back and forth in the optical axis direction and is not the ideal position, when view point movement by the bullet time video is performed, an unnatural video is herein provided due to a change in the size of the notable object in association with view point movement. For this reason, the input image frame F is zoomed in or out after camera posture correction, and in this manner, correction is performed such that the distance between the point of regard of the notable object and each camera device 20 is an equal distance. This prevents the unnatural video due to view point movement by the bullet time video.

Note that in the example of FIG. 16, the camera postures of the camera devices 20-1 to 20-3 are brought into the ideal postures by the camera posture correction processing (S108 of FIG. 4), and therefore, the optical axis L of each camera device 20 faces the direction of the point P of regard of the notable object.

As described above, in the scale correction processing, even in a case where the notable object is (strenuously) moving, the position of the point P of regard of the notable object is constantly updated to the accurate position by the point-of-regard calculation processing (S106 of FIG. 4). Thus, by the image processing, the camera position of each camera device 20 can be corrected to the ideal position with reference to the point P of regard.

In the above-described manner, scale correction is, in the scale correction processing, performed such that the input image frame F generated in a case where the camera position is the ideal position is brought. Note that the scale correction processing described herein is one example of the processing, and other well-known technologies may be used to perform scale correction.

The first embodiment has been described above.

2. Second Embodiment

Incidentally, in the above-described camera posture correction processing (S108 of FIG. 4), in a case where (the point of regard of) the notable object has moved, an unusable image region might be present. Thus, such an unusable image region is preferably eliminated.

Figure 17:
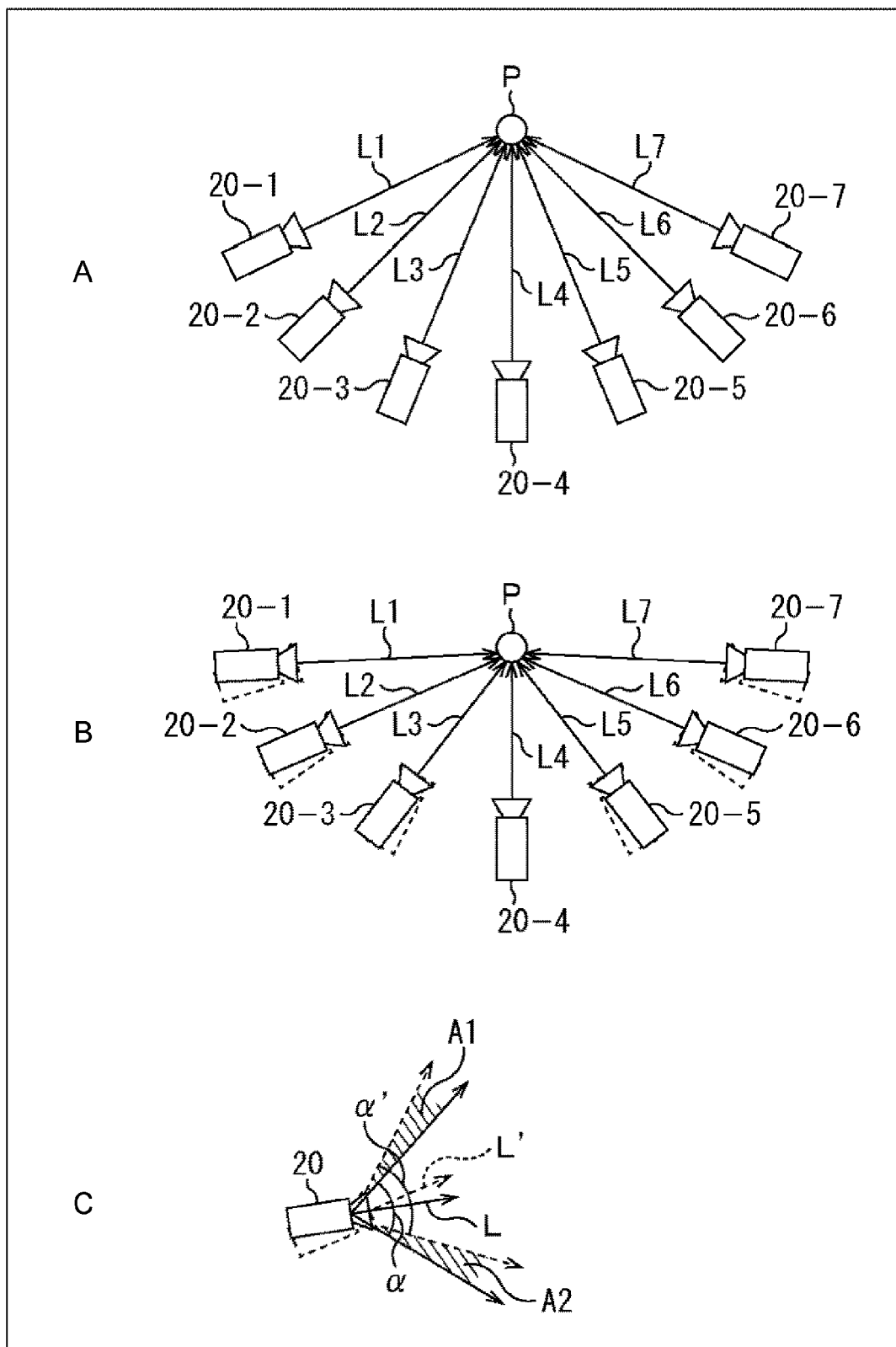
FIG. 17 is a view for describing unusable image regions which might be caused due to the camera posture correction processing.

Specifically, as illustrated in FIG. 17, when each camera posture is virtually corrected by image processing (signal processing) and camera devices 20-1 to 20-7 placed at the periphery of the point P of regard of a notable object are brought into a state after camera posture correction in B of FIG. 17 from a state before camera posture correction in A of FIG. 17, unusable image regions might be caused as illustrated in C of FIG. 17 depending on the placement positions of the camera devices 20.

In C of FIG. 17, the state before camera posture correction is indicated by a dashed line, whereas the state after camera posture correction is indicated by a solid line. An optical axis changes from an optical axis L' to an optical axis L between before and after camera posture correction, and a view angle changes from a view angle α' to a view angle α between before and after camera posture correction.

In this state, a view angle indicated by a region A1 is, in C of FIG. 17, within the range of the view angle α' before camera posture correction, but is outside the range of the view angle α after camera posture correction. For this reason, image data corresponding to the view angle of the region A1 is unnecessary image data, and is discarded. Moreover, in C of FIG. 17, a view angle indicated by a region A2 is within the range of the view angle α after camera posture correction, but is outside the range of the view angle α' before camera posture correction. For this reason, image data corresponding to the view angle of the region A2 is taken as not being present as data. As described above, the unusable image regions are present.

For this reason, in a second embodiment, a platform 30 is controlled such that the optical axis L of each camera device 20 faces the direction (of the point P of regard) of the notable object, and in this manner, the camera posture of each camera device 20 is changed not in a virtual manner but in actuality such that no unusable image region is caused.

(Configuration Example of Video Processing System)

Figure 18:
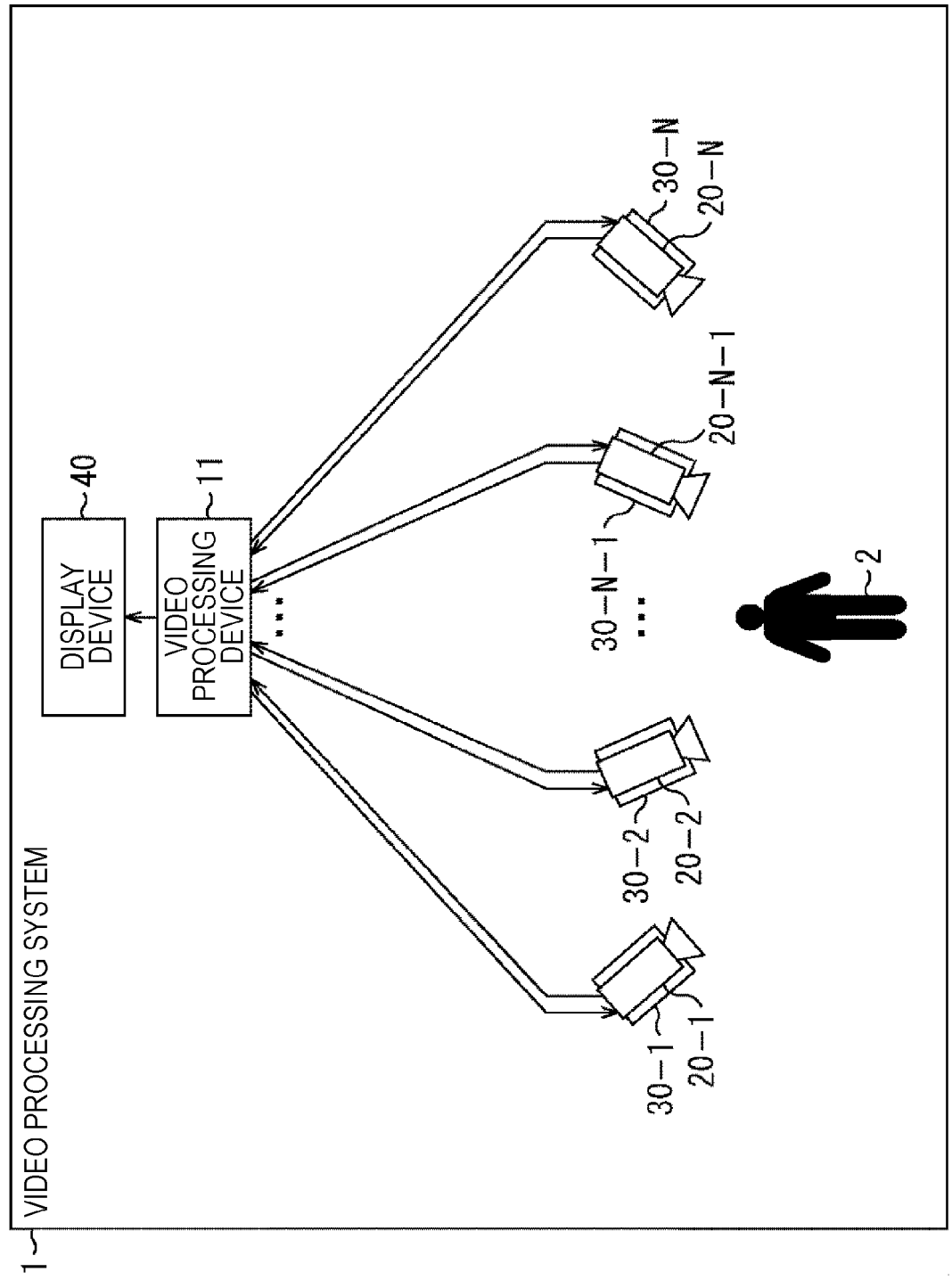
FIG. 18 is a diagram of a configuration example of a video processing system of a second embodiment.

FIG. 18 is a diagram of a configuration example of a video processing system of the second embodiment.

In FIG. 18, the video processing system 1 includes a video processing device 11, camera devices 20-1 to 20-N, platforms 30-1 to 30-N, and a display device 40. That is, the video processing system 1 of FIG. 18 is different from the video processing system 1 of FIG. 1 in that the video processing device 11 is provided instead of the video processing device 10 and that the video processing device 11 controls the platforms 30-1 to 30-N.

The video processing device 11 is configured to control the platforms 30-1 to 30-N via a predetermined cable etc., thereby adjusting the camera positions or camera postures of the camera devices 20-1 to 20-N.

Note that in the video processing device 11 of FIG. 18, other functions than the function of controlling the platforms 30-1 to 30-N are essentially similar to those of the video processing device 10 of FIG. 1, and therefore, description of these functions will not be repeated.

(Configuration Example of Video Processing Device)

Figure 19:
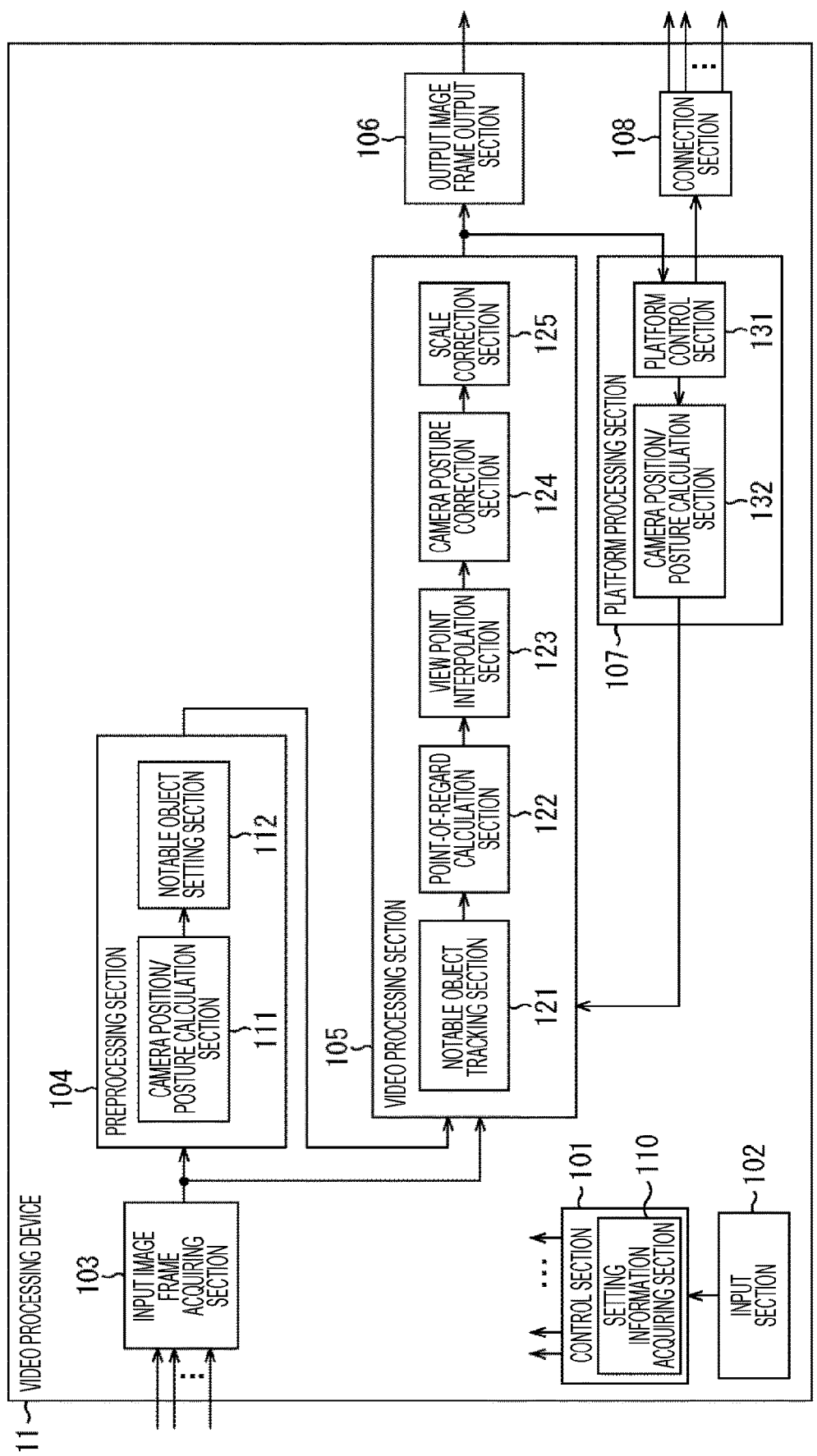
FIG. 19 is a diagram of a configuration example of a video processing device of the second embodiment.

FIG. 19 is a diagram of a configuration example of the video processing device 11 of FIG. 18.

In FIG. 19, the video processing device 11 includes a control section 101, an input section 102, an input image frame acquiring section 103, a preprocessing section 104, a video processing section 105, an output image frame output section 106, a platform processing section 107, and a connection section 108.

In FIG. 19, the control section 101 to the output image frame output section 106 are essentially configured similarly to the control section 101 to the output image frame output section 106 of FIG. 3, and therefore, description thereof will not be repeated. Note that the video processing section 105 supplies, as platform control information for controlling the platforms 30, the platform processing section 107 with information (the three-dimensional position of the point of regard) regarding the point of regard of the notable object and information regarding the camera position and camera posture of each camera device 20, for example.

The platform processing section 107 is configured to perform the processing for control of the platforms 30. The platform processing section 107 includes a platform control section 131 and a camera position/posture calculation section 132.

On the basis of the platform control information (e.g., the three-dimensional position of the point of regard and the camera posture) supplied from the video processing section 105, the platform control section 131 is configured to control the platform 30 to which one, whose direction of the optical axis L of an imaging optical system does not face the direction (of the point of regard) of the notable object, of the camera devices 20-1 to 20-N is fixed, thereby adjusting the direction of the optical axis of such a camera device 20 to face the direction (of the point of regard) of the notable object.

Moreover, on the basis of the platform control information (e.g., the three-dimensional position of the point of regard and the camera position) supplied from the video processing section 105, the platform control section 131 is configured to control the platform 30 to which one, whose camera position is not an ideal position, of the camera devices 20-1 to 20-N is fixed, thereby adjusting the camera position of such a camera device 20 to the ideal position.

The camera position/posture calculation section 132 is configured to calculate the adjusted camera position or camera posture of the camera device 20 subjected to adjustment of the camera position or the camera posture, thereby supplying the camera position or the camera posture to the video processing section 105.

For example, information regarding a drive system such as a gear or a motor in the platform 30 may be herein acquired to calculate displacement of the camera posture of the camera device 20 to which such a platform 30 is fixed. Alternatively, a detection value detected by an acceleration sensor, a gyroscope sensor, etc. attached to the platform 30 may be acquired to calculate, from such a detection value, the camera posture of the camera device 20 fixed to such a platform 30, for example.

As another alternative, predetermined image processing may be performed for an input image frame F imaged by the camera device 20 subjected to adjustment of the camera position or the camera posture, thereby calculating the adjusted camera position or camera posture. For example, when the camera position/posture calculation section 111 calculates the camera position and the camera posture, a characteristic point (a feature point) may be detected from the background of the object, and such a feature point may be utilized to estimate the camera position from the input image frame F imaged by the camera device 20 subjected to adjustment.

(Bullet Time Video Generation Processing)

Next, the flow of bullet time video generation processing executed by the video processing device 11 of FIG. 19 will be described with reference to a flowchart of FIG. 20.

At steps S201 to S204, the camera position and camera posture of each camera device 20 are, as in steps S101 to S104 of FIG. 4, calculated on the basis of the input image frames F acquired from each camera device 20, and the notable object is set according to a mode such as an automatic setting mode or a manual setting mode.

Then, at steps S205 to S209, the notable object set in the processing of step S204 is tracked, the point of regard of the notable object is calculated, virtual view points are interpolated, and the camera posture and a scale are corrected, as in steps S105 to S109 of FIG. 4. Note that the view point interpolation processing of step S207 is the optional processing for generating a smoother bullet time video in the bullet time video generation processing (FIG. 20), and such processing is executed as necessary.

At step S210, the platform 30 is controlled on the basis of the platform control information supplied from the video processing section 105, and in this manner, the camera position or camera posture of a predetermined camera device 20 of the camera devices 20-1 to 20-N.

Figure 21:
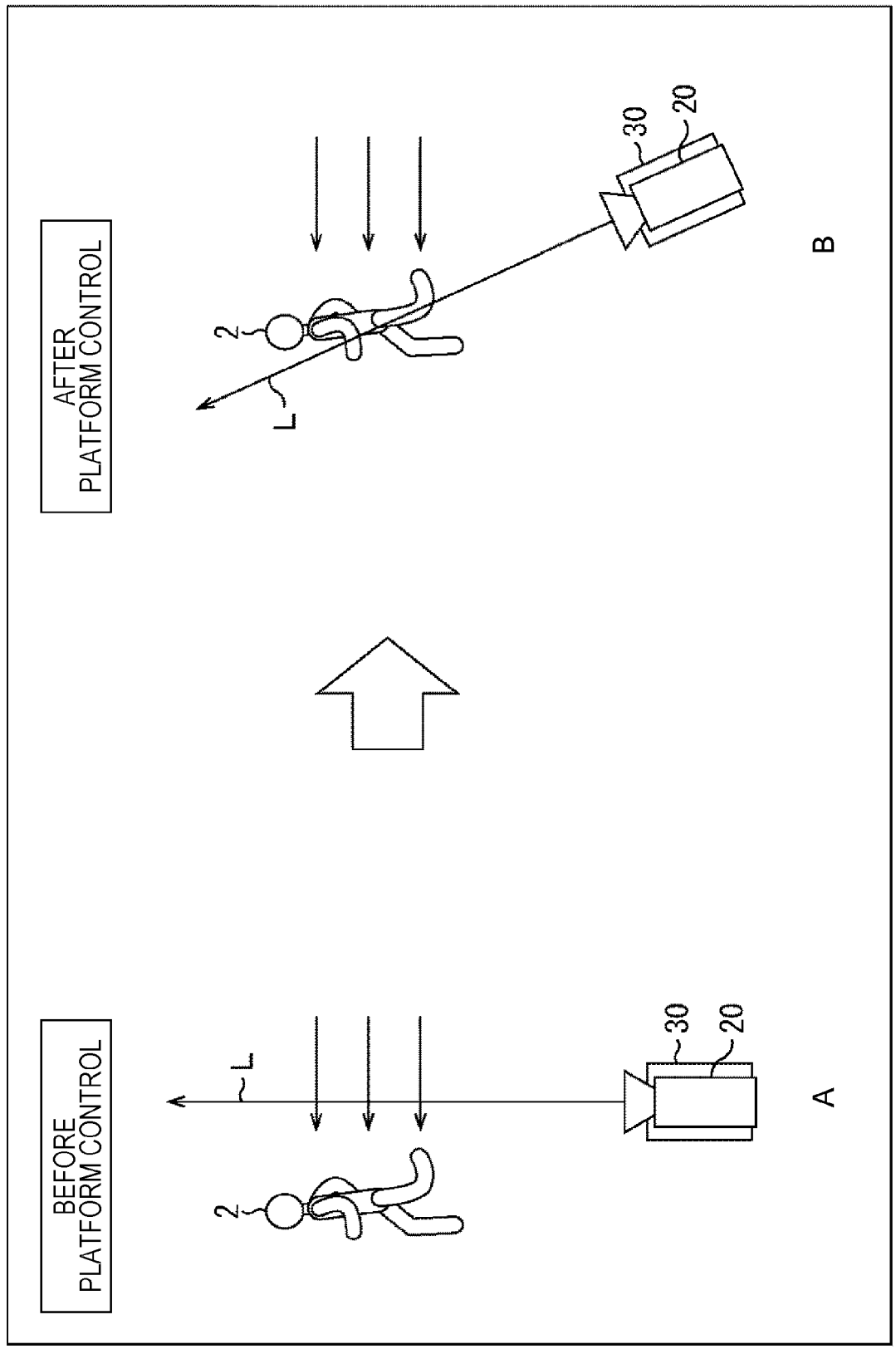
FIG. 21 is a view for describing platform control for adjusting a camera position and a camera posture.

For example, the platform control section 131 controls herein the platform 30 to which one, whose direction of the optical axis L of the imaging optical system does not face the direction (of the point of regard) of the notable object, of the camera devices 20-1 to 20-N is fixed, thereby adjusting the direction of the optical axis of such a camera device 20 to face the direction (of the point of regard) of the notable object. In this manner, as illustrated in FIG. 21, the direction of the optical axis L of the camera device 20 (fixed to the platform 30) not facing the direction (of the point of regard) of the notable object before control of the platform 30 in A of FIG. 21 is, for example, changed to the direction (of the point of regard) of the notable object after control of the platform 30 in B of FIG. 21.

Moreover, the platform control section 131 controls the platform 30 to which one, whose camera position is not the ideal position, of the camera devices 20-1 to 20-N is fixed, thereby adjusting the camera position of such a camera device 20 to the ideal position, for example.

At step S211, the camera position/posture calculation section 132 calculates the adjusted camera position or camera posture of the camera device 20 subjected to adjustment of the camera position or the camera posture.

When the processing of step S211 ends, the processing proceeds to step S212. At step S212, output image frames are output at predetermined timing as in step S110 of FIG. 4. Then, at steps S213 to S214, the processing (an image frame processing loop) of steps S205 to S214 is, as in steps S111 to S112 of FIG. 4, repeated in a case where it is determined that the processing for all of the input image frames F has not ended yet ("No" at S213).

By repeating this image frame processing loop, the notable object (an object 2) included in the input image frames F is tracked (S205), and the point of regard of the notable object (the object 2) is updated (S206). Thus, even in a case where the notable object (the object 2) has moved, such a notable object can be tracked, and the point of regard of the notable object can be continuously updated.

Moreover, the view points for the notable object (the object 2) are interpolated (S207). Further, correction (image processing) is performed such that the input image frames F (or interpolated image frames F') when the notable object (the object 2) is imaged with the camera posture and camera position of each camera device 20 being in an ideal state are brought (S208, S209). Thus, the bullet time video centering on the notable object (the object 2) can be more smoothly reproduced.

Further, the platform 30 is controlled to adjust the camera position or camera posture of the camera device 20 (S210), and the adjusted camera position and camera posture are calculated (S211). Thus, no unusable image region is caused by the camera posture correction processing (S208), and therefore, a decrease in image resolution and narrowing of the movable range of the notable object upon reproduction of the bullet time video can be reduced, for example. That is, the object 2 targeted for tracking can be followed by the camera device 20 fixed to the platform 30, and therefore, a higher resolution video can be generated.

Note that the camera position and camera posture of each camera device 20 may be calculated mechanically (in a mechanical manner), as well as being calculated by processing performed for the input image frame F from the camera device 20 by means of, e.g., structure from motion (SFM). That is, an error might be included in the case of calculation by a mechanical method, and for this reason, the camera position and the camera posture can be more accurately obtained by means of the image processing.

Figure 20:
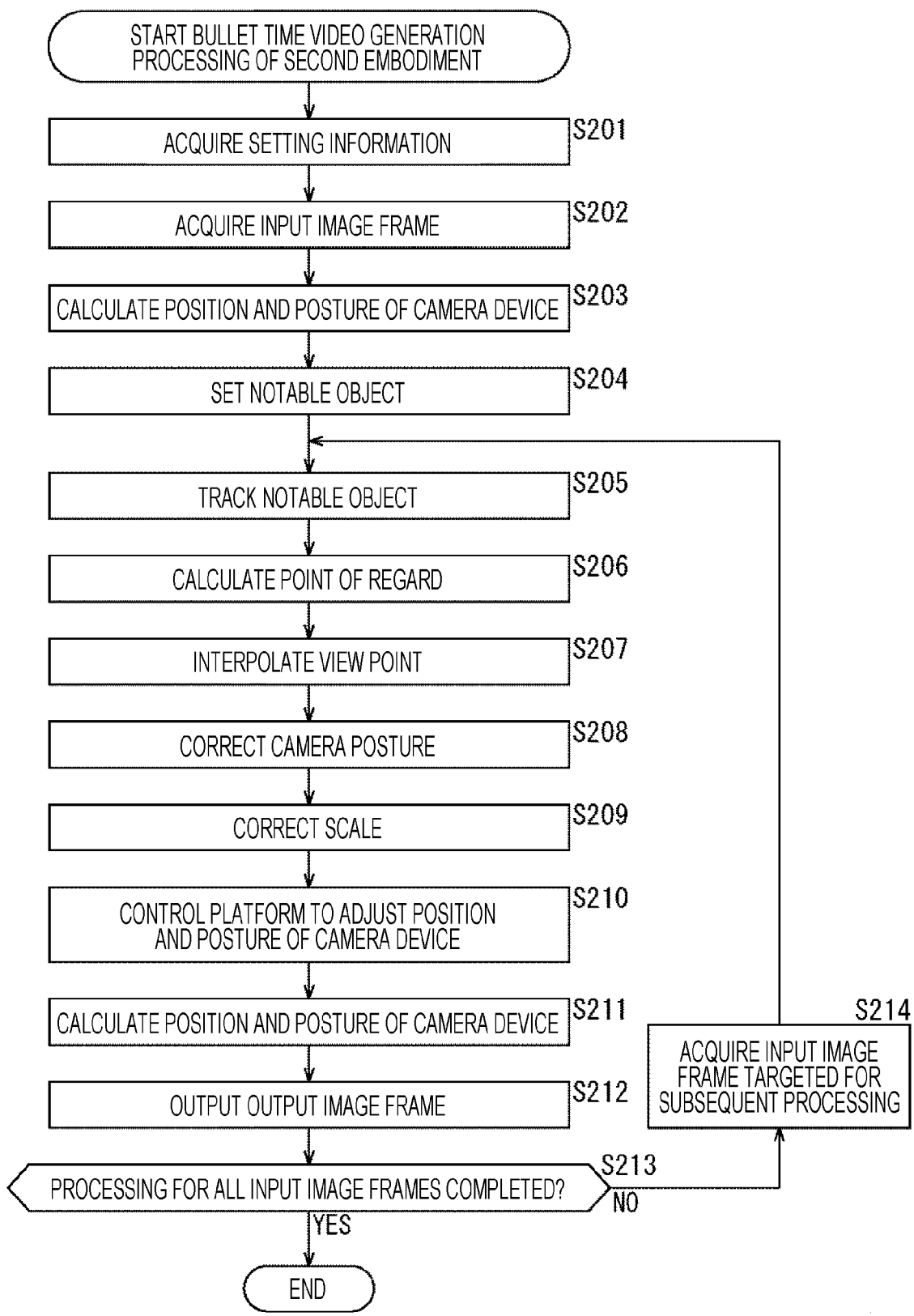
FIG. 20 is a flowchart for describing the flow of bullet time video generation processing of the second embodiment.

Then, in a case where it is determined that the processing for all of the input image frames F has ended ("Yes" at S213), the bullet time video generation processing of FIG. 20 ends.

The flow of the bullet time video generation processing of the second embodiment has been described above. In the bullet time video generation processing of the second embodiment, the notable object included in the input image frames F generated at multiple different view point positions is constantly tracked, and the point P of regard of the notable object is updated on a steady basis. Thus, even in the case of the moving notable object, the bullet time video centering on (the point P of regard of) the notable object can be provided. Moreover, the platform 30 is controlled to adjust the camera position or camera posture of the camera device 20, and therefore, the object 2 targeted for tracking can be followed by the camera device 20 fixed to the platform 30. Thus, generation of the unusable image region due to the camera posture correction processing can be reduced.

The second embodiment has been described above.

3. Setting of Default Conditions for Bullet Time Video Generation Processing

Next, the method for setting default conditions for the bullet time video generation processing of the above-described first or second embodiment will be described.

(Setting Screen for Default Conditions for Bullet Time Video Generation Processing)

Figure 22:
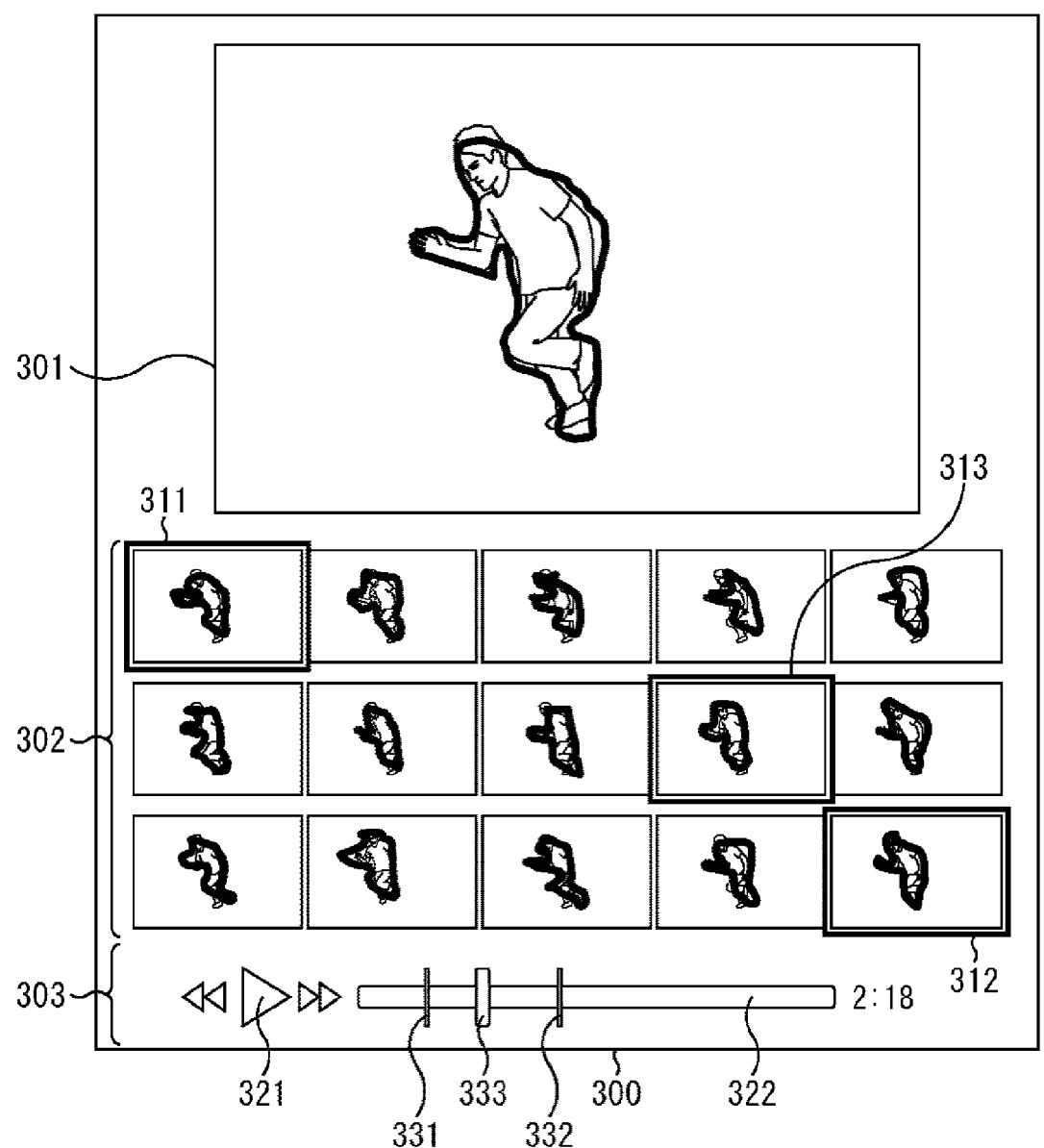
FIG. 22 is a schematic view of an example of a setting screen for default conditions for the bullet time video generation processing.

FIG. 22 is a schematic view of an example of the setting screen (a user interface) for the default conditions for the bullet time video generation processing.

In FIG. 22, the setting screen 300 includes a video display region 301, a camera video display region 302, and an operation region 303.

On the video display region 301, various types of videos such as the video imaged by each camera device 20 are displayed. In this example, an object included in the video displayed on the video display region 301 is set as the notable object. For example, the mode for specifying the notable object includes, as described with reference to FIGS. 10 and 11, the automatic setting mode, the manual setting mode, and the automatic-plus-manual setting mode. In the case of setting the manual setting mode or the automatic-plus-manual setting mode, the user performs predetermined operation (e.g., the operation of selecting the object) on the setting screen 300, thereby setting, as the notable object, the object included in the video on the video display region 301.

Moreover, the output image frames are obtained by the above-described bullet time video generation processing. Upon reproduction of the bullet time video, the notable object is at a specific position on these output image frames. For example, an optional position on the video displayed on the video display region 301 and including the object (the notable object) may be herein set as the specific position according to the predetermined operation on the setting screen 300. Note that this specific position may be updated for each output image frame output in chronological order (the time point t1', the time point t2', . . . ).

Display regions for displaying the video imaged by each camera device 20 are arranged in the camera video display region 302. In this example, the camera video display region 302 includes 3×5 display regions. The video corresponding to the input image frame $F_1$ from the camera device 20-1, the video corresponding to the input image frame $F_2$ from the camera device 20-2, the video corresponding to the input image frame $F_3$ from the camera device 20-3, the video corresponding to the input image frame $F_4$ from the camera device 20-4, and the video corresponding to the input image frame $F_5$ from the camera device 20-5 are, in the order from the left, each displayed on five display regions of an upper line (a first line).

Similarly, the videos corresponding to the input image frames $F_6$ to $F_{10}$ from the camera devices 20-6 to 20-10 are, in the order from the left, each displayed on five display regions of a middle line (a second line) of the camera video display region 302, and the videos corresponding to the input image frames $F_{11}$ to $F_{15}$ from the camera devices 20-11 to 20-15 are, in the order from the left, each displayed on five display regions of a lower line (a third line) of the camera video display region 302.

A view point movement start setting frame 311 on the camera video display region 302 is herein a frame indicating that the frame is set as the start position in view point movement, and the camera device 20 imaging the video displayed on the display region surrounded by the view point movement start setting frame 311 is set as the start position in view point movement. In this example, the user performs the predetermined operation on the setting screen 300, thereby setting the camera device 20-1 as the start position in view point movement (the view point position information).

Moreover, a view point movement end setting frame 312 on the camera video display region 302 is a frame indicating that the frame is set as the end position in view point movement, and the camera device 20 imaging the video displayed on the display region surrounded by the view point movement end setting frame 312 is set as the start position in view point movement. In this example, the user performs the predetermined operation on the setting screen 300, thereby setting the camera device 20-15 as the end position in view point movement (the view point position information).

That is, in this example, the camera device 20-1 of the camera devices 20-1 to 20-15 arranged at the periphery of the object 2 is set as the start position in view point movement, and the camera device 20-15 of the camera devices 20-1 to 20-15 is set as the end position in view point movement. In the case of setting, as the view point position information, these start and end positions in view point movement by the setting screen 300, (the processing of the image frame processing loop of) the bullet time video generation processing is performed for the input image frames F input from the camera devices 20-1 to 20-15, thereby obtaining the output image frames for reproducing the bullet time video.

Note that a video display frame 313 on the camera video display region 302 is a frame indicating that the video is displayed on the video display region 301.

Moreover, in the case of performing the bullet time video generation processing for the input image frames F at each time point t without limitations on the time range of the input image frame F, the time information (the start and end time points for the input image frame F) indicating the time range of the input image frame F is not necessarily set (in this case, the entire time range is set as default, for example). However, in the case of performing the bullet time video generation processing only for the input image frames F at a specific time point t (time period), the user performs the predetermined operation on the setting screen 300, thereby setting the time information.

As described above, the notable object, the view point position information (the start and end positions in view point movement), and the time information (the start and end time points for the input image frame F) can be, by the setting screen 300, set as the default conditions for the bullet time video generation processing. Note that in the case of setting the automatic setting mode as the mode for specifying the notable object, it is not necessary to set the notable object as the default condition. Moreover, in the case of performing the bullet time video generation processing for the input image frames F at each time point t, it is not necessary to set the time information as the default condition. For example, in this case, the entire time range such as the range from the time point t1 to the time point tT is, as the time information, set as default.

Note that the setting screen 300 is, as described above, essentially the user interface for setting the default conditions for the bullet time video generation processing. However, in the case of performing the bullet time video generation processing for all (or some) of the input image frames F, when the input image frames F targeted for displaying (recording) of the bullet time video are selected from these input image frames F, the setting screen 300 may be utilized as a user interface for reproducing the input image frames F.

For example, the operation region 303 is, on the setting screen 300, provided as such a user interface for reproduction. An operation button 321 and a time bar 322 are arranged in the operation region 303. The operation button 321 includes a play button, a fast-forward button, and a rewind button, and processing corresponding to the operation contents of each button is executed. Moreover, the time bar 322 displays, for example, time during reproduction and a reproduction time length.

A view point movement start time mark 331 is herein a mark indicating the start of view point movement on a time axis indicated by the time bar 322. That is, in this example, the user performs the operation on the setting screen 300, thereby setting that view point movement starts at a time point corresponding to the arrangement position of the view point movement start time mark 331 within the reproduction time indicated by the time bar 322.

Moreover, a view point movement end time mark 332 is a mark indicating the end of view point movement on the time axis indicated by the time bar 322. That is, in this example, the user performs the operation on the setting screen 300, thereby setting that view point movement ends at a time point corresponding to the arrangement position of the view point movement end time mark 332 within the reproduction time indicated by the time bar 322.

That is, in this example, the default conditions are set by the setting screen 300 such that view point movement starts from the camera device 20-1 when the reproduction time of the time bar 322 reaches the time point indicated by the view point movement start time mark 331 and that the camera device 20-2, . . . , the camera device 20-14, and the camera device 20-15 are, until the time point indicated by the view point movement end time mark 332, sequentially selected to generate such a bullet time video that the view point position is switched according to switching of each camera device 20. Thus, the view point position is moved centering on the notable object while the bullet time video is reproduced.

Moreover, a reproduction position mark 333 on the time bar 322 is a mark indicating a current reproduction position within the reproduction time indicated by the time bar 322.

(Notable Object and View Point Movement Path)

Figure 23:
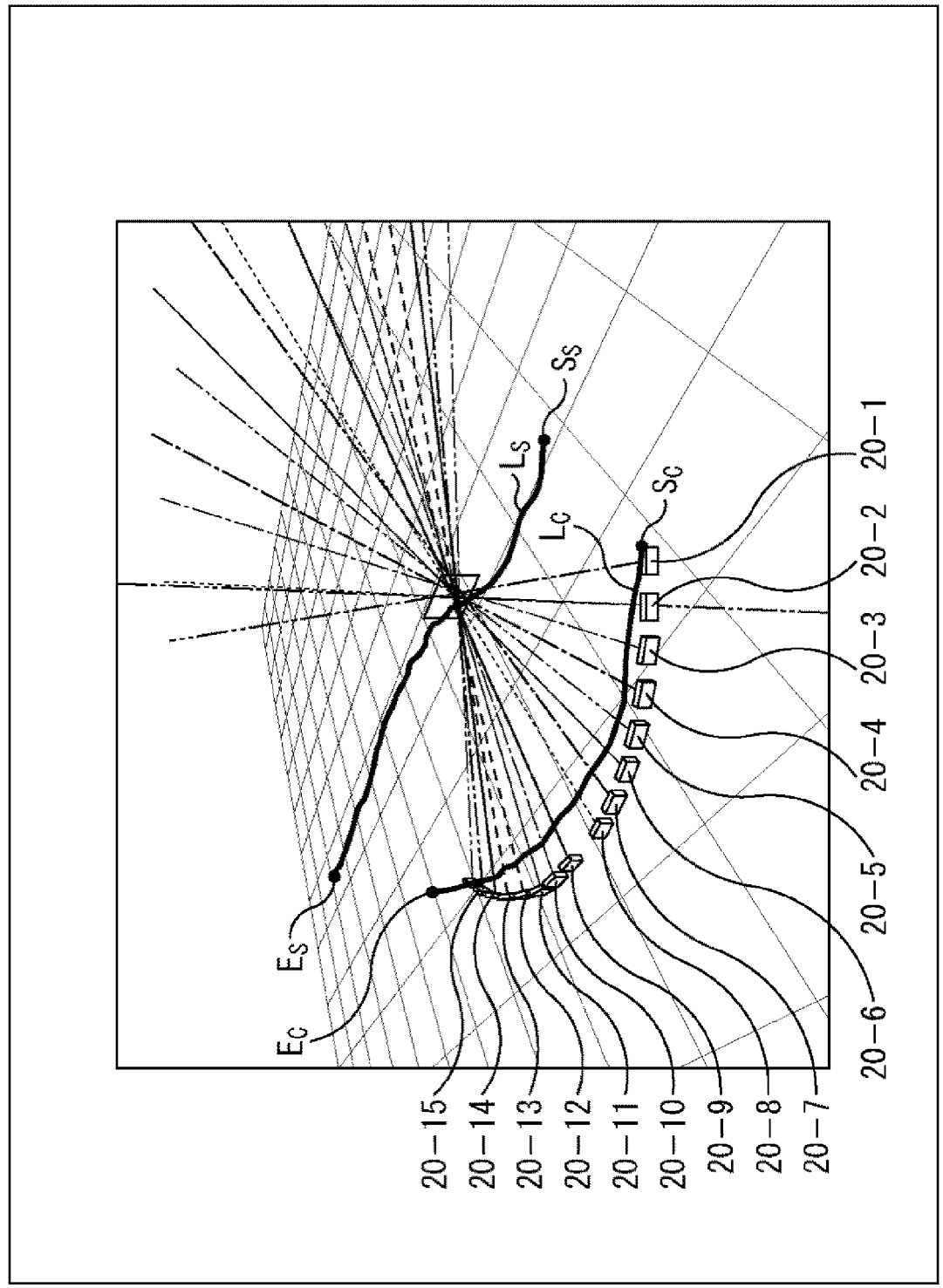
FIG. 23 is a view of a relationship between the notable object and a view point movement path.

FIG. 23 is a view of a relationship between the notable object and a view point movement path.

In FIG. 23, the notable object path $L_s$ indicating the route of movement of the notable object and the view point movement path $L_c$ indicating the route of view point movement are both indicated by thick lines. This notable object path $L_s$ shows that the notable object moves from an object movement start position $S_s$ to an object movement end position $E_s$ along the route indicated by the thick line.

Moreover, the view point movement path $L_c$ shows that the view point position moves from a view point movement start position $S_c$ to a view point movement end position $E_c$ along the route indicated by the thick line.

That is, in the example of FIG. 23, in a case where the camera devices 20-1 to 20-15 are placed at the periphery of the object 2, the camera device 20-1 is, as in FIG. 22, set as the start position (the view point movement start position $S_c$) in view point movement, and the camera device 20-15 is set as the end position (the view point movement end position $E_c$) in view point movement.

Thus, the camera device 20-1, the camera device 20-2, . . . , the camera device 20-14, and the camera device 20-15 are sequentially selected, and the view point position is switched according to switching of each camera device 20. In this manner, the view point moves. For example, in the example of FIG. 23, when (the point of regard of) the object 2 as the notable object has moved to the position where the optical axes L of the camera devices 20 intersect with each other, each camera device 20 is switched to switch the view point position, and therefore, the view point moves. Thus, the bullet time video centering on (the point of regard of) the object 2 can be reproduced.

Note that in FIG. 23, e.g., settings for the notable object, the view point movement start position $S_c$, and the view point movement start position $E_c$ can be manually changed in such a manner that the user operates the user interface such as the setting screen 300 (FIG. 22). Such adjustment of a camera work or a motion path on a three-dimensional space is also performed by, e.g., Maya (Autodesk Inc.) broadly known as three-dimensional computer graphics software (FIG. 24).

(Relationship Between Input Image Frame and Displayed Video)

Next, a relationship between each input image frame F input from the camera devices 20 and the displayed bullet time video will be described with reference to FIGS. 25 to 27. Note that the setting screen 300 (FIG. 22) sets herein the camera device 20-1 as the start position (the view point movement start position $S_c$) in view point movement, and sets the camera device 20-15 as the end position (the view point movement end position $E_c$) in view point movement.

Figure 25:
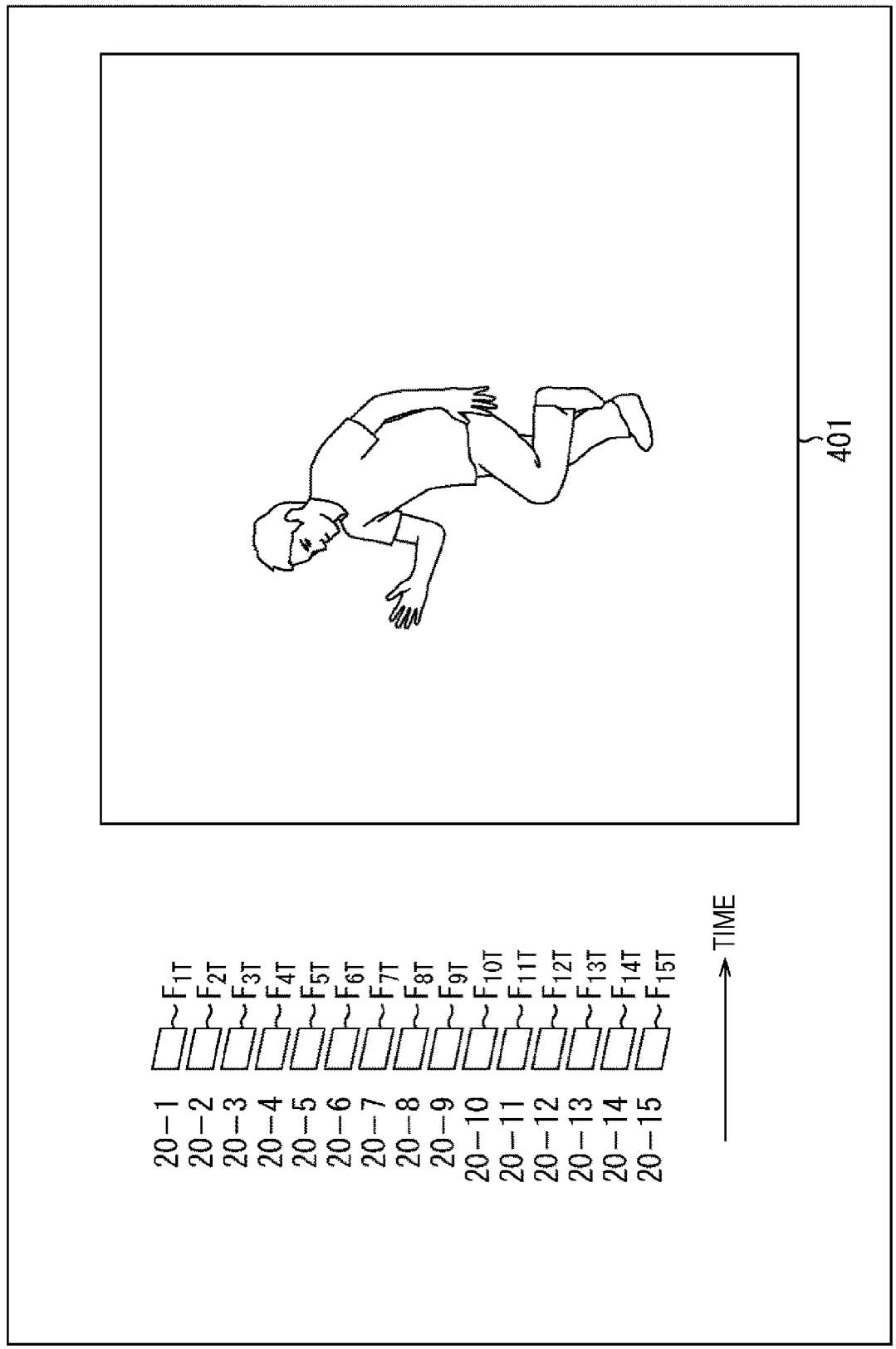
FIG. 25 is a view of a relationship between the image frame and a displayed bullet time video in a case where reproduction of the bullet time video is stopped.

FIG. 25 illustrates the relationship between each input image frame F and the displayed bullet time video in the case of stopping reproduction of the bullet time video. In this case, a video 401 corresponding to the output image frame obtained by processing of any input image frame F of the input image frames $F_{1T}$ to $F_{15T}$ from the camera devices 20-1 to 20-15 is displayed on the display device 40.

Figure 26:
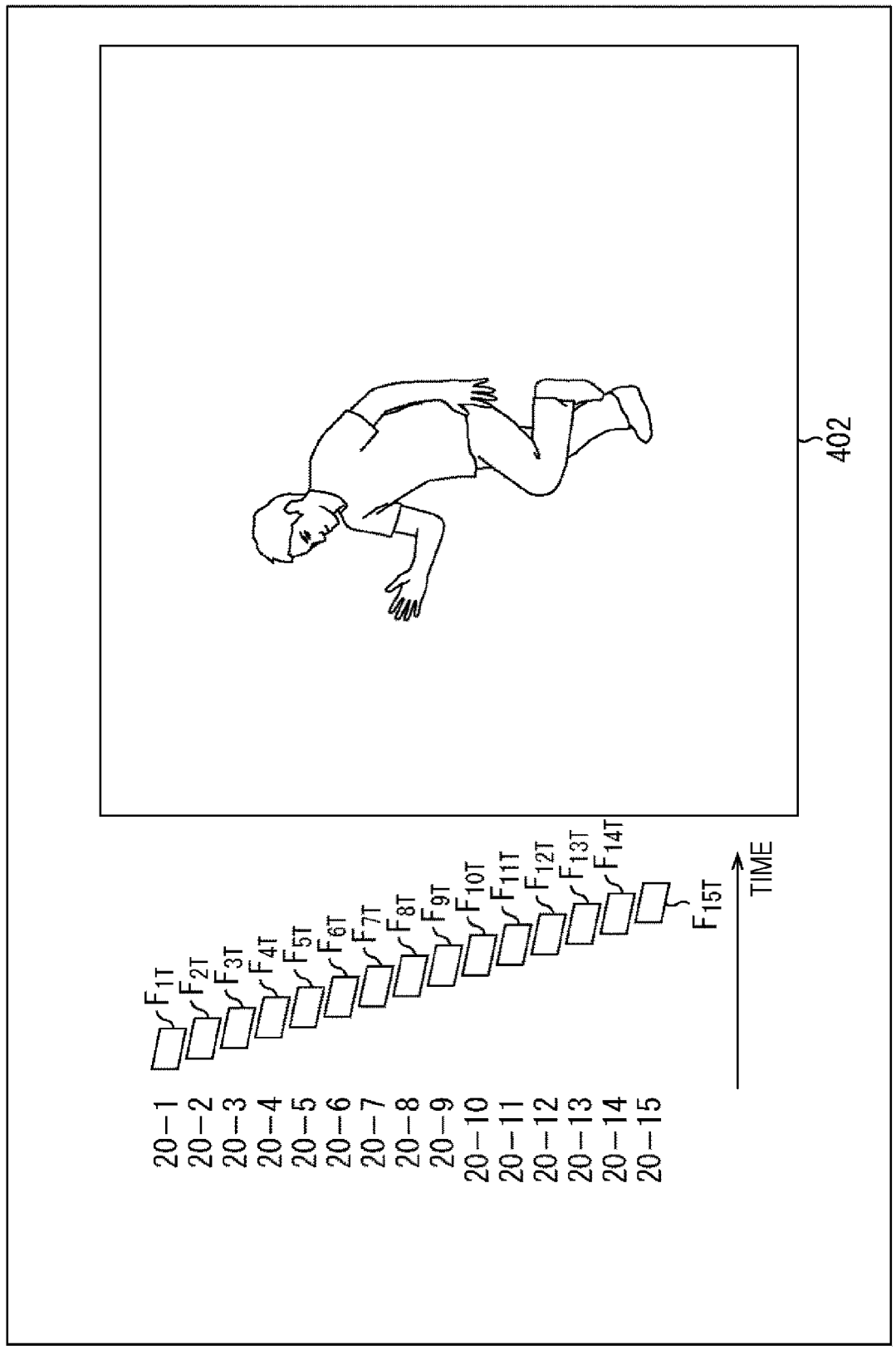
FIG. 26 is a view of the relationship between the image frame and the displayed bullet time video in a case where the bullet time video is reproduced.

FIG. 26 illustrates the relationship between each input image frame F and the displayed bullet time video in the case of reproducing the bullet time video. In this case, the input image frames $F_{1T}$ to $F_{15T}$ from the camera devices 20-1 to 20-15 are sequentially processed, and then, videos 402 corresponding to the output image frames obtained by processing of the input image frames $F_{1T}$ to $F_{15T}$ and being different from each other in the view point position are sequentially displayed on the display device 40.

Figure 27:
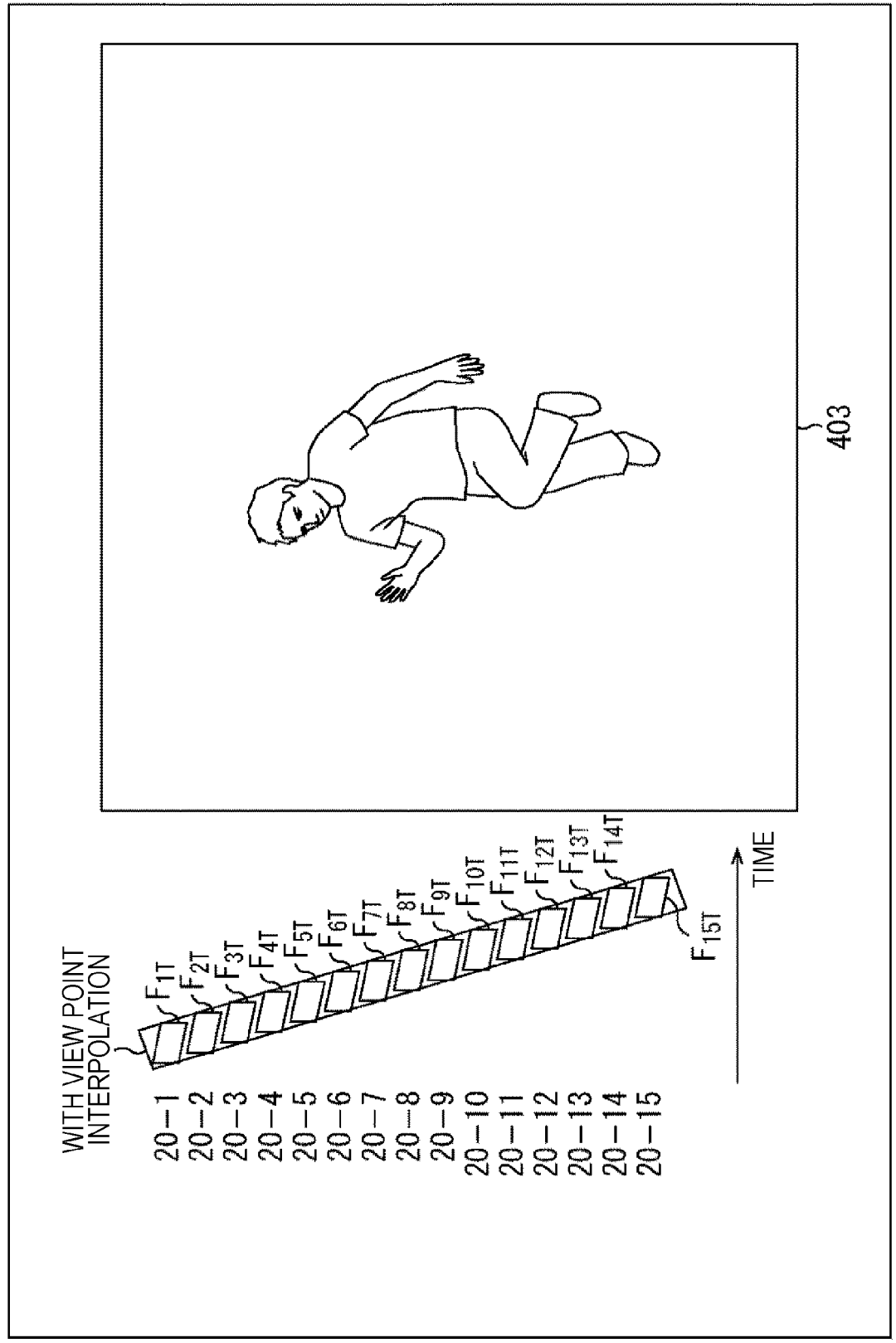
FIG. 27 is a view of the relationship between the image frame and the displayed bullet time video in a case where view point interpolation is performed upon generation of the bullet time video.

FIG. 27 illustrates the relationship between each input image frame F and the displayed bullet time video in the case of performing view point interpolation upon generation of the bullet time video. In this case, the input image frames $F_{1T}$ to $F_{15T}$ from the camera devices 20-1 to 20-15 are sequentially processed, and then, videos 403 corresponding to the output image frames obtained by processing of the input image frames $F_{1T}$ to $F_{15T}$ and the interpolated image frames F' and being different from each other in the view point position are sequentially displayed on the display device 40.

4. Bullet Time Video Reproduction

Next, the method for reproducing the bullet time video generated by the bullet time video generation processing of the above-described first or second embodiment will be described.

Incidentally, the notable object is tracked to update the point of regard of the notable object in the present technology. Thus, the bullet time video centering on the point of regard of the notable object can be generated and reproduced at any timing. Thus, the present technology can respond to the case of switching between a normal video and the bullet time vide at predetermined timing, such as the case of switching to reproduction of the bullet time video in the middle of reproduction of the normal video as a usual video and the case of switching to reproduction of the normal video at the end of reproduction of the bullet time video. Thus, the configuration for the case of switching between the normal video and the bullet time video at the predetermined timing will be described herein as one example of the method for reproducing the bullet time video with reference to FIGS. 28 to 30.

(Configuration Example of Video Processing Device Upon Video Reproduction)

Figure 28:
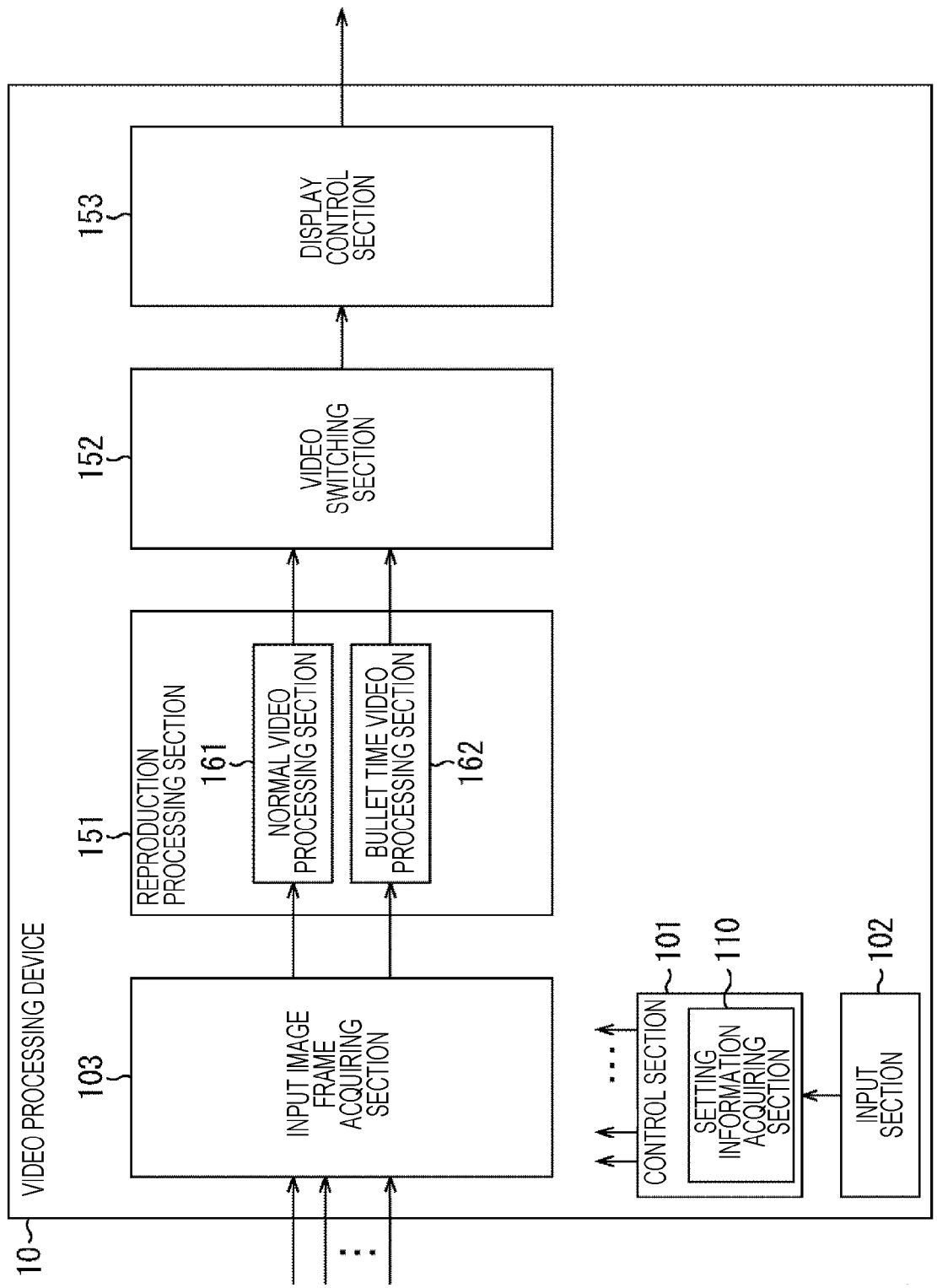
FIG. 28 is a diagram of a configuration example of the video processing device upon video reproduction.

FIG. 28 is a diagram of a configuration example of the video processing device 10 upon video reproduction.

In FIG. 28, the video processing device 10 includes the control section 101, the input section 102, the input image frame acquiring section 103, are production processing section 151, a video switching section 152, and a display control section 153.

In FIG. 28, the control section 101 to the input image frame acquiring section 103 are essentially configured similarly to the control section 101 to the input image frame acquiring section 103 of FIG. 3, and therefore, description thereof will not be repeated.

The reproduction processing section 151 is configured to perform the processing for video reproduction. The reproduction processing section 151 includes a normal video processing section 161 and a bullet time video processing section 162. The normal video processing section 161 is configured to process the input image frames F supplied from the input image frame acquiring section 103, thereby supplying the video switching section 152 with video data corresponding to the normal video.

The bullet time video processing section 162 has all or some functions of the video processing device 10 (FIG. 3) or the video processing device 11 (FIG. 19). The bullet time video processing section 162 is configured to process the input image frames F supplied from the input image frame acquiring section 103, thereby supplying the video switching section 152 with video data corresponding to the bullet time video.

The video data corresponding to the normal video and supplied from the normal video processing section 161 and the video data corresponding to the bullet time video and supplied from the bullet time video processing section 162 are supplied to the video switching section 152. The video switching section 152 is configured to supply the display control section 153 with the video data from the normal video processing section 161 or the video data from the bullet time video processing section 162.

The display control section 153 is configured to display the normal video or the bullet time video on the display device 40 according to the video data supplied from the video switching section 152.

(Video Reproduction Processing)

Next, the flow of video reproduction processing executed by the video processing device 10 of FIG. 28 will be described with reference to a flowchart of FIG. 29.

At step S301, the setting information acquiring section 110 acquires, according to the operation of the input section 102 by the user, the setting information for determining bullet time video reproduction start and end positions, for example. For example, information allowing determination of the bullet time video reproduction start and end positions is herein acquired, the information including, e.g., various types of setting information regarding reproduction of the bullet time video set by the user and the setting information (the view point position information and the time information) user for the bullet time video generation processing. Then, according to these types of setting information, the bullet time video reproduction start and end positions are determined.

At step S302, the control section 101 determines, on the basis of the bullet time video reproduction start position obtained in the processing of step S301, whether or not reproduction of the bullet time video is to be started.

In a case where it is, at step S302, determined that reproduction of the bullet time video is not to be started, the processing proceeds to step S303. At steps S303 to S305, the processing for reproducing the normal video is performed.

Specifically, the input image frame acquiring section 103 acquires, at step S303, the input image frames F input from each camera device 20. Then, at step S304, the normal video processing section 161 performs normal video processing for the input image frames F acquired in the processing of step S303. Subsequently, at step S305, the display control section 153 displays the normal video on the display device 40 on the basis of a processing result of step S304.

When the processing of steps S303 to S305 ends, the processing proceeds to step S310.

On the other hand, in a case where it is, at step S302, determined that reproduction of the bullet time video is to be started, the processing proceeds to step S306. At steps S306 to S308, the processing for reproducing the bullet time video is performed.

Specifically, the input image frame acquiring section 103 acquires, at step S306, the input image frames F input from each camera device 20. Then, at step S307, the bullet time video processing section 162 performs bullet time video processing for the input image frames F acquired in the processing of step S306. Subsequently, at step S308, the display control section 153 displays the bullet time video on the display device 40 on the basis of a processing result of step S307.

When the processing of steps S306 to S308 ends, the processing proceeds to step S309. At step S309, the control section 101 determines, on the basis of the bullet time video reproduction end position obtained in the processing of step S301, whether or not reproduction of the bullet time video is to be ended.

In a case where it is, at step S309, determined that reproduction of the bullet time video is not to be ended, i.e., reproduction of the bullet time video is to be continued, the processing returns to step S306, and the above-described processing (S306 to S308) for reproducing the bullet time video is repeated. In this manner, reproduction of the bullet time video centering on (the point of regard of) the notable object is continued between the image frame start position and the image frame end position, for example.

Then, in a case where it is, at step S309, determined that reproduction of the bullet time video is to be ended, the processing proceeds to step S310.

At step S310, it is determined whether or not video reproduction is to be ended. In a case where it is, at step S310, determined that video reproduction is not to be ended, i.e., video reproduction is to be continued, the processing returns to step S302, and the processing at step S302 and subsequent steps is repeated. That is, the bullet time video is reproduced between the image frame start position and the image frame end position, but the normal video is reproduced during other periods, for example.

Figure 29:
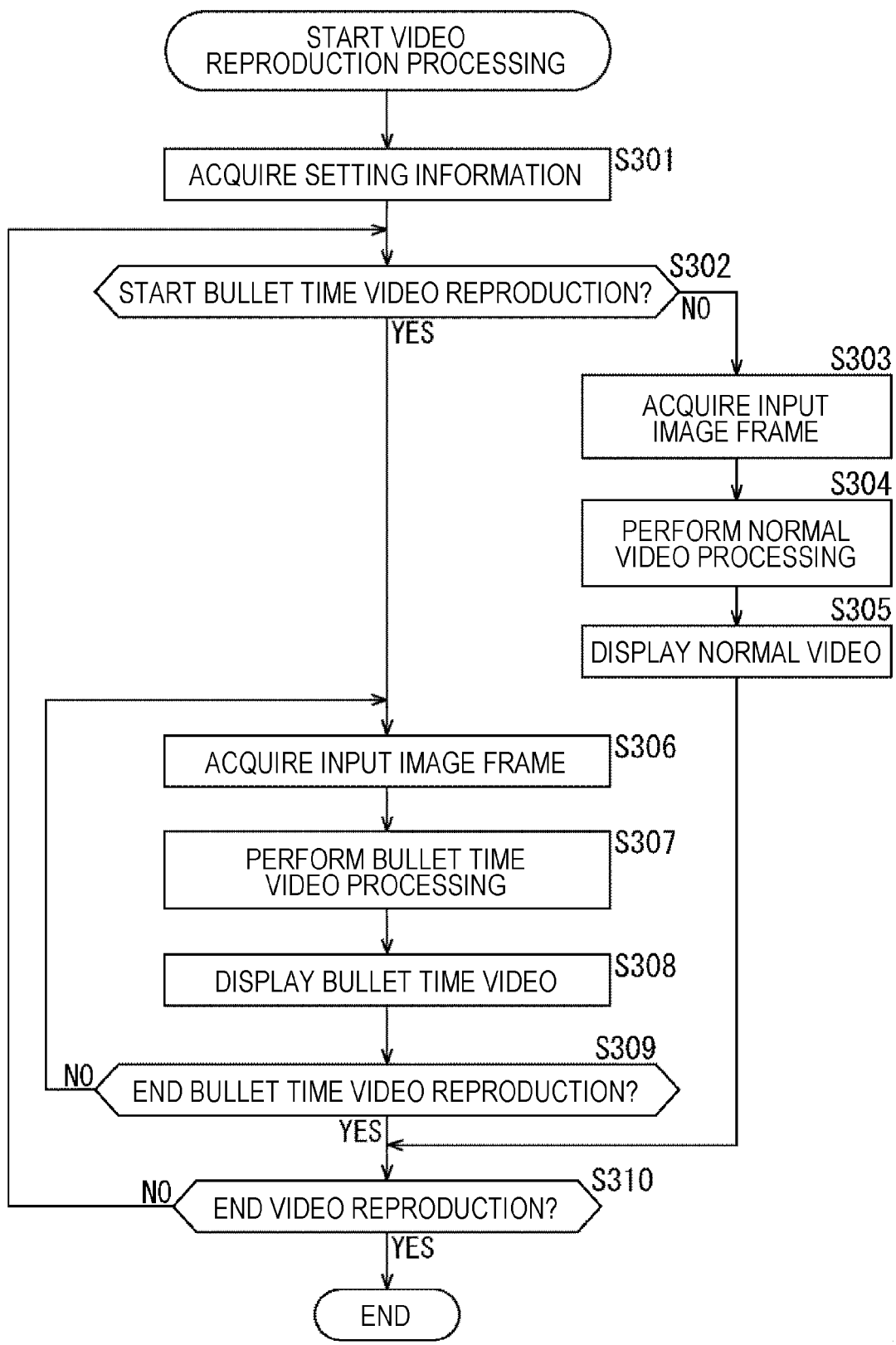
FIG. 29 is a flowchart for describing video reproduction processing.

In a case where it is, at step S310, determined that video reproduction is to be ended, the video reproduction processing of FIG. 29 ends.

The flow of the video reproduction processing has been described above.

Figure 30:
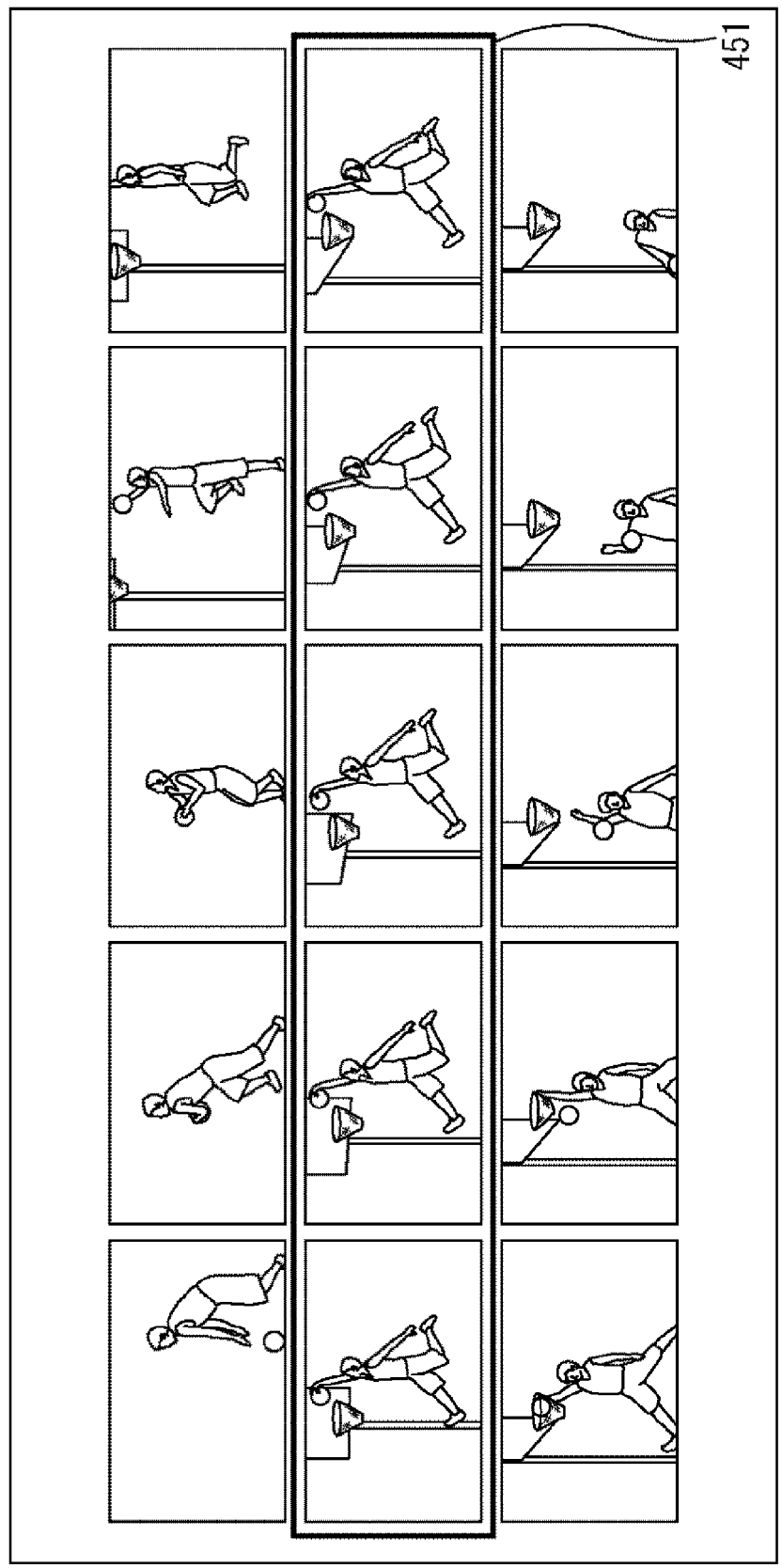
FIG. 30 is a schematic view of reproduction of the bullet time video in a case where the object is moving.

FIG. 30 illustrates herein a display example in a case where reproduction is switched between the normal video and the bullet time video, for example. Note that in the example of FIG. 30, a video of a scene where a basketball player sinks a shot is reproduced, and such a basketball player is set as the notable object.

In FIG. 30, the normal video is reproduced from the left to the right on the five display regions of the upper line of the 3×5 display regions. In this example, action of the basketball player from dribbling to shooting of a ball is reproduced as the normal video.

The bullet time video centering on (the point of regard of) the basketball player in a dunk shot position is reproduced on the five display regions (the display regions surrounded by a frame 451) of the middle line following the upper line. That is, the leftmost input image frame of the middle line is herein set as the bullet time video reproduction start position, and the rightmost input image frame of the middle line is herein set as the bullet time video reproduction end position.

Moreover, the normal video is reproduced from the left to the right on the five display regions of the lower line following the middle line. In this example, action of the basketball player before landing on a court and after dunking of the ball is reproduced as the normal video.

As described above, players strenuously move in sports such as the basketball, and for this reason, it is difficult to expect movement of each player and timing of movement of each player. However, in the present technology, the notable object is tracked to update the point of regard of the notable object. Thus, the bullet time video centering on the point of regard of the notable object can be generated and reproduced at any timing. In other words, the output image frame output for reproducing the bullet time video is the input image frame processed such that the notable object is at the specific position on the output image frame when the view point position moves within the time range indicated by the time information and the view point position movement range indicated by the view point position information. Thus, the bullet time video centering on (the point of regard of) the notable object can be reproduced at any timing.

Specifically, FIG. 30 illustrates, as an example, a case where the bullet time video of the scene where the basketball player set as the notable object dunks the ball is reproduced. However, for, e.g., the basketball player dribbling scene reproduced as the normal video on the upper line, the bullet time video centering on (the point of regard of) the dribbling basketball player can be easily reproduced as long as the bullet time video reproduction start and end positions are set.

5. Variations

Other Configuration Examples of Video Processing System

The video processing system 1 is not limited to the configuration illustrated in FIG. 1 or 18, and other configurations can be employed. Thus, other configurations of the video processing system 1 will be described with reference to FIGS. 31 to 33.

Other Configuration Example 1

Figure 31:
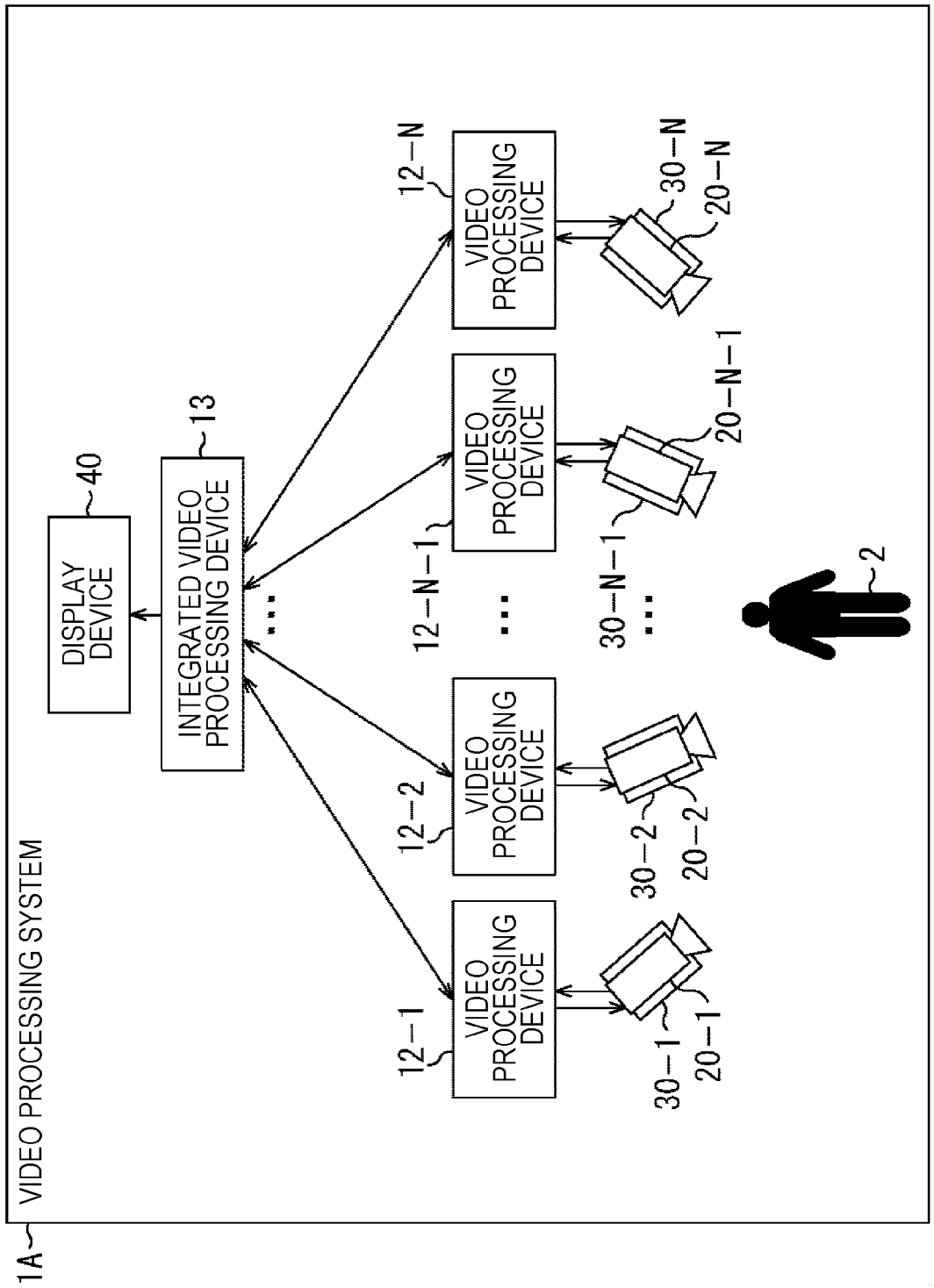
FIG. 31 is a diagram of another configuration example of the video processing system.

In a video processing system 1A of FIG. 31, video processing devices 12-1 to 12-N (N is an integer of one or more) are each placed for the camera devices 20 and the platforms 30 thereof. Further, an integrated video processing device 13 is placed for integration of the video processing devices 12-1 to 12-N.

The video processing device 12-1 is configured to perform the processing for the input image frame $F_1$ input from the camera device 20-1. Moreover, the video processing device 12-1 is configured to control, according to control from the integrated video processing device 13, the platform 30-1 to which the camera device 20-1 is fixed, for example. As in the video processing device 12-1, the video processing devices 12-2 to 12-N are each configured to perform the processing for the input image frames F input from the corresponding camera devices 20. Moreover, the video processing devices 12-2 to 12-N are each configured to control the corresponding platforms 30 as in the video processing device 12-1.

The integrated video processing device 13 is configured to perform the processing for the input image frames $F_1$ to $F_N$ processed by the video processing devices 12-1 to 12-N. Moreover, the integrated video processing device 13 is configured to perform the processing for the platforms 30-1 to 30-N.

As described above, in the video processing system 1A, the video processing devices 12 are each provided for the camera devices 20 and the platforms 30, and are integrated by the integrated video processing device 13. Thus, a processing load can be balanced. Note that the video processing devices 12-1 to 12-N and the integrated video processing device 13 have all or some of the functions of the video processing device 10 (FIG. 3) or the video processing device 11 (FIG. 19).

Other Configuration Example 2

Figure 32:
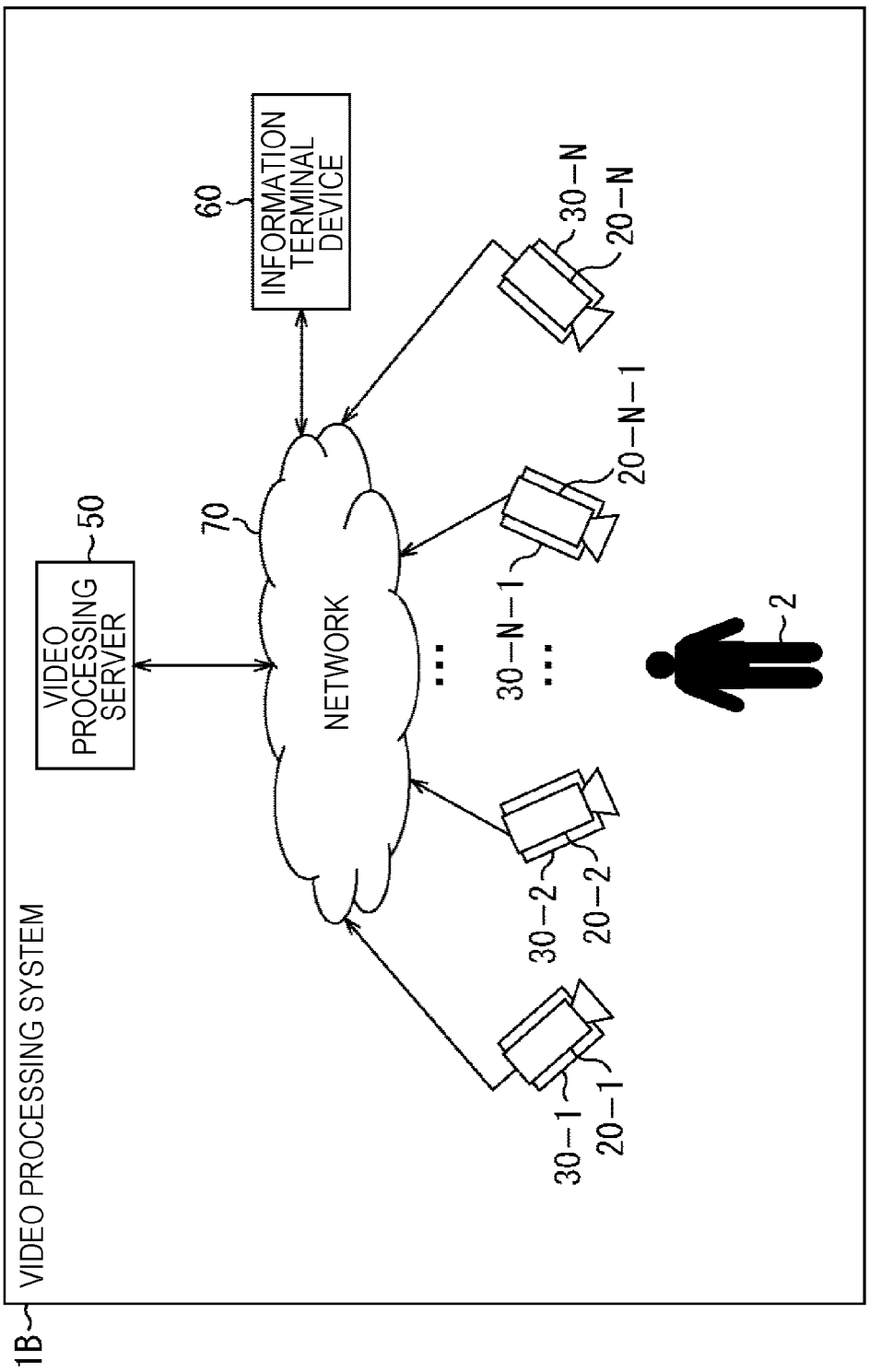
FIG. 32 is a diagram of still another configuration example of the video processing system.

In a video processing system 1B of FIG. 32, a video processing server 50 is placed on a network 70 such as the Internet, and an information terminal device 60 is further connected to the network 70. Note that the information terminal device 60 is electronic equipment having a communication function, such as a mobile phone, a smartphone, or a tablet terminal device.

The camera devices 20-1 to 20-N have a communication function, and transmit the input image frames $F_1$ to $F_N$ to the video processing server 50 via the network 70.

The video processing server 50 is configured to receive, via the network 70, the input image frames $F_1$ to $F_N$ transmitted from the camera devices 20-1 to 20-N. The video processing server 50 has all of the functions of the video processing device 10 (FIG. 3) or the video processing device 11 (FIG. 19), and processes the input image frames $F_1$ to $F_N$ to generate the output image frames.

Moreover, in a case where the video processing server 50 receives a bullet time video delivery request from the information terminal device 60 via the network 70, the video processing server 50 delivers, via the network 70, a bullet time video stream obtained from the output image frames to the information terminal device 60. Thus, the information terminal device 60 receives the bullet time video stream delivered from the video processing server 50, thereby reproducing the bullet time video.

Other Configuration Example 3

Figure 33:
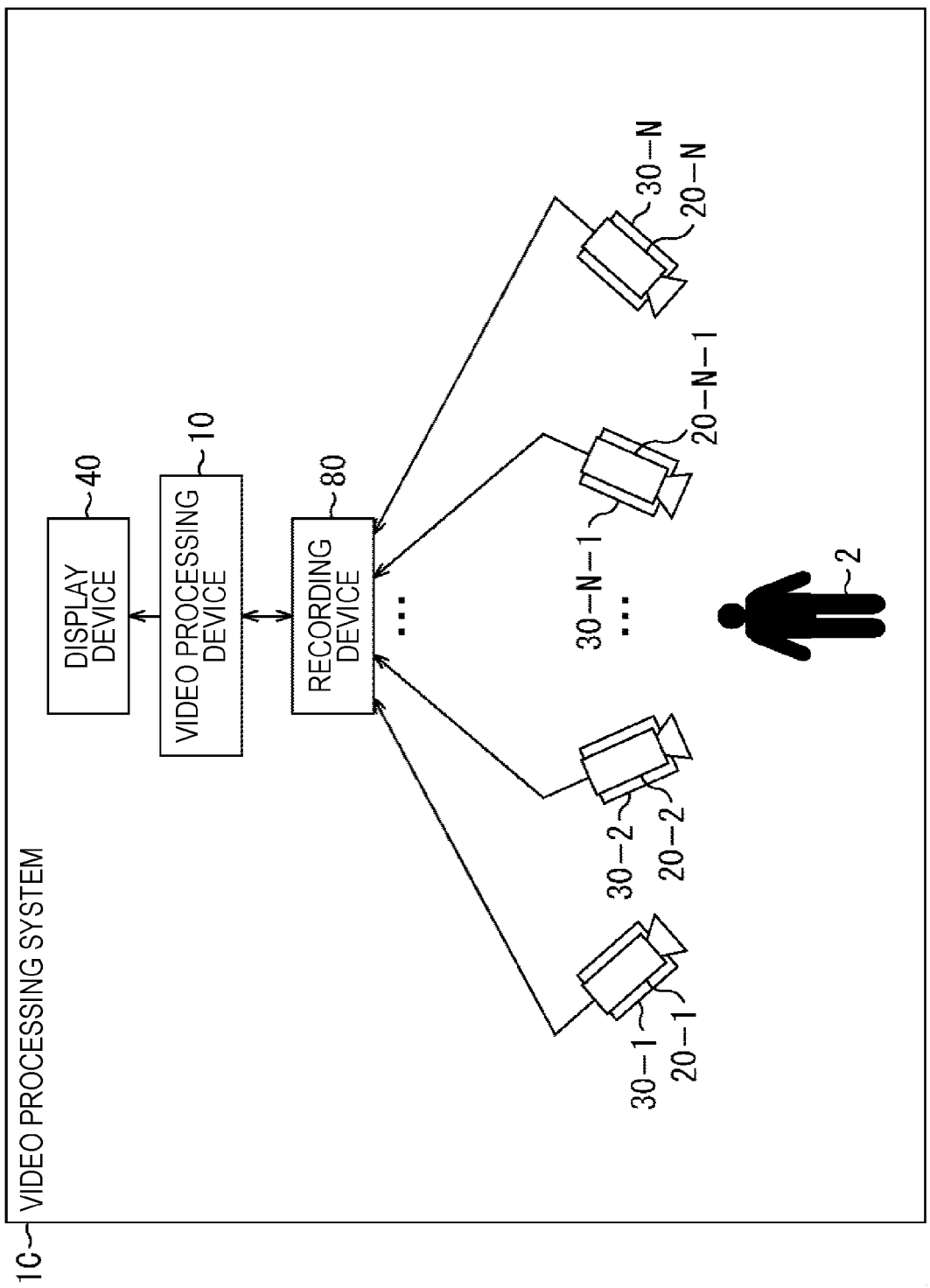
FIG. 33 is a diagram of still another configuration example of the video processing system.

In a video processing system 1C of FIG. 33, the recording device 80 configured to record the input image frames F generated by the camera devices 20 or the output image frames processed by the video processing device 10 is placed. Note that the video processing device 10, the N camera devices 20, and the recording device 80 each have, for example, a communication function in the video processing system 1C, and can exchange various types of data by wire communication or wireless communication.

The camera devices 20-1 to 20-N each transmit the image frames (the input image frames $F_1$ to $F_N$) to the recording device 80. The recording device 80 receives and records the image frames (the input image frames $F_1$ to $F_N$) transmitted from the camera devices 20-1 to 20-N.

The video processing device 10 has all of the functions of the video processing device 10 (FIG. 3) or the video processing device 11 (FIG. 19). The video processing device 10 reads, at predetermined timing, the input image frames $F_1$ to $F_N$ recorded in the recording device 80, thereby processing the read input image frames $F_1$ to $F_N$. In this manner, the video processing device 10 generates the output image frames.

The video processing device 10 can reproduce and display the bullet time video on the display device 40 on the basis of the generated output image frames. Moreover, since the data of the generated output image frames is recorded in the recording device 80, the video processing device 10 can read the data of the output image frames from the recording device 80 at predetermined timing, thereby reproducing and displaying the bullet time video on the display device 40. As described above, the video processing device 10 can not only process the input image frames F supplied from each camera device 20 in real time, but also perform non-real-time processing after all of the input image frames F targeted for processing have been acquired, for example.

6. Configuration of Computer

Figure 34:
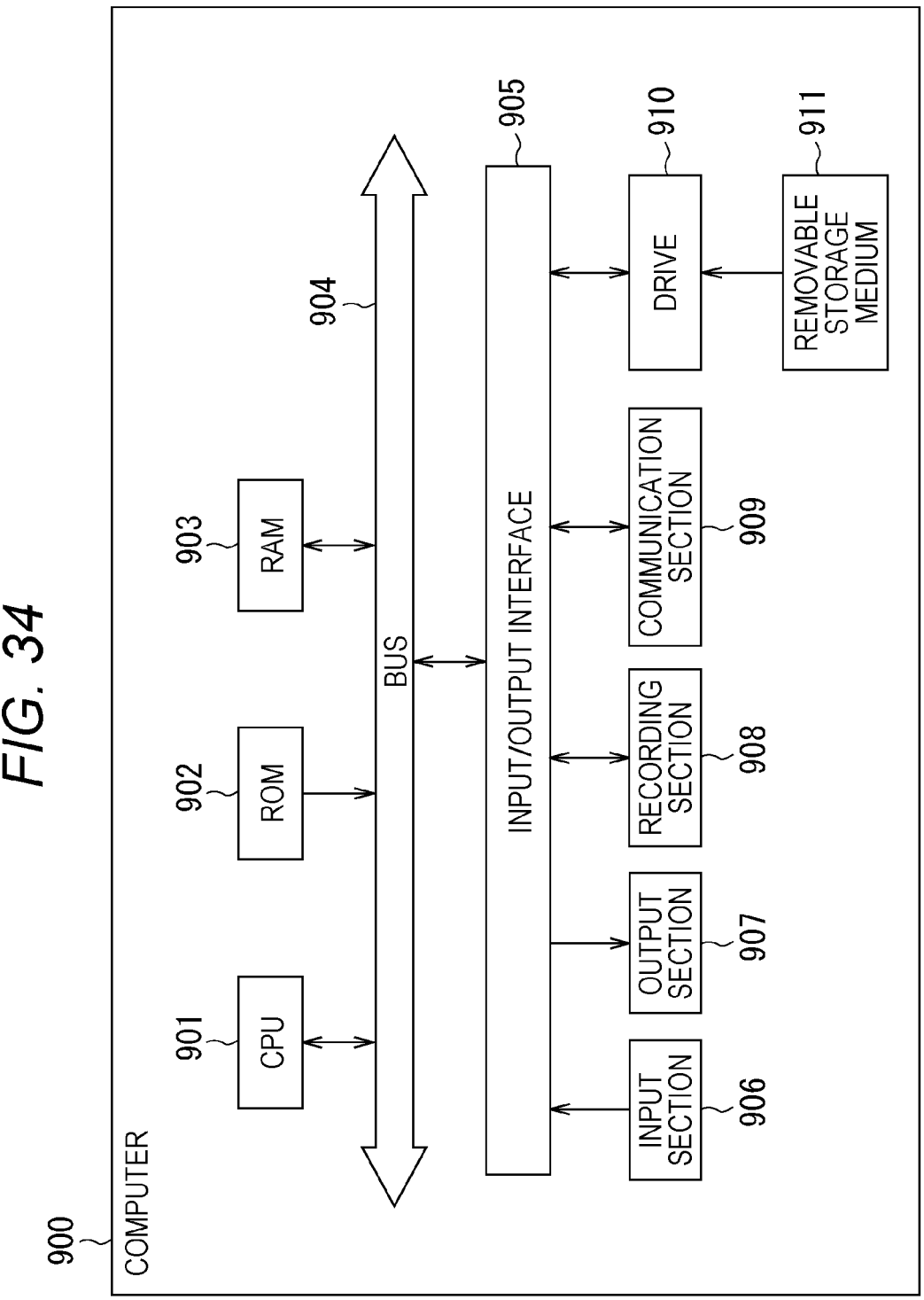
FIG. 34 is a diagram of a configuration example of a computer.

The above-described series of processing can be executed by hardware, or can be executed by software. In the case of executing the series of processing by the software, a program forming the software is installed on a computer. FIG. 34 is a diagram of a configuration example of hardware of the computer configured to execute the above-described series of processing by the program.

In the computer 900, a central processing unit (CPU) 901, a read only memory (ROM) 902, and a random access memory (RAM) 903 are connected to each other via a bus 904. An input/output interface 905 is further connected to the bus 904. An input section 906, an output section 907, a recording section 908, a communication section 909, and a drive 910 are connected to the input/output interface 905.

The input section 906 includes, for example, a keyboard, a mouse, and a microphone. The output section 907 includes, for example, a display and a speaker. The recording section 908 includes, for example, a hard drive and a non-volatile memory. The communication section 909 includes, for example, a network interface. The drive 910 is configured to drive a removable storage medium 911 such as a magnetic disk, an optical disk, a magneto-optical disk, or a semiconductor memory.

In the computer 900 configured as described above, the CPU 901 loads a program on the RAM 903 via the input/output interface 905 and the bus 904, the program being recorded in the ROM 902 or the recording section 908. Then, the CPU 901 executes the program to perform the above-described series of processing.

The program executed by the computer 900 (the CPU 901) can be, for example, provided with the program being recorded in the removable storage medium 911 as a package storage medium. Alternatively, the program can be provided via a wire or wireless transfer medium such as a local area network, the Internet, or digital satellite broadcasting.

In the computer 900, the program can be installed on the recording section 908 via the input/output interface 905 by attachment of the removable storage medium 911 to the drive 910. Alternatively, the program can be installed on the recording section 908 after having been received by the communication section 909 via the wire or wireless transfer medium. As another alternative, the program can be installed in advance on the ROM 902 or the recording section 908.

In the present specification herein, the processing performed according to the program by the computer is not necessarily performed in chronological order as described in the flowcharts. That is, the processing performed according to the program by the computer includes processing (e.g., parallel processing or processing using an object) executed in parallel or separately. Moreover, the program may be processed by a single computer (processor), or may be subjected to distributed processing by multiple computers.

Note that the embodiments of the present technology are not limited to those described above, and various changes can be made without departing from the gist of the present technology. For example, a form obtained by combination of all or some of the above-described multiple embodiments can be employed.

Moreover, the present technology can employ the following configurations.

(1)

A video processing device including a first acquiring section configured to acquire view point position information indicating the range of movement of a view point position for a notable object included in an input image frame including an object imaged in chronological order at multiple different view point positions and time information indicating a time range in the chronological order of imaging the input image frame, and a processing section configured to process the input image frame such that the notable object is at a specific position on an output image frame when the view point position moves within the time range indicated by the time information and the view point position movement range indicated by the view point position information.

(2)

The video processing device according to (1), in which the view point position information is information indicating start and end positions in movement of the view point position for the notable object, and the time information is information indicating start and end time points in the chronological order of imaging the input image frame.

(3)

The video processing device according to (2), in which the processing section updates, for each input image frame, a notable position as a focused position in the notable object.

(4)

The video processing device according to (3), in which the processing section tracks the set notable object, and calculates the notable position in the tracked notable object.

(5)

The video processing device according to (4), in which the processing section corrects the input image frame such that the direction of the optical axis of an imaging optical system of an imaging device configured to image the object included in the input image frame faces the direction of the notable object in a case where the direction of the optical axis is shifted from the notable object.

(6)

The video processing device according to (4) or (5), in which the processing section corrects, in a case where the imaging position of the imaging device is shifted from an ideal position with respect to the optical axis, the input image frame to be equivalent to those obtained when the notable object is imaged at the ideal imaging position.

(7)

The video processing device according to (5) or (6), further including a control section configured to control a fixing device configured to fix the imaging device in an optional direction such that the direction of the optical axis of the imaging optical system of the imaging device faces the direction of the notable object.

(8)

The video processing device according to (7), in which the control section controls the fixing device such that the imaging position of the imaging device is the ideal position with respect to the optical axis.

(9)

The video processing device according to any one of (5) to (8), in which the processing section interpolates a virtual view point position for a view point position corresponding to the imaging position of the imaging device.

(10)

The video processing device according to any one of (1) to (9), further including a setting section configured to set the notable object.

(11)

The video processing device according to any one of (1) to (10), further including an output section configured to output the output image frame on the basis of the input image frame processed by the processing section.

(12)

The video processing device according to (11), in which the output section outputs the output image frame to a display device.

(13)

The video processing device according to (11), in which the output section outputs the output image frame to a recording device.

(14)

The video processing device according to any one of (1) to (10), further including a display control section configured to control an indication of the notable object view point movement such that the notable object is at the specific position on the output image frame.

(15)

The video processing device according to any one of (1) to (14), further including a second acquiring section configured to acquire the input image frame.

(16)

A video processing method including the steps of acquiring view point position information indicating the range of movement of a view point position for a notable object included in an input image frame including an object imaged in chronological order at multiple different view point positions and time information indicating a time range in the chronological order of imaging the input image frame, and processing the input image frame such that the notable object is at a specific position on an output image frame when the view point position moves within the time range indicated by the time information and the view point position movement range indicated by the view point position information.

(17)

A program for causing a computer to function as a first acquiring section configured to acquire view point position information indicating the range of movement of a view point position for a notable object included in input image frame including an object imaged in chronological order at multiple different view point positions and time information indicating a time range in the chronological order of imaging the input image frame, and a processing section configured to process the input image frame such that the notable object is at a specific position on an output image frame when the view point position moves within the time range indicated by the time information and the view point position movement range indicated by the view point position information.

(18)

In a video processing system including multiple imaging devices and video processing devices placed at multiple different view point positions, each imaging device includes an imaging section configured to image an object, and each video processing device includes an acquiring section configured to acquire view point position information indicating the range of movement of the view point position for a notable object included in input image frame including the object imaged in chronological order at the view point positions different among the imaging devices and time information indicating a time range in the chronological order of imaging the input image frame, and a processing section configured to process the input image frame such that the notable object is at a specific position on an output image frame when the view point position moves within the time range indicated by the time information and the view point position movement range indicated by the view point position information.

REFERENCE SIGNS LIST 1, 1A, 1B, 1C Video processing system
10, 11, 12 Video processing device
13 Integrated video processing device
20, 20-1 to 20-N Camera device
30, 30-1 to 30-N Platform
40 Display device
50 Video processing server
60 Information terminal device
70 Network
80 Recording device
101 Control section
102 Input section
103 Input image frame acquiring section
104 Preprocessing section
105 Video processing section
106 Output image frame output section
107 Platform processing section
108 Connection section
110 Setting information acquiring section
111 Camera position/posture calculation section
112 Notable object setting section
121 Notable object tracking section
122 Point-of-regard calculation section
123 View point interpolation section
124 Camera posture correction section
125 Scale correction section
131 Platform control section
132 Camera position/posture calculation section
151 Reproduction processing section
152 Video switching section
153 Display control section
161 Normal video processing section
162 Bullet time video processing section
900 Computer
901 CPU

The invention claimed is:

1. A video processing device comprising:

a first acquiring section configured to acquire view point position information indicating a range of movement of a view point position for a notable object included in input image frames including an object imaged in chronological order at multiple different imaging positions and time information indicating a time range in the chronological order of imaging the input image frames; and a processing section configured to process the input image frames such that the notable object is at a specific position on an output image frame when the view point position moves within the time range indicated by the time information and the view point position movement range indicated by the view point position information.

2. The video processing device according to claim 1, wherein
the view point position information is information indicating start and end positions in the movement of the view point position for the notable object, and
the time information is information indicating start and end time points in the chronological order of imaging the input image frames.

3. The video processing device according to claim 2, wherein
the processing section updates, for each input image frame, a notable position as a focused position in the notable object.

4. The video processing device according to claim 3, wherein
the processing section
tracks the notable object, and
calculates the notable position in the tracked notable object.

5. The video processing device according to claim 4, wherein
the processing section performs a camera posture correction for the input image frames such that a direction of an optical axis of an imaging optical system of an imaging device configured to image the object included in the input image frames faces a direction of the notable object in a case where the direction of the optical axis is determined to be shifted from the notable object.

6. The video processing device according to claim 5, wherein
the processing section corrects, in a case where an identified imaging position of the imaging device is shifted from an ideal imaging position with respect to the optical axis, the input image frames to be equivalent to that obtained when the notable object is imaged at the ideal imaging position.

7. The video processing device according to claim 6, further comprising:
a control section configured to control a fixing device configured to fix the imaging device in an optional direction such that the direction of the optical axis of the imaging optical system of the imaging device faces a direction of the notable object.

8. The video processing device according to claim 7, wherein
the control section controls the fixing device such that the imaging position of the imaging device is the ideal position with respect to the optical axis.

9. The video processing device according to claim 6, wherein
the processing section interpolates a virtual view point position for a view point position corresponding to the imaging position of the imaging device.

10. The video processing device according to claim 1, further comprising:
a setting section configured to set the notable object.

11. The video processing device according to claim 1, further comprising:
an output section configured to output the output image frame on the basis of the input image frames processed by the processing section.

12. The video processing device according to claim 11, wherein the output section outputs the output image frame to a display device.

13. The video processing device according to claim 11, wherein the output section outputs the output image frame to a recording device.

14. The video processing device according to claim 1, further comprising:
a display control section configured to control an indication of the notable object view point movement such that the notable object is at the specific position on the output image frame.

15. A video processing method comprising steps of:
acquiring view point position information indicating a range of movement of a view point position for a notable object included in input image frames including an object imaged in chronological order at multiple different imaging positions and time information indicating a time range in the chronological order of imaging the input image frames; and
processing the input image frames such that the notable object is at a specific position on an output image frame when the view point position moves within the time range indicated by the time information and the view point position movement range indicated by the view point position information.

16. A non-transitory computer readable medium storing a program, the program being executable by a computer to perform operations comprising:
acquiring view point position information indicating a range of movement of a view point position for a notable object included in input image frames including an object imaged in chronological order at multiple different imaging positions and time information indicating a time range in the chronological order of imaging the input image frames, and
processing the input image frames such that the notable object is at a specific position on an output image frame when the view point position moves within the time range indicated by the time information and the view point position movement range indicated by the view point position information.

17. The video processing method according to claim 15, wherein
the view point position information is information indicating start and end positions in the movement of the view point position for the notable object, and
the time information is information indicating start and end time points in the chronological order of imaging the input image frames.

18. The video processing method according to claim 17, wherein
processing the input image frames including updating, for each input image frame, a notable position as a focused position in the notable object.

19. The non-transitory computer readable medium according to claim 16, wherein the view point position information is information indicating start and end positions in the movement of the view point position for the notable object, and the time information is information indicating start and end time points in the chronological order of imaging the input image frames.

20. The non-transitory computer readable medium according to claim 19, wherein processing the input image frames including updating, for each input image frame, a notable position as a focused position in the notable object.

* * * * *